(12) United States Patent
Kawashima et al.

(10) Patent No.: US 6,870,979 B2
(45) Date of Patent: Mar. 22, 2005

(54) OPTICAL CIRCUIT, METHOD FOR MANUFACTURING OPTICAL CIRCUIT, OPTICAL CIRCUIT DEVICE AND METHOD FOR CONTROLLING OPTICAL CIRCUIT DEVICE

(75) Inventors: Hiroshi Kawashima, Tokyo (JP); Kazutaka Nara, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 10/679,383

(22) Filed: Oct. 7, 2003

(65) Prior Publication Data

US 2004/0264836 A1 Dec. 30, 2004

(30) Foreign Application Priority Data

Oct. 9, 2002 (JP) .......................... 2002-296505
Mar. 24, 2003 (JP) .......................... 2003-081406
Apr. 16, 2003 (JP) .......................... 2003-111370

(51) Int. Cl.[7] ............................................. G02B 6/12
(52) U.S. Cl. ................... 385/14; 385/2; 385/3
(58) Field of Search ............................ 385/2, 3, 14, 15, 385/24, 31

(56) References Cited

U.S. PATENT DOCUMENTS 5,117,470 A * 5/1992 Inoue et al. ................... 385/14
5,940,548 A * 8/1999 Yamada et al. ................ 385/14
6,580,862 B2 * 6/2003 Kominato et al. .......... 385/131

* cited by examiner

*Primary Examiner*—Akm Enayet Ullah
*Assistant Examiner*—Jennifer Doan
(74) *Attorney, Agent, or Firm*—Oblon, Spivak, McClelland, Maier & Neustadt, P.C.

(57) ABSTRACT

An optical circuit device includes: a substrate and an optical waveguide layer having a core and a cladding formed on the substrate; an optical waveguide circuit of the core having an optical splitter for splitting light, an optical coupler for coupling light, a first connecting optical waveguide and a second connecting optical waveguide for connecting the optical splitter and the optical coupler, and the first and second connecting optical waveguides respectively having first and second phase adjustment means capable of varying the phases of a propagating light, the optical circuit device being formed such that the rate of change of the polarization difference of phases in the first phase adjustment means and the rate of change of the polarization difference of phases in the second phase adjustment means are different from each other with respect to the phase adjustment amounts when the first and second phase adjustment means perform phase adjustment.

34 Claims, 31 Drawing Sheets

FIG.1-1-A
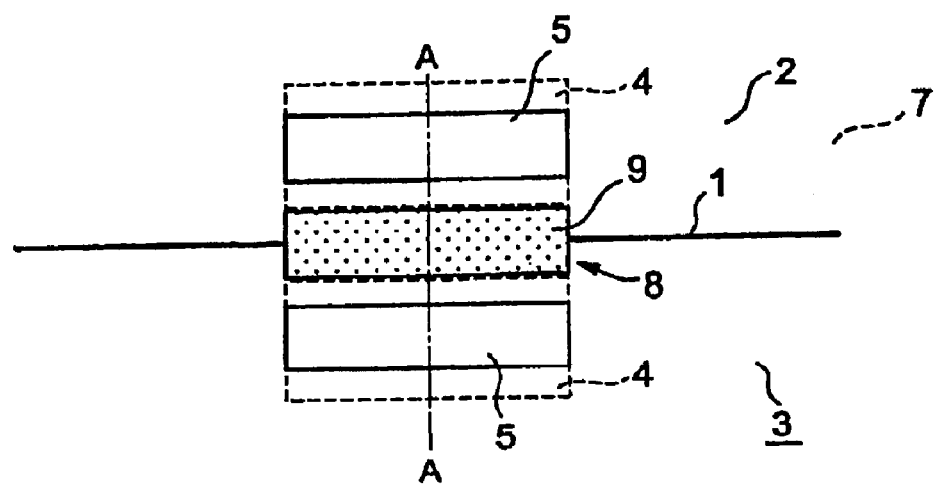
FIG.1-1-B
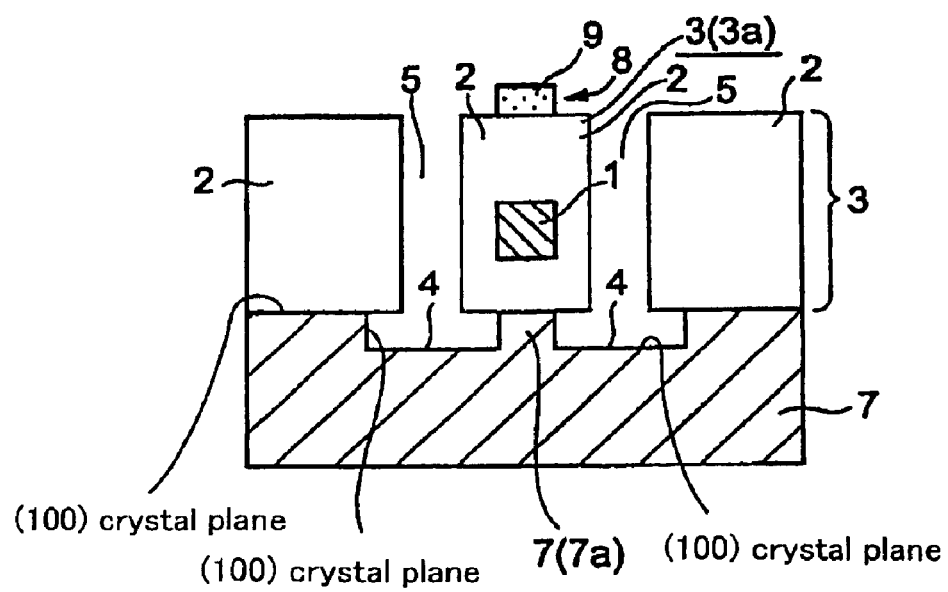

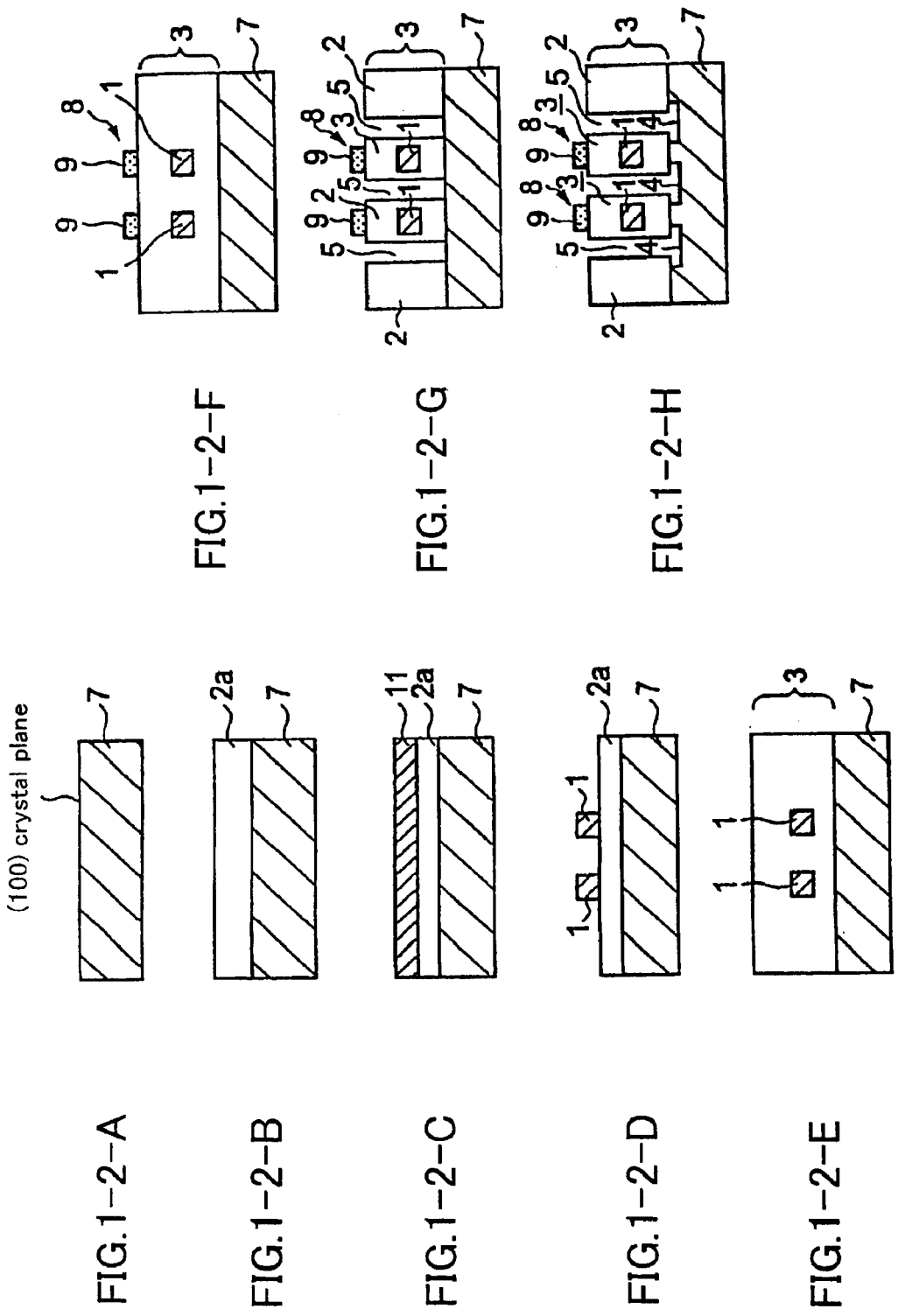
FIG.1-2-A
FIG.1-2-B
FIG.1-2-C
FIG.1-2-D
FIG.1-2-E
FIG.1-2-F
FIG.1-2-G
FIG.1-2-H FIG.1-3-A
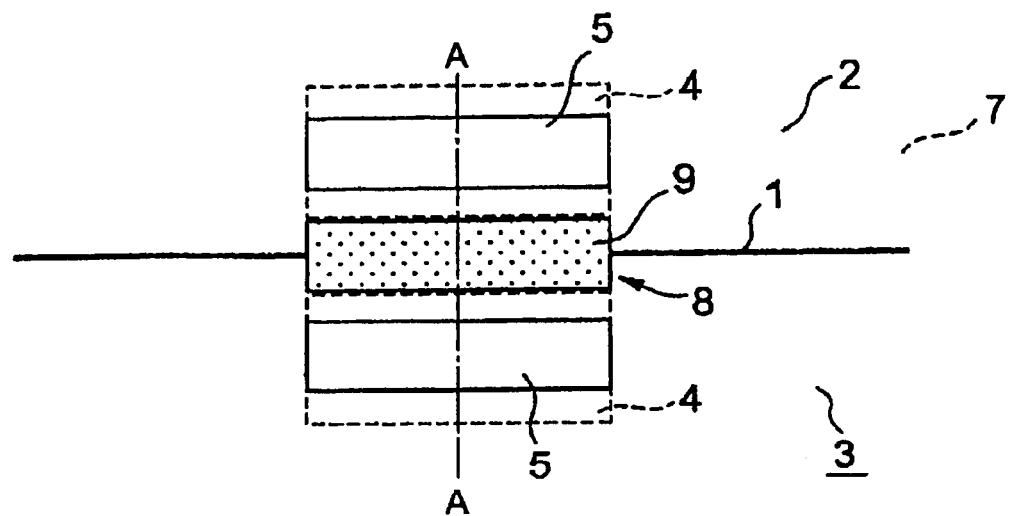
FIG.1-3-B
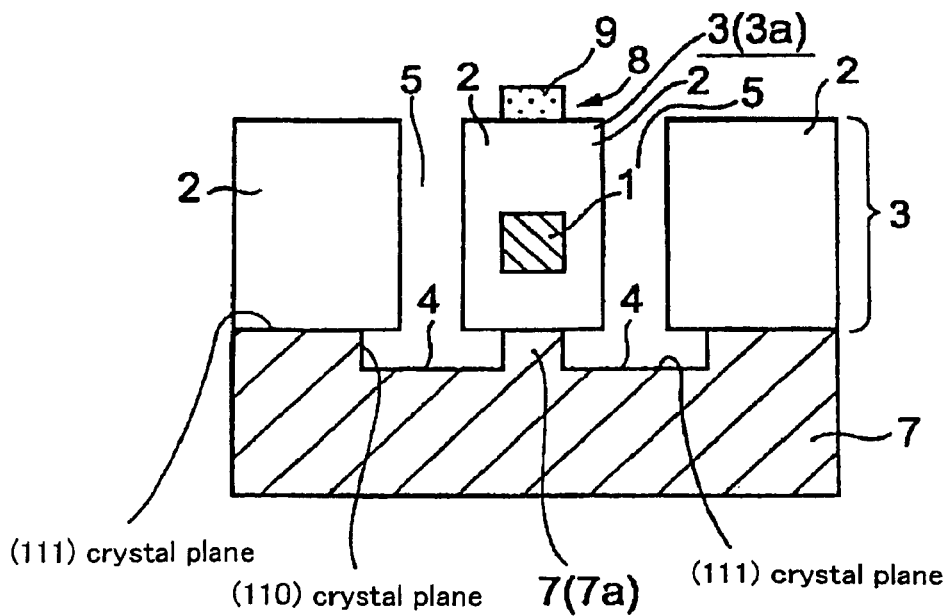
(111) crystal plane
(110) crystal plane
7(7a)
(111) crystal plane FIG.1-4-A
(111) crystal plane
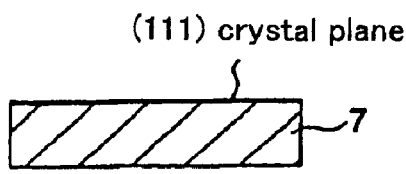
FIG.1-4-B
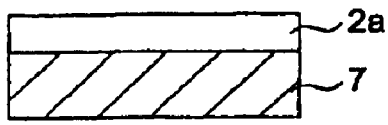
FIG.1-4-C
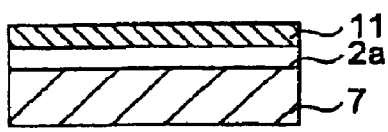
FIG.1-4-D
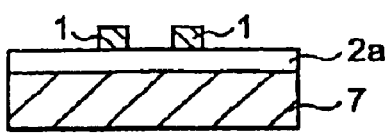
FIG.1-4-E
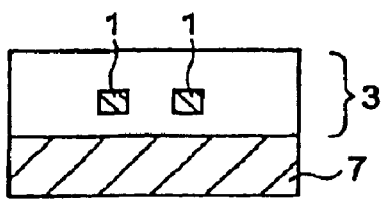
FIG.1-4-F
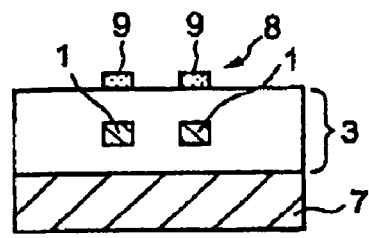
FIG.1-4-G
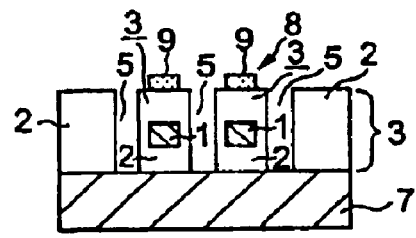
FIG.1-4-H
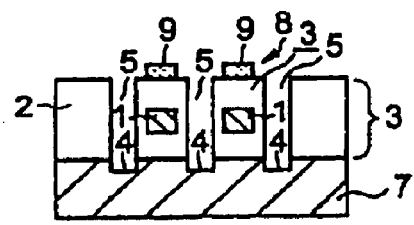
FIG.1-4-I
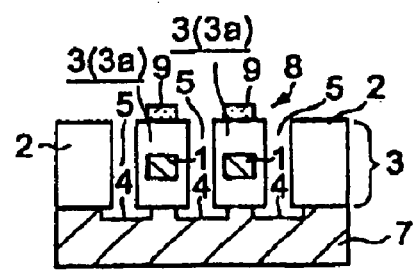

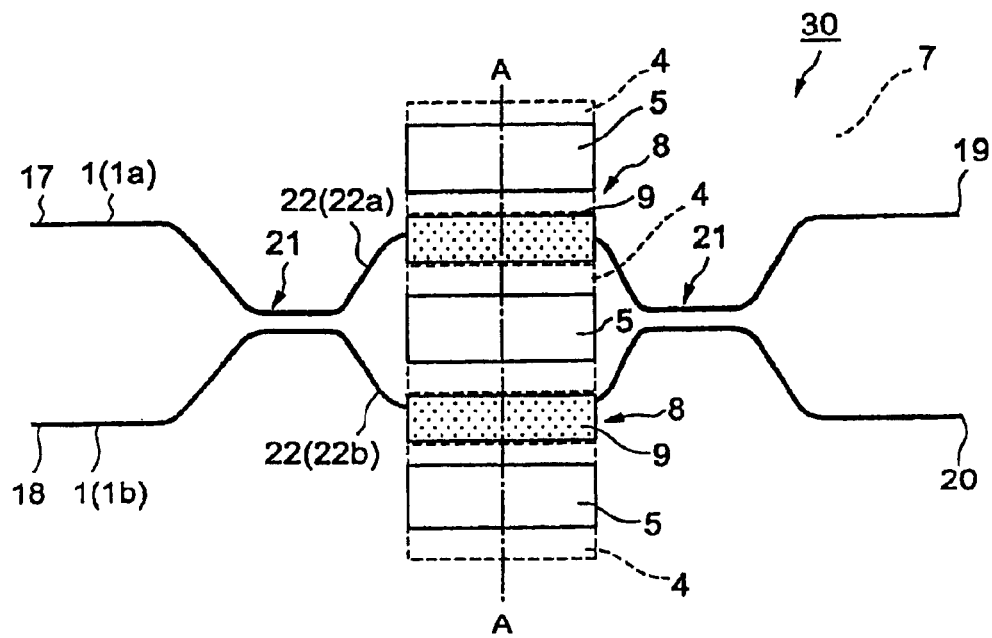
FIG.1-5-A
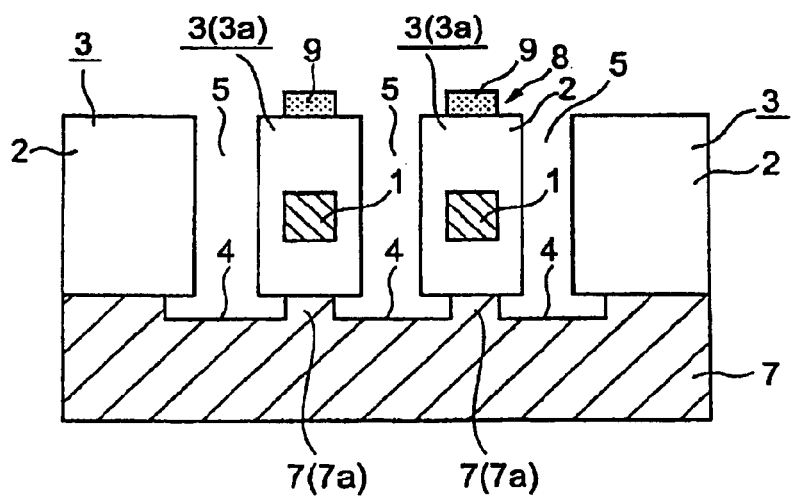
FIG.1-5-B

FIG.1-6-A
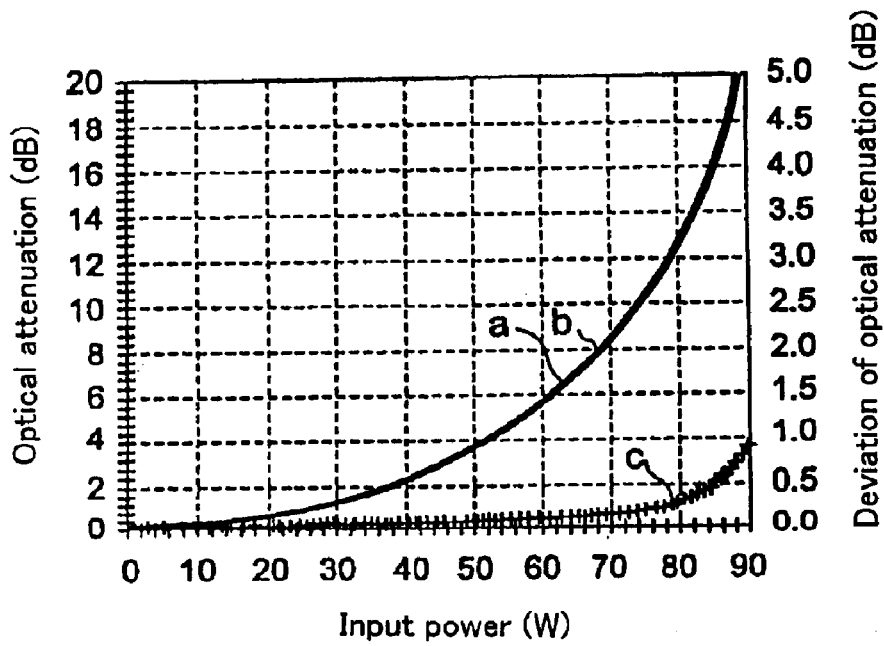
FIG.1-6-B
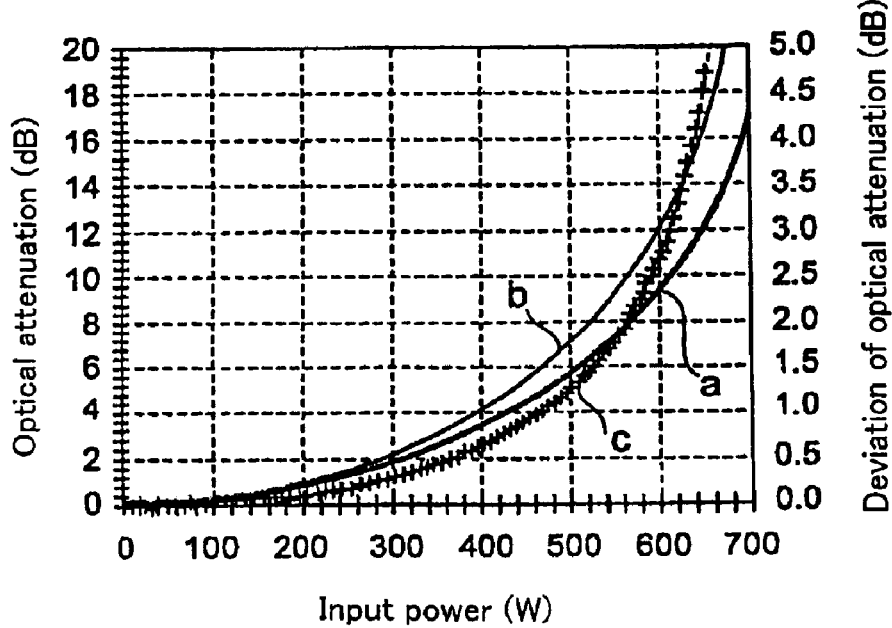

FIG.1-11-A
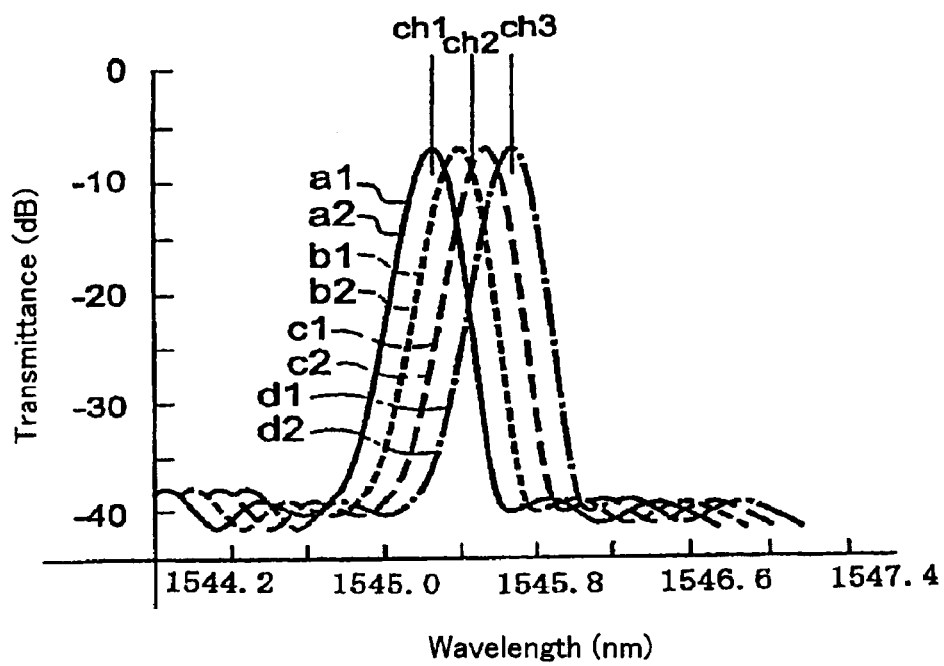
FIG.1-11-B
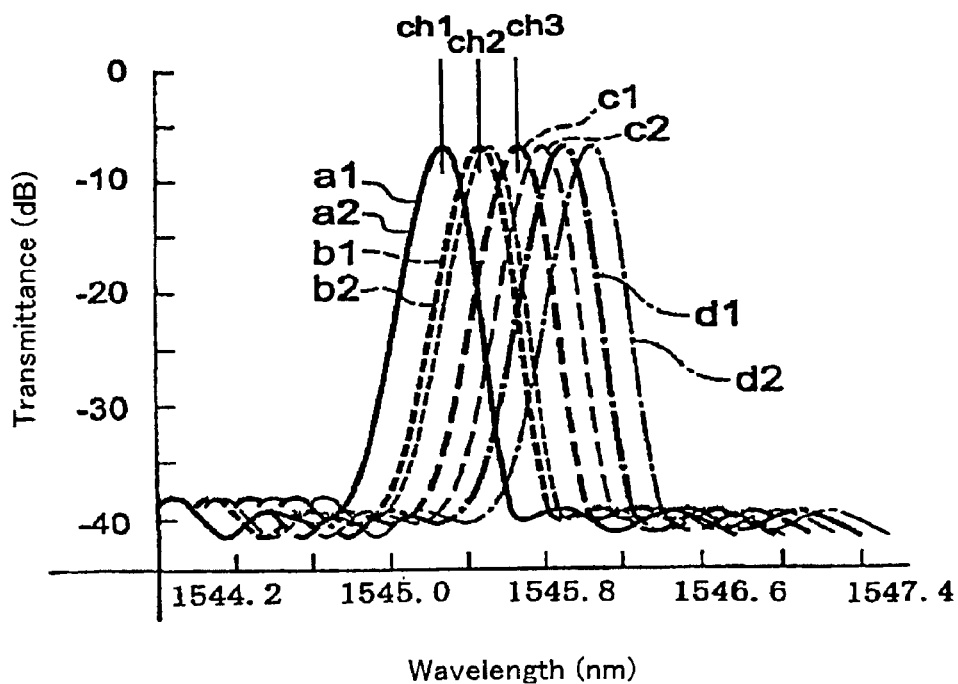

FIG.2-1-A
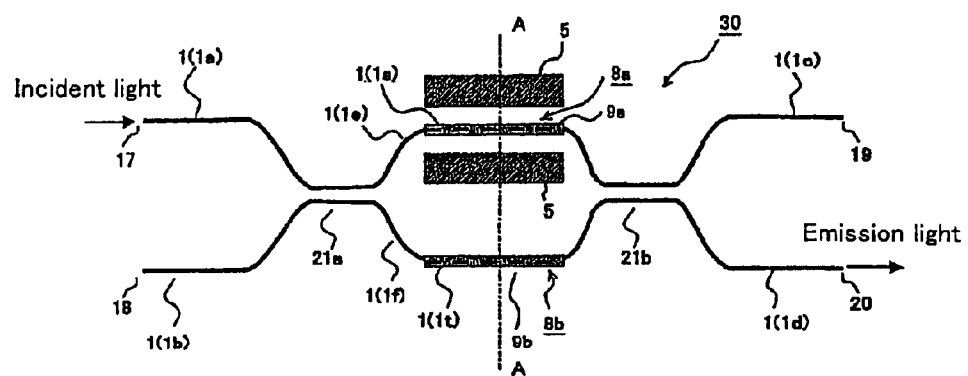
FIG.2-1-B
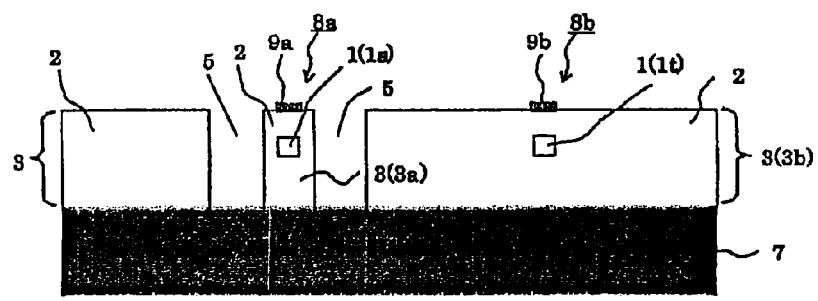

FIG.2-2-A
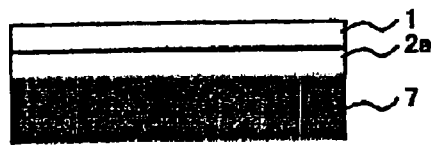
FIG.2-2-B
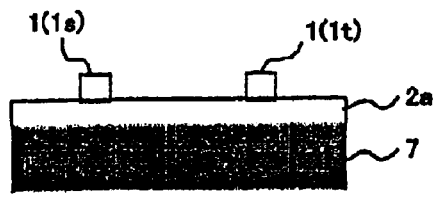
FIG.2-2-C
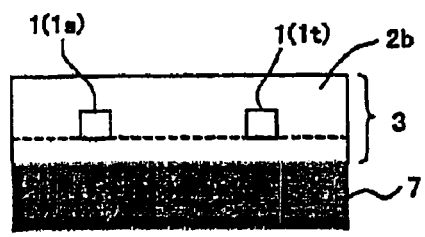
FIG.2-2-D
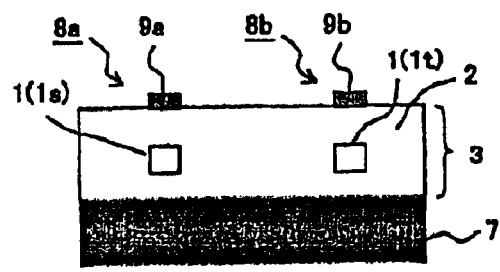
FIG.2-2-E
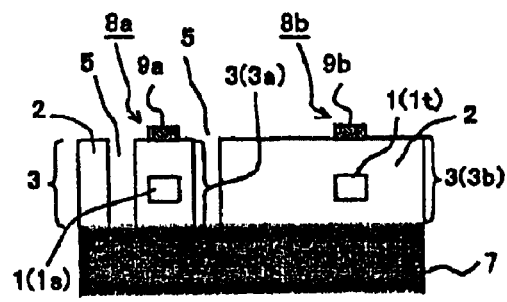

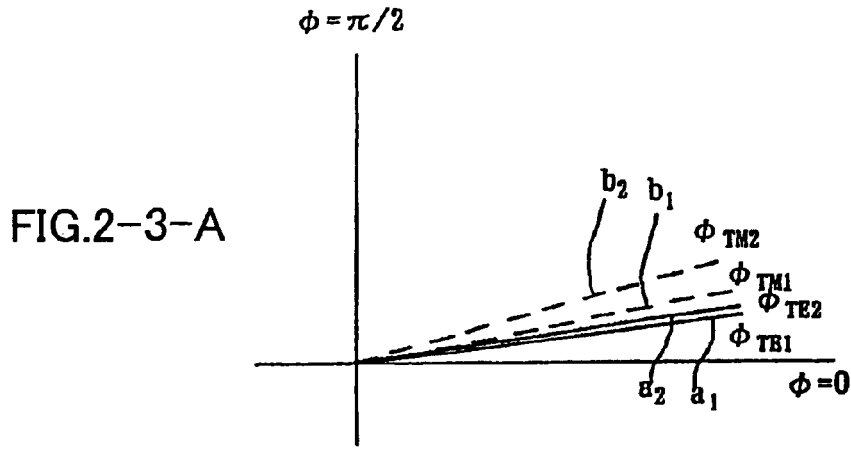
FIG.2-3-A
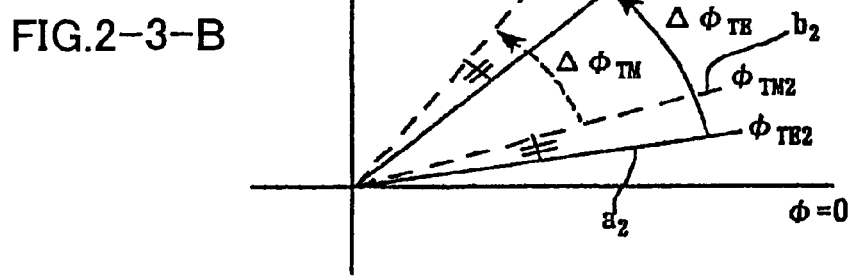
FIG.2-3-B
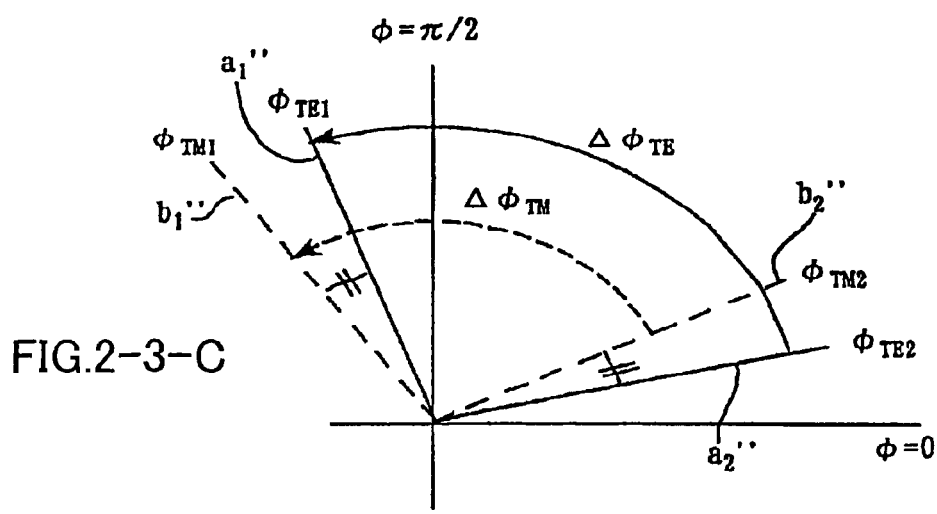
FIG.2-3-C

FIG.2-4-A
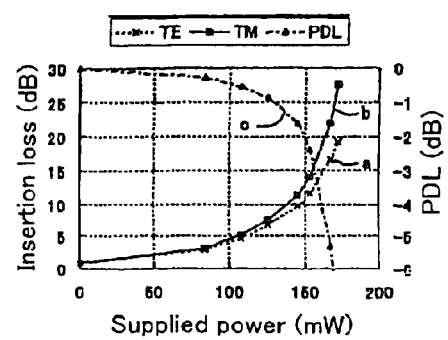
FIG.2-4-B
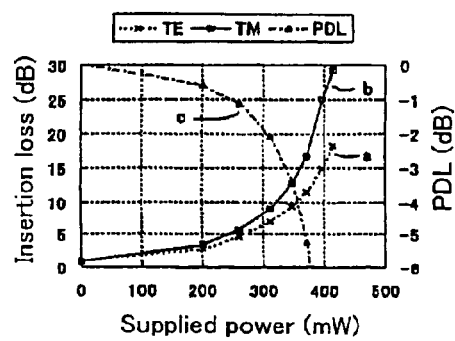
FIG.2-5-A
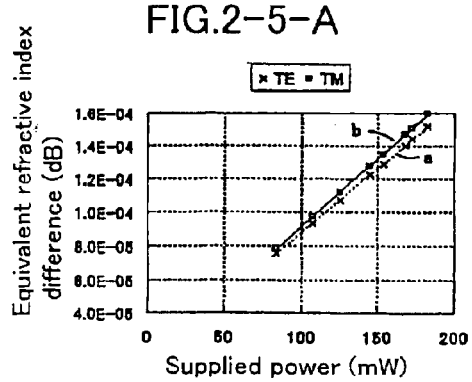
FIG.2-5-B
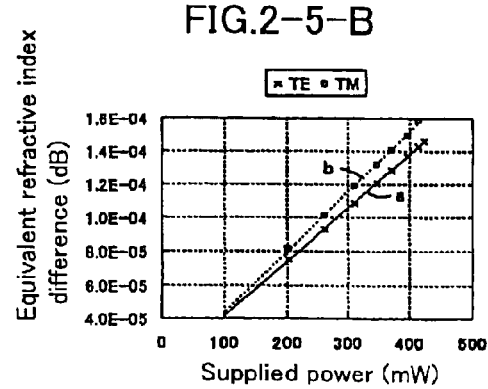

FIG.2-8-A
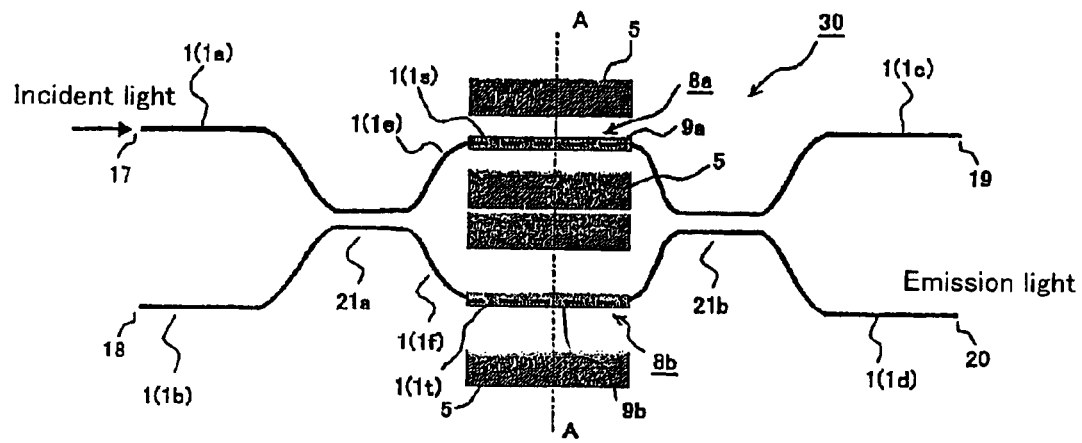
FIG.2-8-B
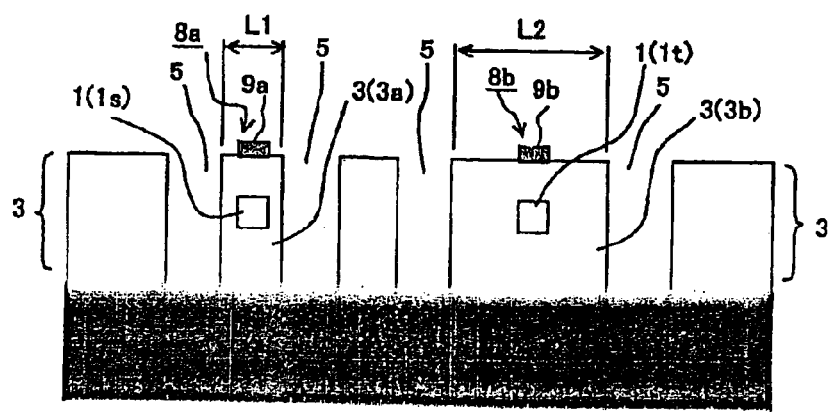

FIG.2-9-A
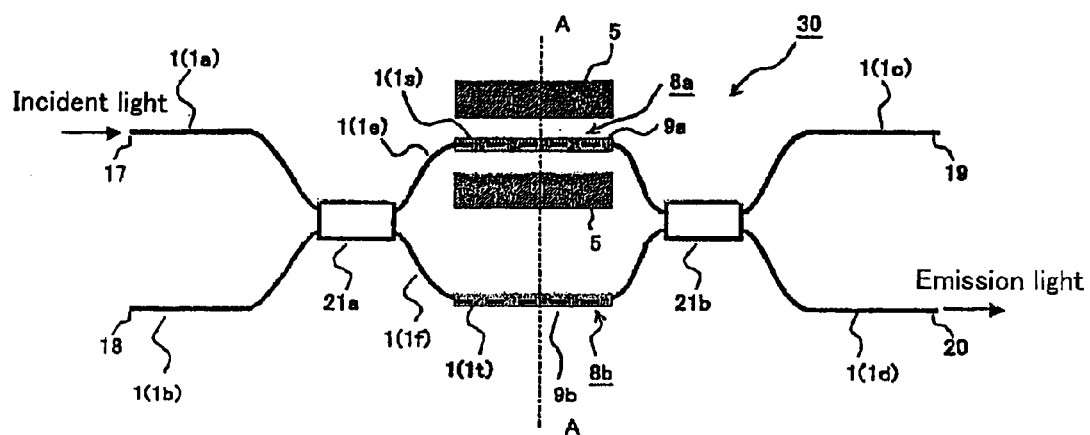
FIG.2-9-B
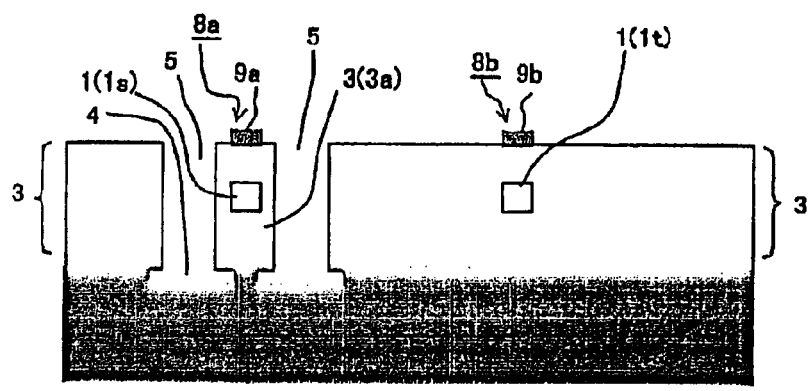

FIG.2-10-A
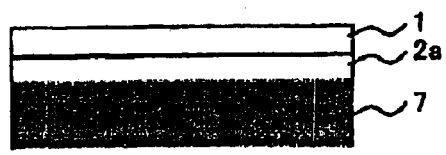
FIG.2-10-B
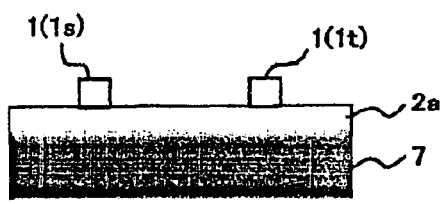
FIG.2-10-C
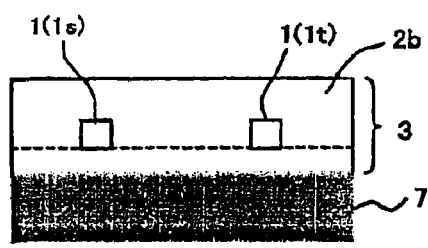
FIG.2-10-D
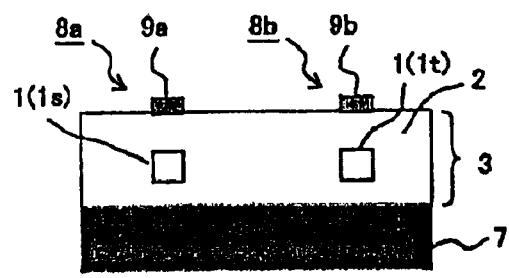
FIG.2-10-E
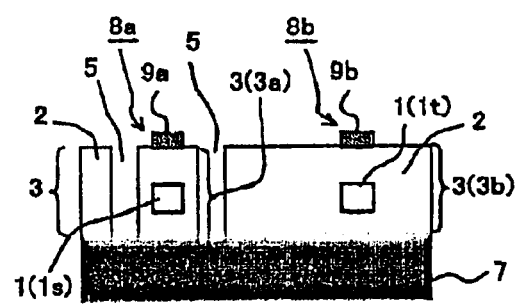
FIG.2-10-F
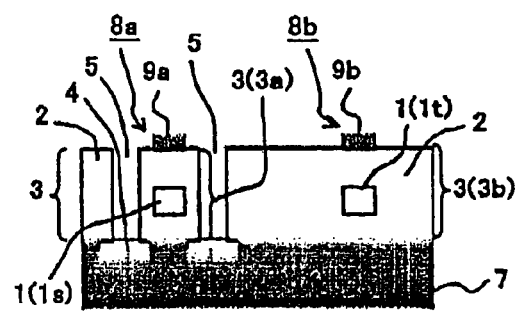

FIG.2-11-A
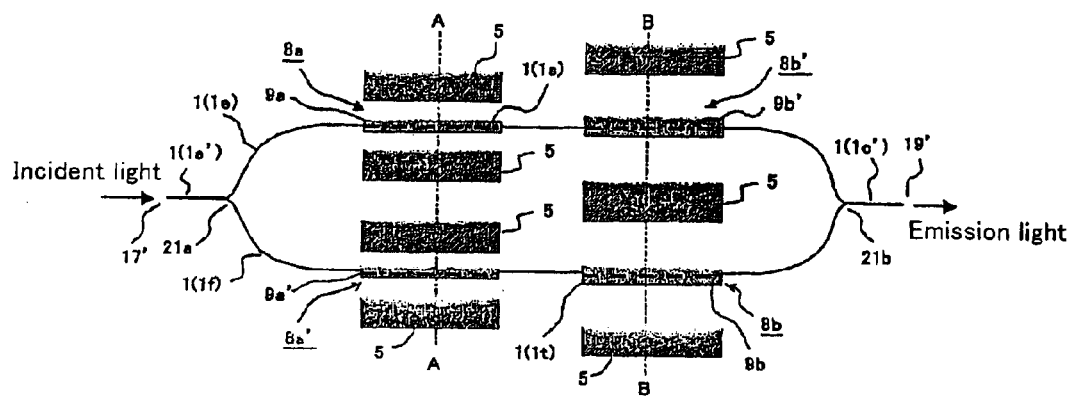
FIG.2-11-B
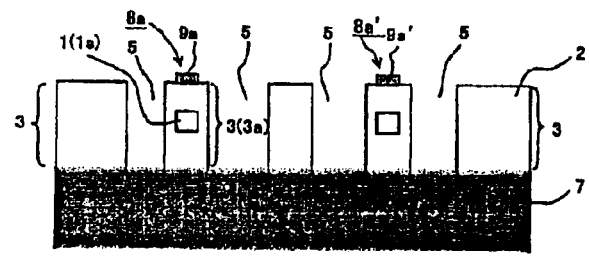
FIG.2-11-C
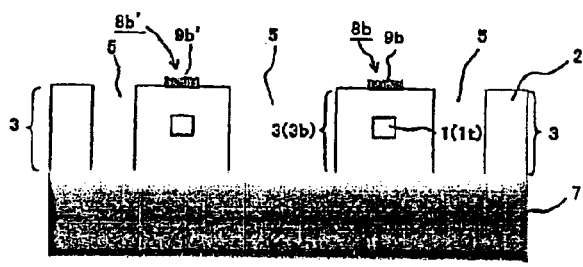

FIG.2-12-A
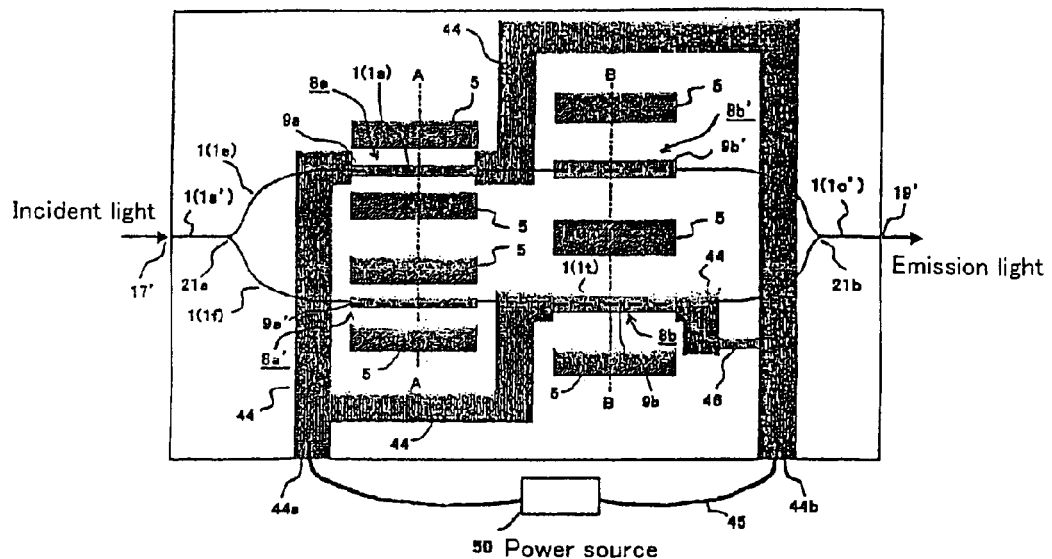
FIG.2-12-B
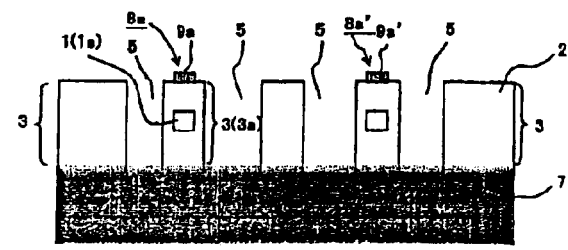
FIG.2-12-C
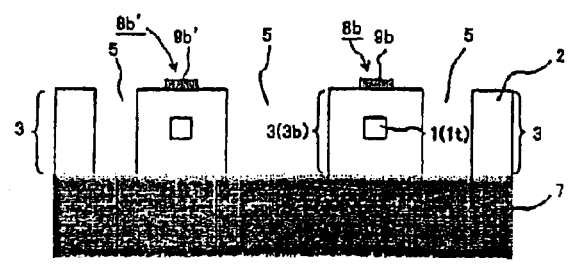

FIG.2-13-A
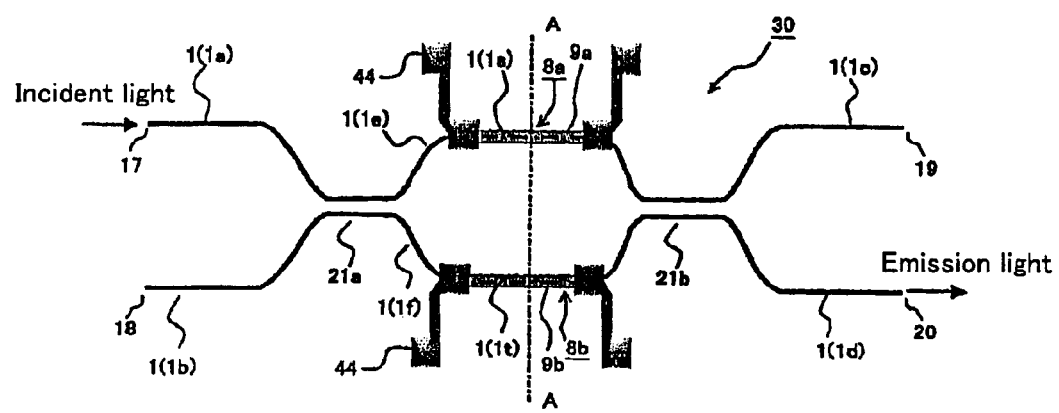
FIG.2-13-B
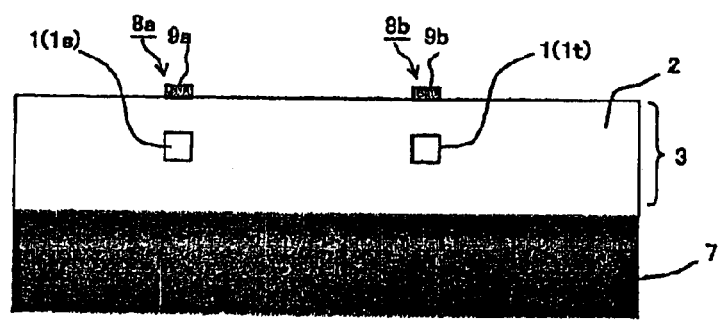

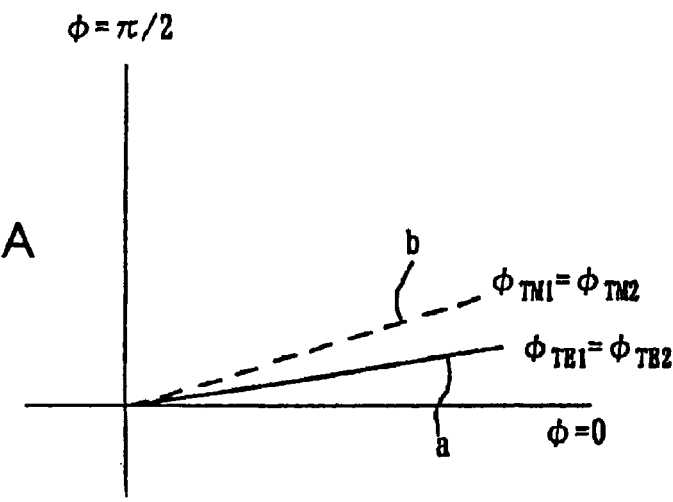
FIG.2-14-A
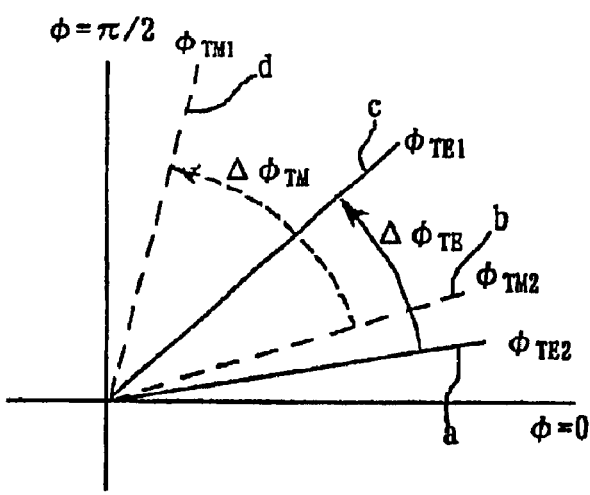
FIG.2-14-B
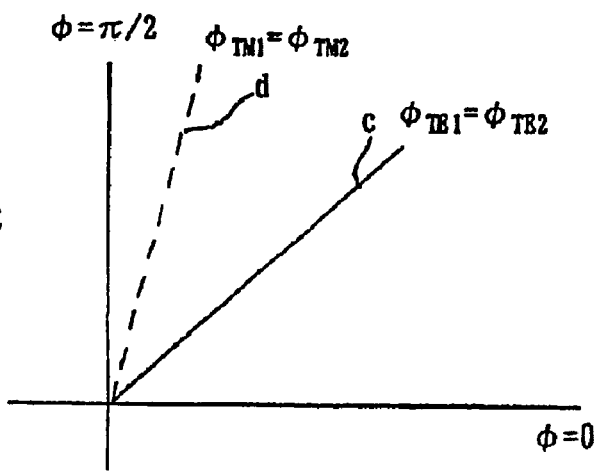
FIG.2-14-C

FIG.2-15-A
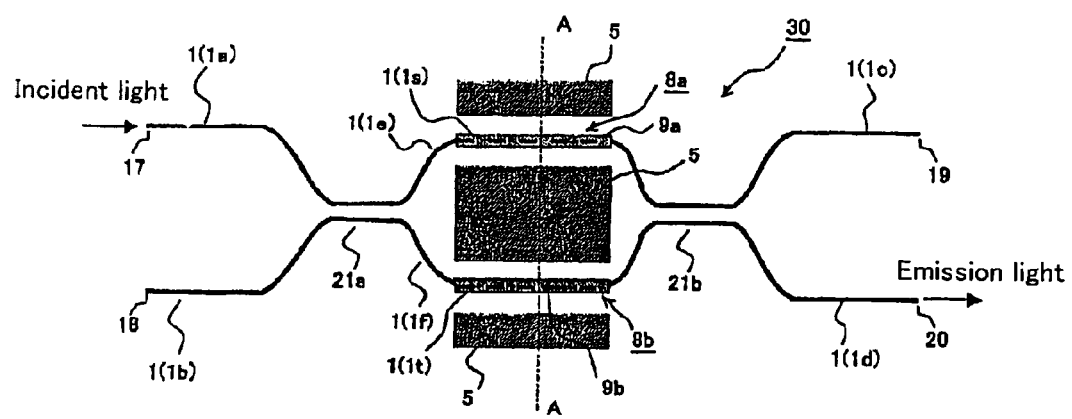
FIG.2-15-B
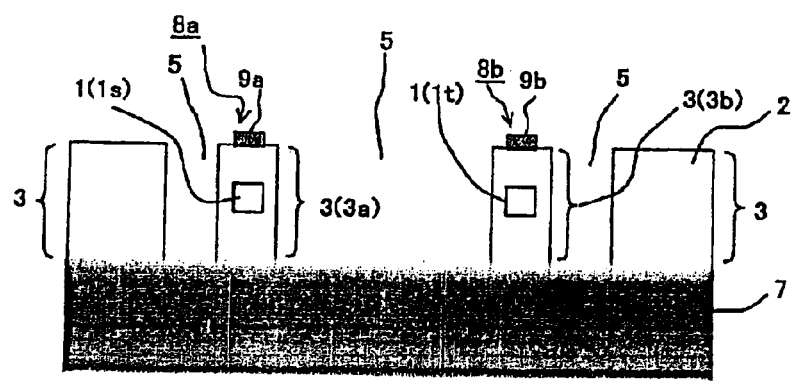

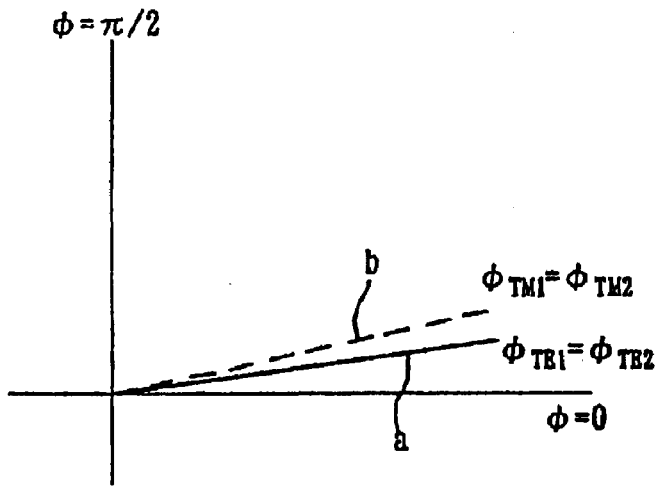
FIG.2-16-A
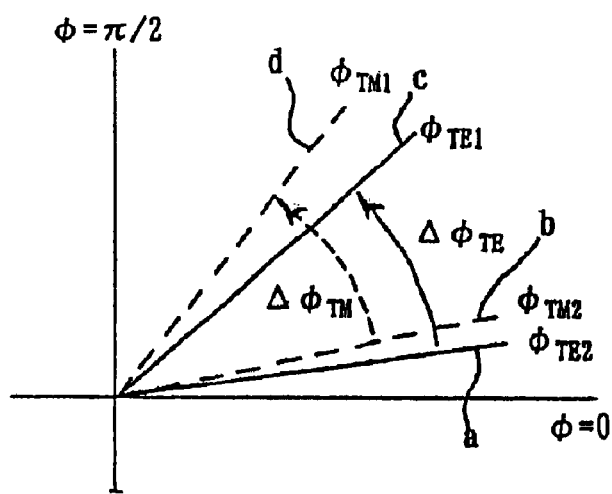
FIG.2-16-B
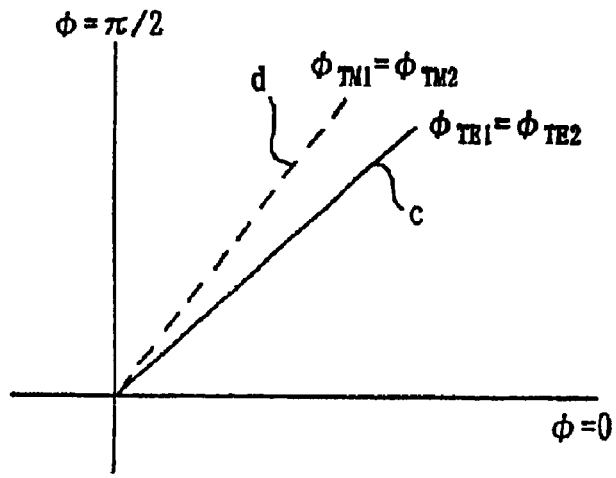
FIG.2-16-C

OPTICAL CIRCUIT, METHOD FOR MANUFACTURING OPTICAL CIRCUIT, OPTICAL CIRCUIT DEVICE AND METHOD FOR CONTROLLING OPTICAL CIRCUIT DEVICE

BACKGROUND OF THE INVENTION

1. Field of the Invention

The present invention relates to optical circuits and optical circuit devices applied to telecommunication fields and the like, methods of manufacturing the optical circuit and the optical circuits devices, and methods of controlling the optical circuit devices.

2. Description of the Related Art

Optical circuits applied to optical communications and the like generally have a silicon substrate and an optical waveguide layer formed on the silicon substrate; the optical waveguide layer has a core and a cladding. Optical circuits can be formed into optical circuit devices having various functions by setting the optical waveguide configuration (core pattern) formed by the core in a variety of ways.

An example of such optical circuit devices is an optical circuit device having a Mach-Zehnder interferometer circuit 30 as shown in FIG. 1-16.

In addition, an optical circuit device having a cross-sectional configuration as shown in FIG. 1-18 has been proposed (see, for example, Yasuyuki Inoue, et al. "Polarization Sensitivity of a Silica Waveguide Thermooptic Phase Shifter for Planar Light wave Circuit", IEEE Photonics Technology Letters, vol.4, No. 1, January 1992, p.36).

Furthermore, optical circuit devices as shown in FIGS. 1–19 and FIG. 1-20 have also been proposed (see, for example, Akio Sugita, et al. "Bridge-Suspended Silica-Waveguide Thermo-Optic Phase Shifter and Its Application to Mach-Zehnder Type Optical Switch", The Transaction of the IEICE, Vol. E73, No. 1, January, 1990, p.105).

Still further, another example of optical circuit device is an optical circuit device having a Mach-Zehnder interferometer circuit 30 as shown in FIG. 2-13-A.

As further another example of optical circuit device, an optical circuit device having a configuration as shown in FIG. 2-15 has been proposed (see, for example, Hashizume et al. "Reduction in PDL of PLC-type variable optical attenuator" General Conference of the Institute of Electronics, Information and Communication Engineers, 2001, C-3–64).

SUMMARY OF THE INVENTION

In order to accomplish the later-described objects, the present invention provides the following configurations as means to solve the problems. Specifically, the present invention provides, in accordance with one aspect, an optical circuit including: a silicon substrate; an optical waveguide layer formed on the silicon substrate, the optical waveguide layer having a core and a cladding; and temperature control means formed on the optical waveguide layer, for variably controlling the temperature of a portion of the core locally; wherein the optical waveguide layer on both sides sandwiching a portion on which the temperature control means is formed is removed from a region spaced from the core along a longitudinal direction of the core, from a surface of the optical waveguide layer to a surface of the silicon substrate; a recessed portion having a rectangular cross-sectional shape is provided in a surface portion of the silicon substrate including an entire region facing a bottom part of the optical waveguide layer-removed portion; the surface of the silicon substrate is formed of a silicon (100) crystal plane, a side face of the recessed portion formed along the longitudinal direction of the core is formed of a silicon (100) crystal plane substantially perpendicular to the silicon substrate surface, and a bottom face of the recessed portion is formed of a silicon (100) crystal plane substantially parallel to the silicon substrate surface.

In accordance with another aspect, the present invention provides an optical circuit device including the above-described optical circuit, the core of the optical circuit having a coupler-forming core that forms at least two optical splitter/couplers for performing at least one of splitting and coupling of light and at least two connecting cores that connect these coupler-forming cores together, and at least one of the connecting cores having a temperature control means.

In accordance with still another aspect, the present invention provides a method for manufacturing an optical circuit, which is a method for manufacturing the above-described optical circuit, including, after forming a portion from which an optical waveguide layer is removed, subjecting the silicon substrate to anisotropic etching of silicon using an alkaline solution to form a recessed portion in a surface of the silicon substrate at a location corresponding to the portion from which the optical waveguide layer is removed.

In accordance with yet another aspect, the present invention provides an optical circuit device including: a substrate; and an optical waveguide layer having a core and a cladding formed on the substrate; an optical waveguide circuit of the core having an optical splitter for splitting light, an optical coupler for coupling light, and a first connecting optical waveguide and a second connecting optical waveguide for connecting the optical splitter and the optical coupler, and the first and second connecting optical waveguides respectively having first and second phase adjustment means capable of varying the phase of propagating light, the optical circuit device being formed such that the rate of change of the polarization difference of phases in the first phase adjustment means and the rate of change of the polarization difference of phases in the second phase adjustment means are different from each other with respect to phase adjustment amounts when the first and second phase adjustment means perform phase adjustment.

In accordance with further another aspect, the present invention provides a method of controlling the above-described optical device, including: adjusting the phase adjustment means so that a phase difference between the phase of TE polarized light after a propagating light propagating in the first connecting optical waveguide has propagated through the first connecting optical waveguide and the phase of TE polarized light after a propagating light propagating in the second connecting optical waveguide has propagated through the second connecting optical waveguide and a phase difference between the phase of TM polarized light after a propagating light propagating in the first connecting optical waveguide has propagated through the first connecting optical waveguide and the phase of TM polarized light after a propagating light propagating in the second connecting optical waveguide has propagated through the second connecting optical waveguide are equal to each other.

BRIEF DESCRIPTION OF THE DRAWINGS

FIGS. 1-1-A and 1-1-B are structural diagrams illustrating a primary portion of a preferred embodiment 1-1 of an optical circuit according to the present invention.

FIGS. 1–2-A to 1-2-H are explanatory views illustrating the manufacturing steps for the optical circuit of the preferred embodiment 1-1.

FIGS. 1–3-A and 1-3-B are structural diagrams of a primary portion of a preferred embodiment 1-2 of the optical circuit according to the present invention.

FIGS. 1-4-A to 1-4-I are explanatory views illustrating the manufacturing steps for the optical circuit of the preferred embodiment 1-2.

FIGS. 1-5-A and 1-5-B are structural diagrams illustrating a primary portion of preferred embodiments 1-1 and 1-2 of the optical circuit device according to the present invention.

FIGS. 1–6-A and 1-6-B are graphs illustrating a relationship between input power and optical attenuation of the optical circuit device of the preferred embodiment 1-1, along with the relationship in the comparative example.

FIG. 1-7 is a plan view illustrating a primary portion of a preferred embodiment 1-3 of the optical circuit device according to the present invention.

FIG. 1-8 is a graph showing a relationship between wavelength and coupling efficiency in the optical circuit device of the preferred embodiment 1-3.

FIG. 1-9 is a graph showing a relationship between input power to a temperature control means and center wavelengths in the optical circuit device of the preferred embodiment 1-3 and in the optical circuit device of a comparative example, along with the relationship in the comparative example.

FIG. 1-10 is a plan view illustrating preferred embodiments 1-5, 1–6, and 1-7 of the optical circuit device according to the present invention.

FIGS. 1-1-A and 1-11-B are graphs showing a relationship between input power and transmittance in the optical circuit device of the preferred embodiment 1-5, along with the relationship in a comparative example.

FIG. 1-12 is a graph showing a relationship between input power to a temperature control means and optical attenuation of predetermined wavelength light in the preferred embodiment 1-6 of the optical circuit device according to the present invention.

FIG. 1-13 is a plan view illustrating a structure of a primary portion of a preferred embodiment 1-8 of the optical circuit device according to the present invention.

FIG. 1-14 is an enlarged view of a temperature control means-forming portion in the preferred embodiment 1-8.

FIG. 1-15 is a graph illustrating an example of preset phase distribution that the temperature control means gives to an arrayed waveguide in the preferred embodiment 1-8.

FIG. 1-16 is an explanatory view illustrating an example of an optical circuit device provided with a Mach-Zehnder interferometer circuit.

FIG. 1-17 is an explanatory view illustrating an example of cross-sectionial configuration of a conventional optical circuit device.

FIG. 1-18 is an explanatory view illustrating an example of cross-sectional configuration of a conventionally-proposed optical circuit device.

FIG. 1-19 is an explanatory view illustrating another example of the cross-sectional configuration of the conventionally-proposed optical circuit device.

FIG. 1-20 is an explanatory view illustrating still another example of the cross-sectional configuration of the conventionally-proposed optical circuit device.

FIG. 1-21 is an explanatory view illustrating an example of a conventionally-proposed optical circuit device with a plan view.

FIGS. 2-1-A and 2-1-B are structural diagram illustrating a primary portion of a preferred embodiment 2-1 of an optical circuit device according to the present invention.

FIGS. 2-2-A to 2-2-E are explanatory views illustrating the manufacturing steps of the optical circuit device of the preferred embodiment 2-1.

FIGS. 2-3-A to 2-3-C are schematic views illustrating that the phase difference in TE polarized light and the phase difference in TM polarized light are made equal in the optical circuit device of the preferred embodiment 2-1.

FIG. 2-4-A and 2-4-B are graphs illustrating the relationship of the amount of supplied power to first and second phase shifters with insertion loss and PDL in the optical circuit device of the preferred embodiment 2-1.

FIGS. 2-5-A and 2-5-B are graphs illustrating the relationship between the amount of supplied power to the first and second phase shifters versus the equivalent refractive index difference in TE polarized light and TM polarized light between first and second connecting optical waveguides in the optical circuit device of the preferred embodiment 2-1.

FIG. 2-6 is a graph illustrating the relationship between the predetermined insertion loss in the first and second phase shifters and the amount of supplied power to the first and second phase shifters in the optical circuit device of the preferred embodiment 2-1.

FIG. 2-7 is a graph illustrating the relationship between the predetermined optical attenuation and the measured optical attenuation and PDL in the optical circuit device of the preferred embodiment 2-1.

FIGS. 2-8-A and 2-8-B are structural diagrams illustrating a primary portion of a preferred embodiment 2-2 of the optical circuit device according to the present invention.

FIGS. 2-9-A and 2-9-B are structural diagram illustrating a primary portion of a preferred embodiment 2-3 of the optical circuit device according to the present invention.

FIGS. 2-10-A to 2-10-F are explanatory views illustrating manufacturing steps of the optical circuit device of the preferred embodiment 2-3.

FIGS. 2-11-A to 2-11-C are structural diagrams illustrating a primary portion of a preferred embodiment 2-4 of the optical circuit device according to the present invention.

FIGS. 2-12-A to 2-12-C are structural diagrams illustrating a primary portion of a preferred embodiment 2-5 of the optical circuit device according to the present invention.

FIGS. 2-13-A and 2-13-B are structural diagrams illustrating a primary portion of a conventional optical circuit device.

FIGS. 2-14-A to 2-14-C are explanatory views for illustrating the phases in the conventional optical circuit device.

FIGS. 2-15-A and 2-15-B are structural diagrams illustrating a primary portion of a conventionally-proposed optical circuit device.

FIGS. 2-16-A to 2-16-C are explanatory views for illustrating the phases in the proposed optical circuit device.

DETAILED DESCRIPTION OF THE INVENTION

Figures 1, 2, 3, 4, 5, 6, 7:
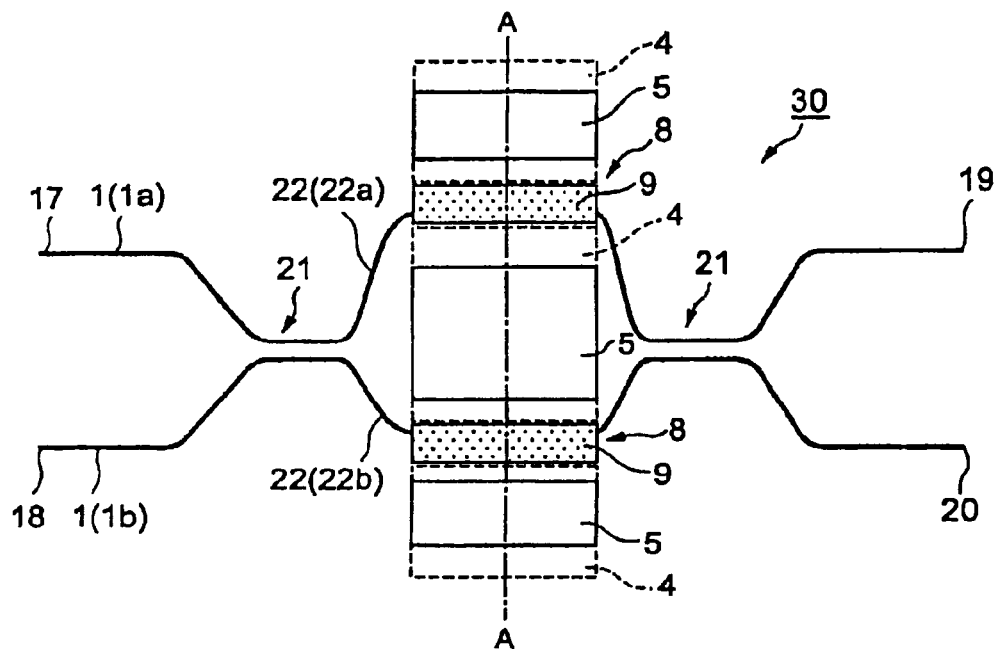
Figures 1, 2, 3, 4, 5, 6, 7, 8:
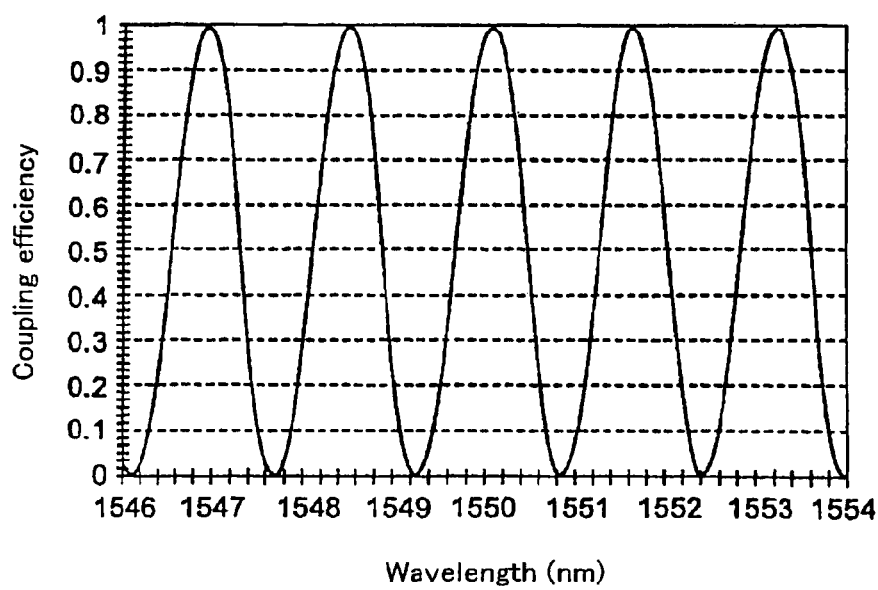
Figures 1, 2, 3, 4, 5, 6, 7, 8, 9:
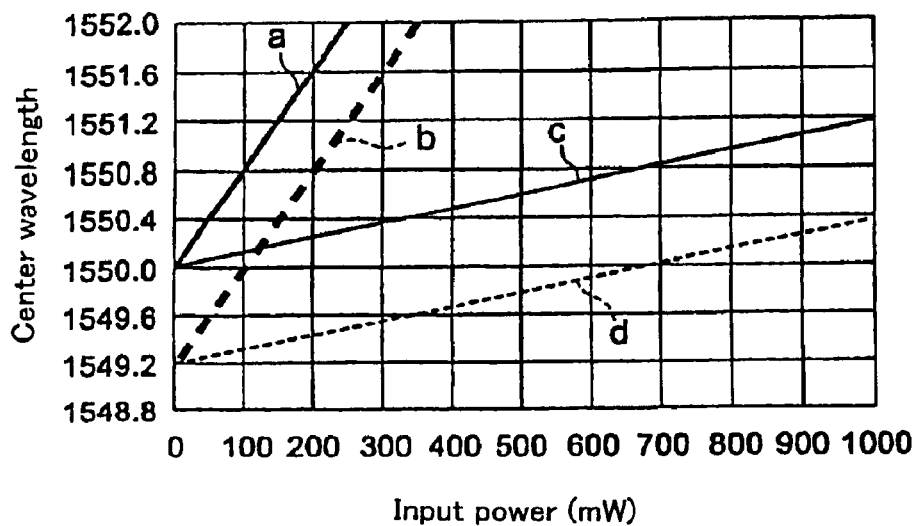
Figures 1, 2, 3, 4, 5, 6, 7, 8, 9, 10:
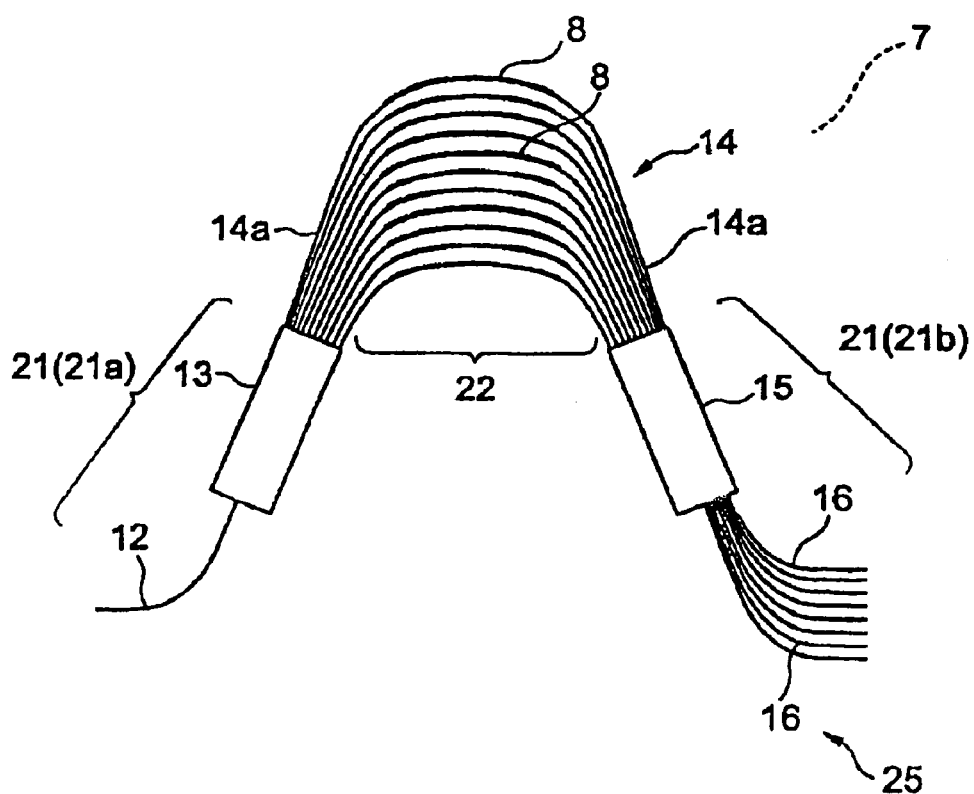
Figures 1, 2, 3, 4, 5, 6, 7, 8, 9, 10, 11, 12:
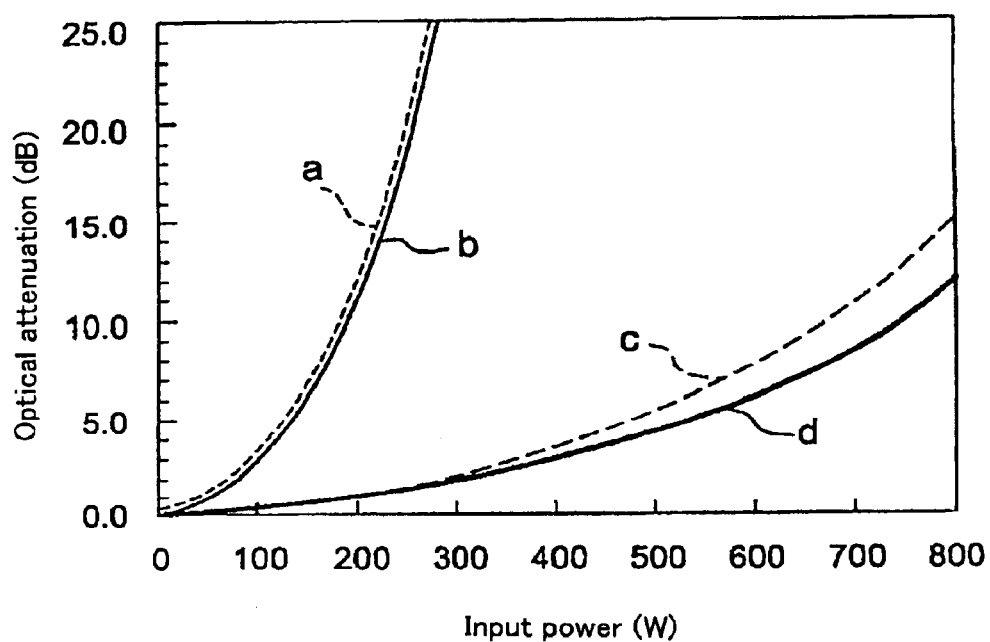
Figures 1, 2, 3, 4, 5, 6, 7, 8, 9, 10, 11, 12, 13:
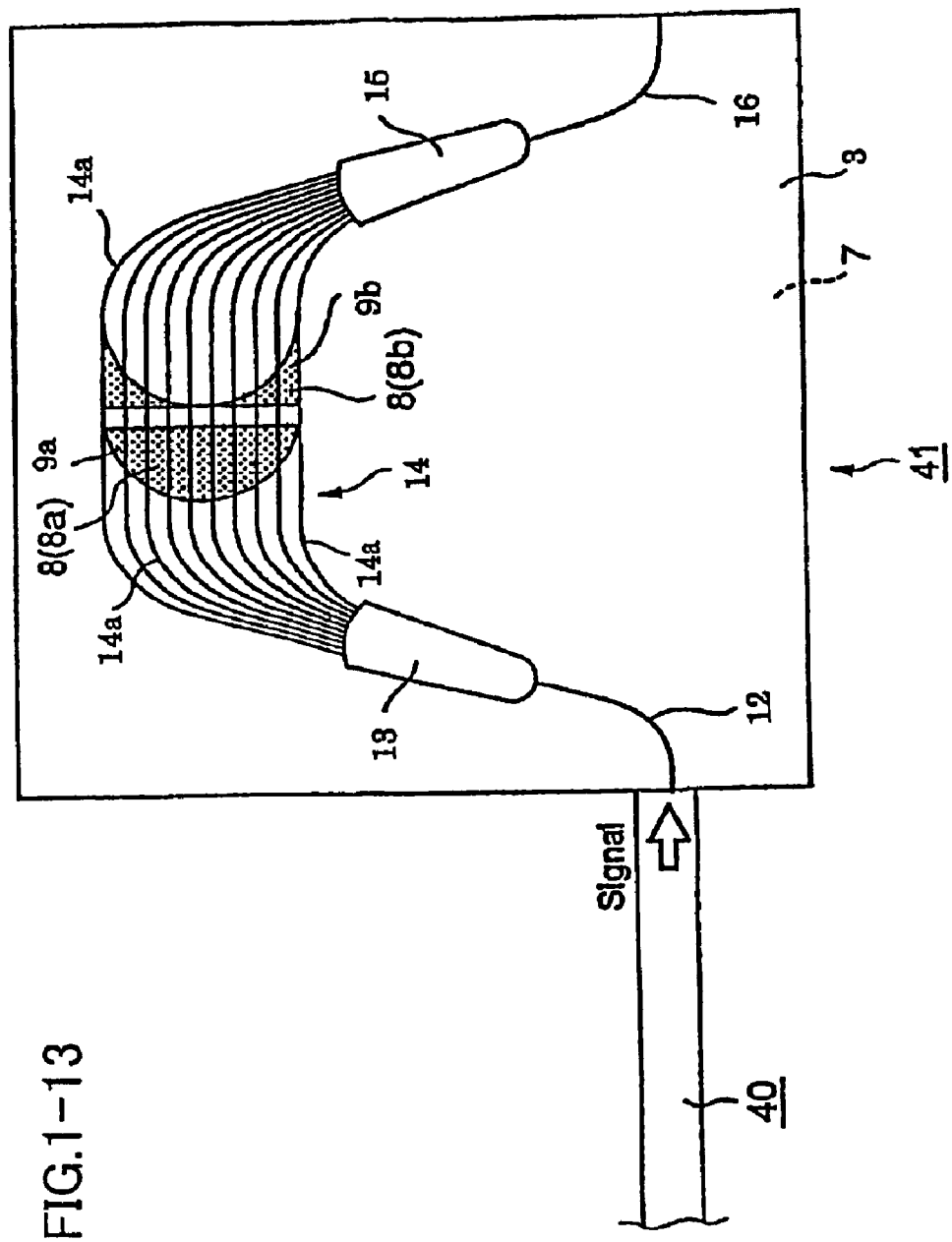
Figures 1, 2, 3, 4, 5, 6, 7, 8, 9, 10, 11, 12, 13, 14:
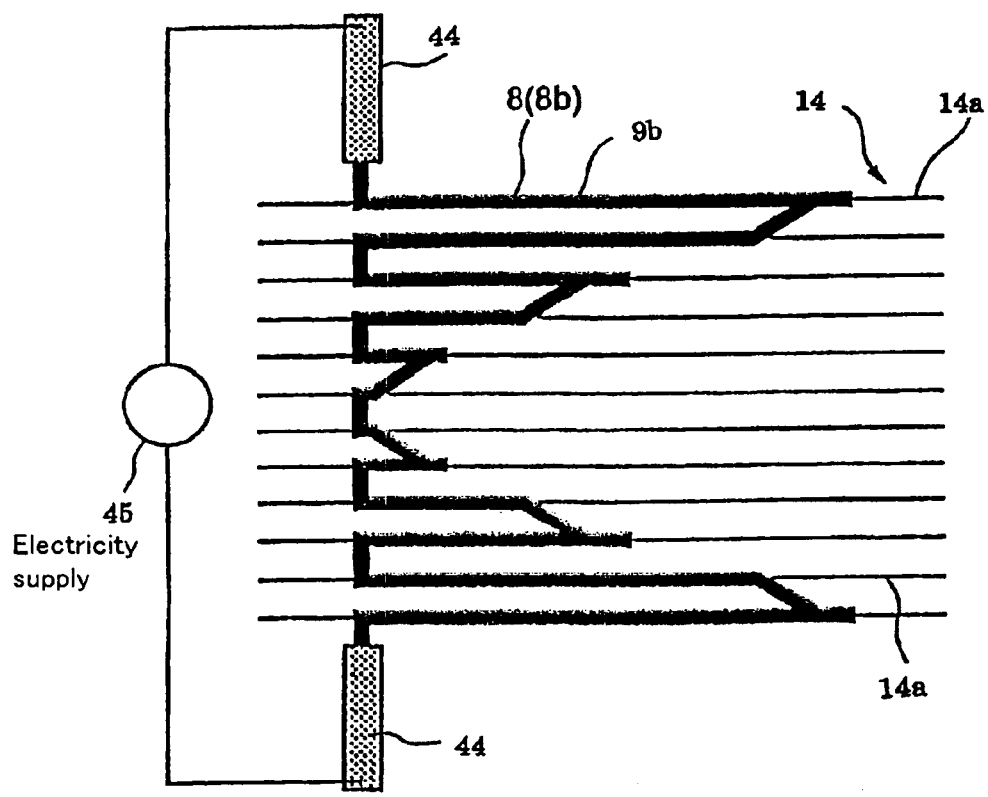
Figures 1, 2, 3, 4, 5, 6, 7, 8, 9, 10, 11, 12, 13, 14, 15:
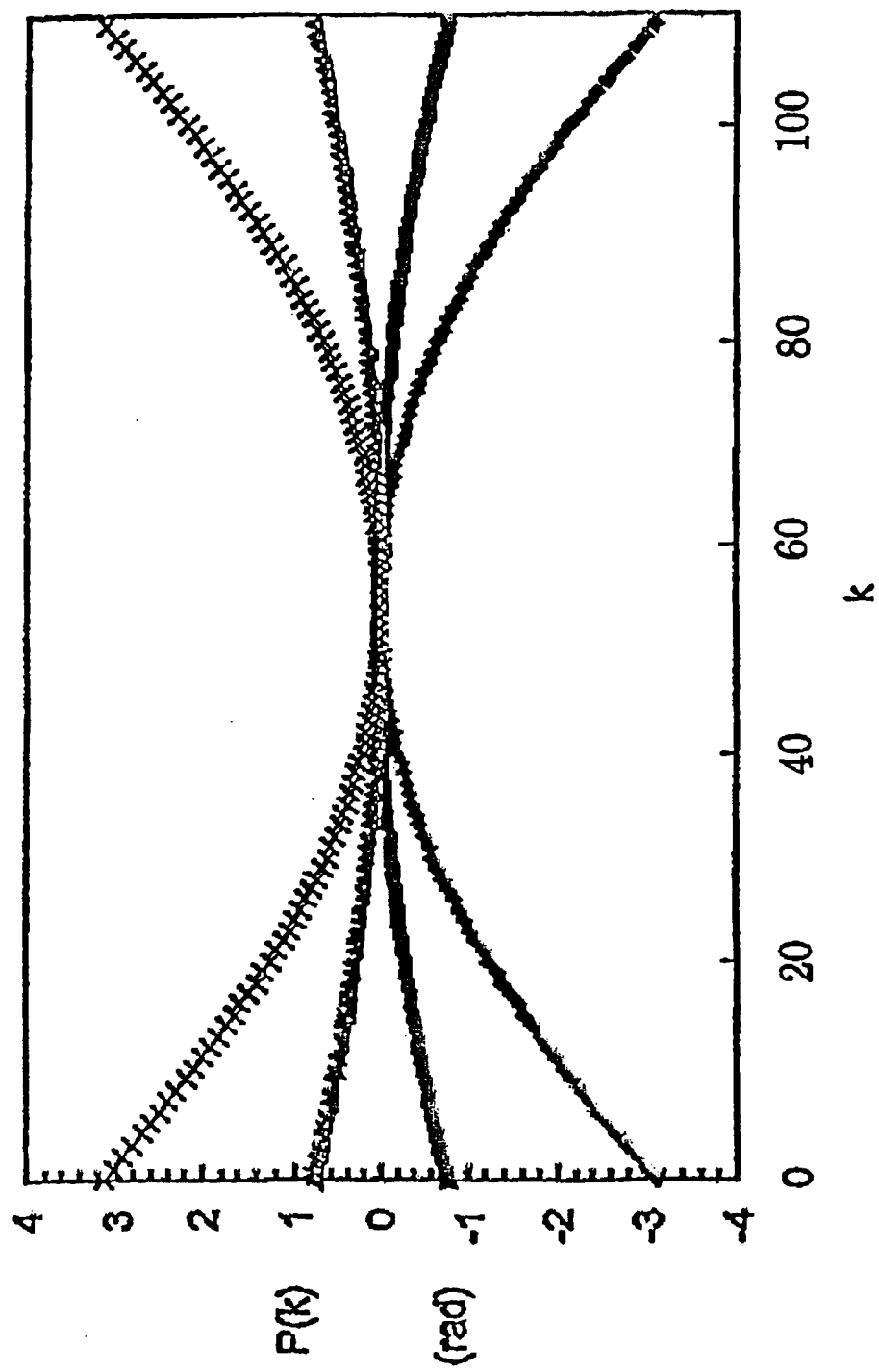
Figures 1, 2, 3, 4, 5, 6, 7, 8, 9, 10, 11, 12, 13, 14, 15, 16:
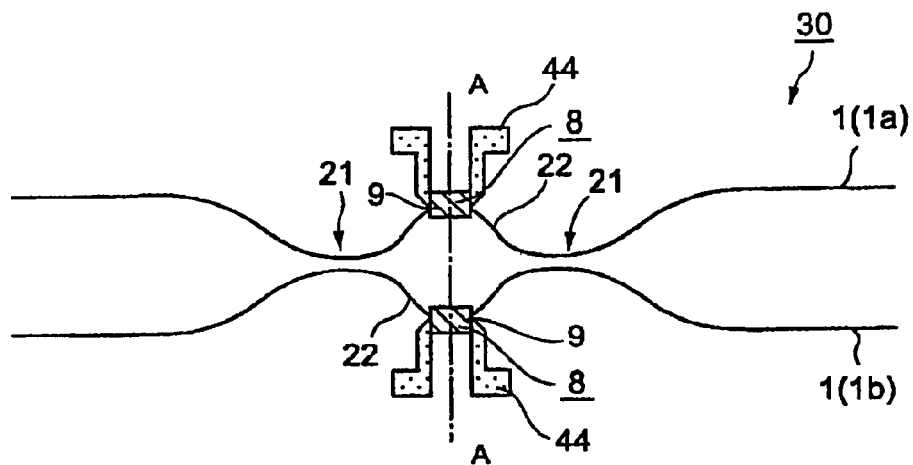
Figures 1, 2, 3, 4, 5, 6, 7, 8, 9, 10, 11, 12, 13, 14, 15, 16, 17:
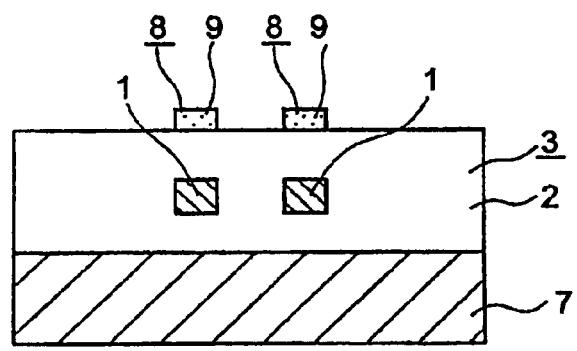
Figures 1, 2, 3, 4, 5, 6, 7, 8, 9, 10, 11, 12, 13, 14, 15, 16, 17, 18:
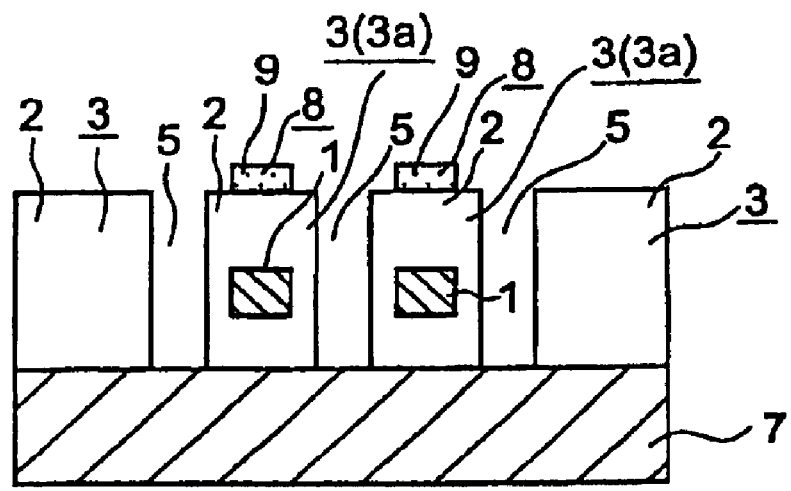
Figures 1, 2, 3, 4, 5, 6, 7, 8, 9, 10, 11, 12, 13, 14, 15, 16, 17, 18, 19:
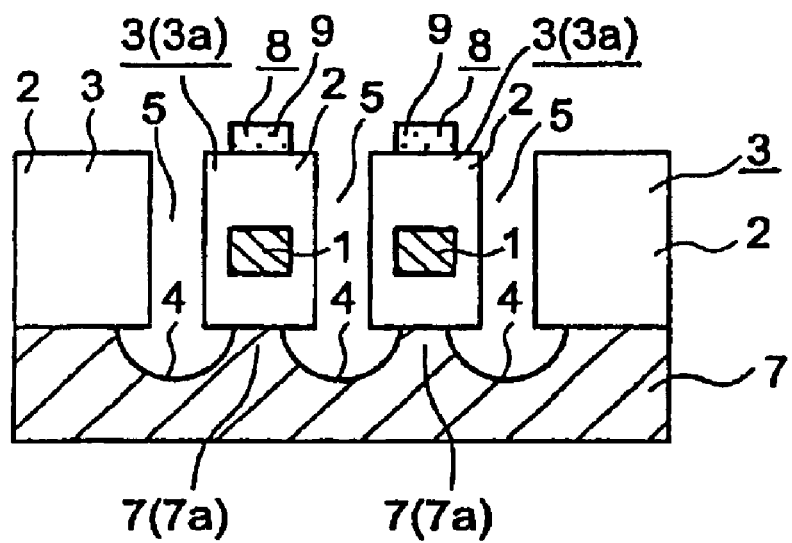
Figures 1, 2, 3, 4, 5, 6, 7, 8, 9, 10, 11, 12, 13, 14, 15, 16, 17, 18, 19, 20:
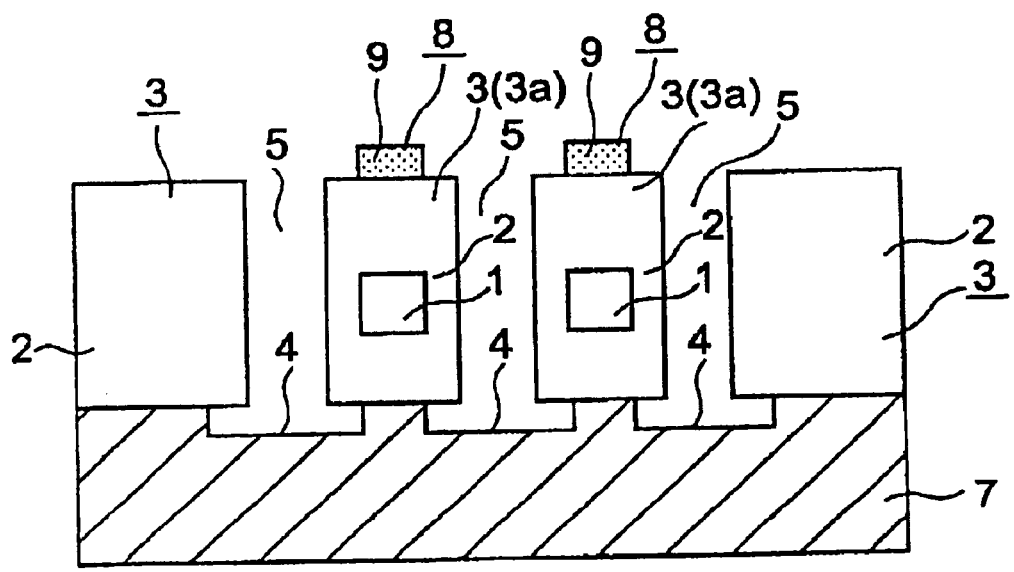
Figures 1, 2, 3, 4, 5, 6, 7, 8, 9, 10, 11, 12, 13, 14, 15, 16, 17, 18, 19, 20, 21:
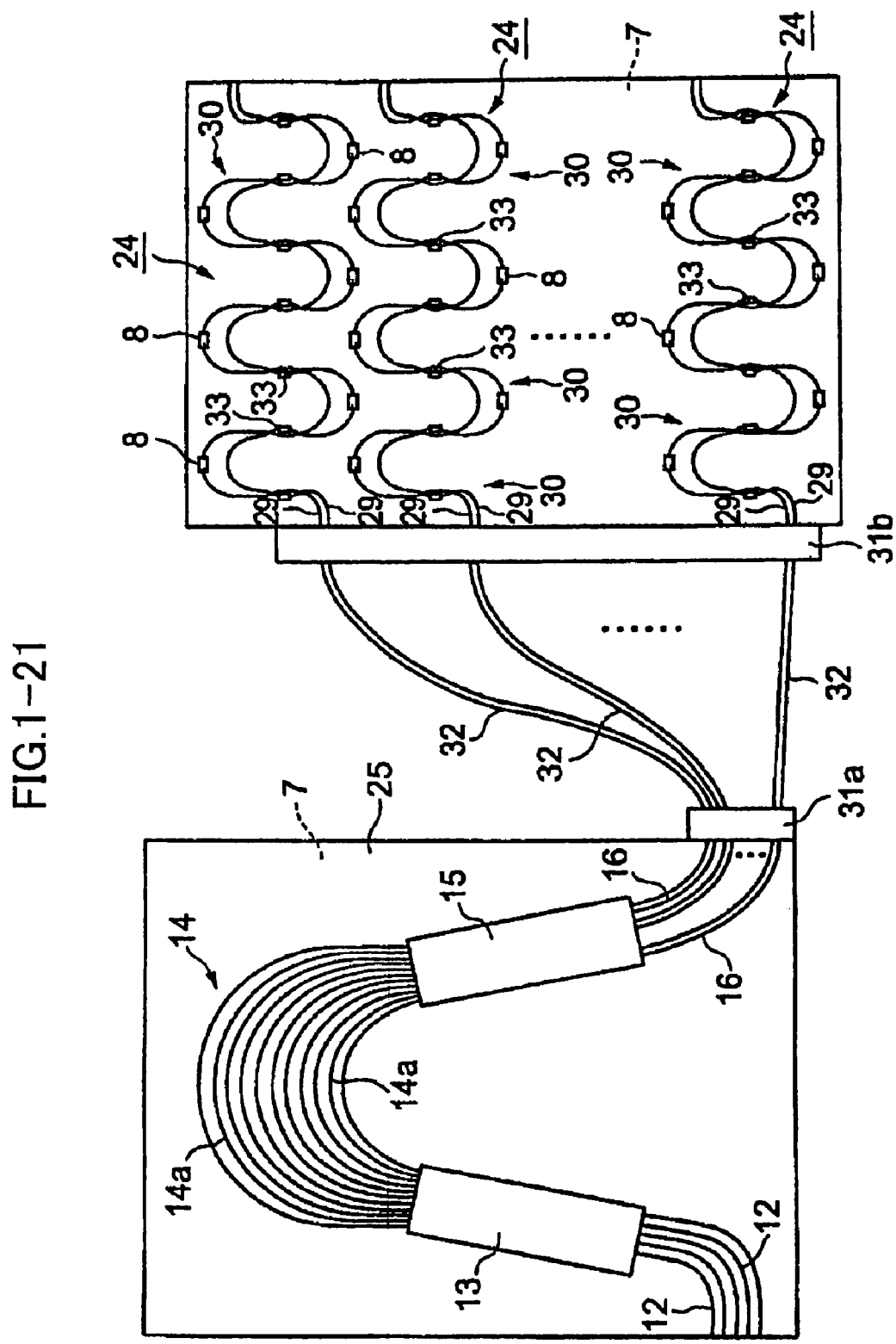
Figures 2, 3, 4, 5, 6:
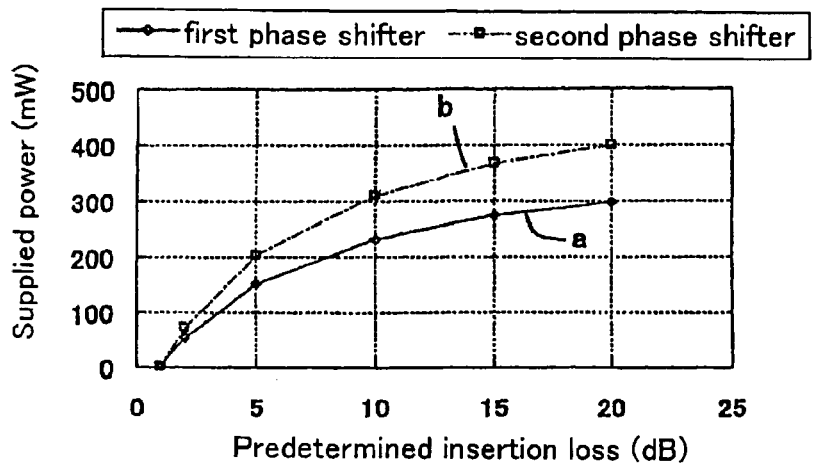
Figures 2, 3, 4, 5, 6, 7:
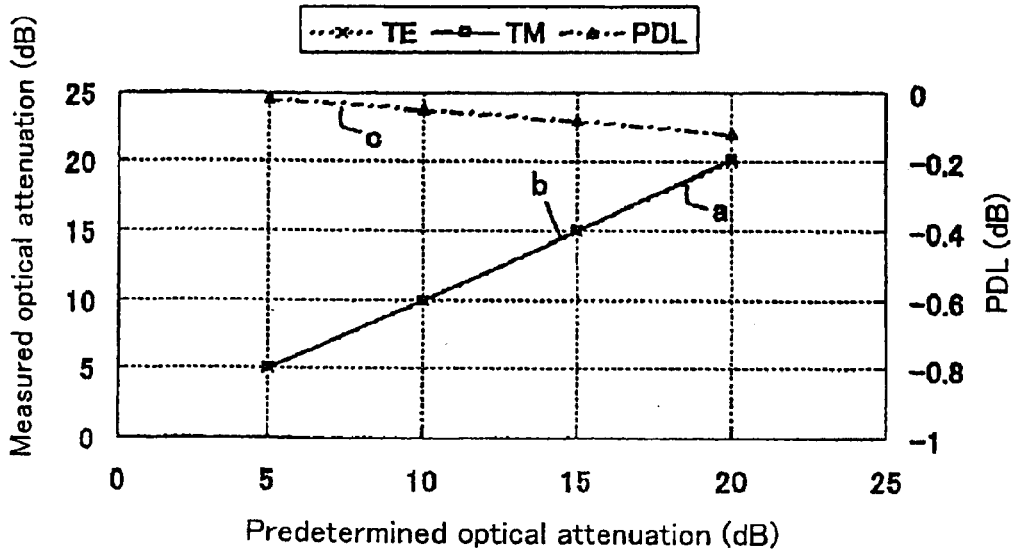

Hereinbelow, preferred embodiments of the present invention are described with reference to the drawings. In the description of the preferred embodiments, same components as those of conventional examples are designated by same reference numerals, and repetitive descriptions are omitted or simplified.

An object o the present invention is to provide an optical circuit and an optical circuit device that have low power consumption and high reliability, exhibit thermooptic effects efficiently, and can be manufactured easily, as well as a manufacturing method of the optical circuit.

It is another object of the present invention is to provide a method for controlling an optical circuit device and an optical circuit device that eliminates polarization dependence of optical attenuations (polarization dependent loss).

For a better understanding of the optical circuit and the optical circuit device as well as the method for manufacturing the optical circuit of the present invention, which are easy to manufacture and highly reliable, analysis of relevant conventional technologies is given below.

In an optical circuit device illustrated in FIG. 1-16, a core 1 of the optical circuit has at least two coupler-forming cores 21 (two cores herein) for performing at least one of splitting and coupling light, and at least two connecting cores 22 for connecting these coupler-forming cores 21 together.

In a Mach-Zehnder interferometer circuit 30, the coupler-forming cores 21 are formed by bringing two juxtaposed cores 1 (1a and 1b) adjacent to each other, and the connecting cores 22 are two juxtaposed cores 1 (1a and 1b) that are spaced apart from each other. In the Mach-Zehnder interferometer circuit 30, the coupler-forming core 21 is a 2×2 optical coupler.

It should be noted that in the optical circuit device shown in FIG. 1-16, a temperature control means 8 for variably controlling the temperature of a portion of the connecting core 22 locally is formed in at lease one of the connecting cores 22 (two cores herein). The temperature control means 8 is formed by, for example, a thin film heater 9. In FIG. 1-16, reference numeral 44 denotes a power supply electrode to the thin film heater 9.

When variably controlling the temperature of a portion of the connecting core 22 by the temperature control means 8 locally, the refractive index of the connecting core 22 that has been subjected to the variable control changes, and the effective refractive index of the core changes in the portion that has been subjected to the change. This utilizes a thermooptic effect, which is the phenomenon that the refractive index of quartz-based glass or the like changes according to temperature, and due to this effect, a change occurs in the phase of the light that propagates in the core in which the refractive index has changed.

Specifically, a phase shifter is constructed by varying the effective optical waveguide length difference between the two connecting cores 22 with a thermooptic effect due to the heat generation of the thin film heater 9, and the transmittance of the Mach-Zehnder interferometer circuit 30 can be varied. Thus, the optical circuit device shown in FIG. 1-16 becomes an optical waveguide-type interferometer capable of varying the light transmittance and optical splitting ratio, which makes it possible to obtain the function of an optical switch, an optical variable attenuator, or the like.

FIG. 1-17 shows a cross-sectional view taken along line A—A of FIG. 1-16, which illustrates a cross-sectional configuration of the conventional optical circuit device having the Mach-Zehnder interferometer circuit 30 and the temperature control means 8. As shown in FIG. 1-17, an optical waveguide layer 3 having the cores 1 and a cladding 2, formed on a silicon substrate 7, has an embedded-type optical waveguide configuration formed of quartz-based glass, and the temperature control means 8 are formed on the surface of the cladding 2 and above the cores 1.

In this configuration, if a current is passed though the temperature control means 8 to heat the core 1 by the thin film heater 9 of the temperature control means 8 via the cladding 2, the effective refractive index of the core 1 increases due to the thermooptic effect. Then, the effective optical path length of the connecting optical waveguide underneath the temperature control means 8 changes, which makes it possible to change the phase of the propagating light.

Since the temperature coefficient with the refractive index dn/dT of quartz-based glass is about $10^{-5}$ (1/° C.), the effective optical path length can be varied about 1 μm by increasing the temperature of the core 1 by 20° C. across the length of 5 mm, for example.

Nevertheless, the above-described phase shifter utilizing the thermooptic effect has the following problems. First, since the heat generated by the temperature control means 8 dissipates in the cladding 2 and the silicon substrate 7 near the core 1, the efficiency in beating is poor. Second, an anisotropic internal stress caused in the optical waveguide layer 3 due to heat brings about birefringence in the optical waveguide layer 3, leading to the problem that the propagation characteristics of the light propagating in the core 1 has a large polarization dependence.

The cross-sectional configuration shown in FIG. 1-18 illustrates the foregoing previously-proposed optical circuit device with the cross-sectional configuration of FIG. 1-16 taken along line A—A, in which the optical waveguide layer 3 is removed from regions on both sides of the thin film heater 9 of the temperature control means 8 along the temperature control means 8 to form optical waveguide layer-removed portions 5. The above-noted birefringence is reduced by forming the optical waveguide layer-removed portions 5 serving as stress-releasing grooves. The optical waveguide layer-removed portions 5 are formed so as to be spaced apart from the cores 1.

In the configurations illustrated in FIGS. 1-19 and 1-20, the optical waveguide layer 3 is removed from regions on both sides of the temperature control means 8 along the thin film heaters 9, and additionally, recessed portions 4 are formed in the surface of the silicon substrate 7 side by removing the silicon substrate 7 from regions facing the optical waveguide layer-removed portions 5 by etching. In these configurations as well, the optical waveguide layer-removed portions 5 are formed so as to be spaced apart from the cores 1.

The recessed portion 4 is formed to include the entire region facing the bottom part of the optical waveguide layer-removed portion 5 and to be wider than the width of the optical waveguide layer-removed portion 5, extending under the core 1 side. With this configuration, the lower surface of the region of the optical waveguide layer 3 (3a) including the core 1 on which the temperature control means 8 is formed is partially exposed.

In each of the configurations illustrated in FIGS. 1-19 and 1-20, the recessed portions 4 are formed in the silicon substrate 7 facing the optical waveguide layer-removed portions 5. Thereby, the optical waveguide layer 3a is separated from the silicon substrate 7, or the contact area between the optical waveguide layer 3a and the silicon substrate 7 is reduced, to suppress heat dissipation toward the silicon substrate 7. Thus, power consumption is reduced.

This optical circuit device is such that lattice-type filters 24 each in which a plurality of Mach-Zehnder interferometer circuits 30 are connected in series are connected to respective output terminals of an arrayed waveguide diffraction grating 25 via connecting fibers 32.

A phase unit of each of the Mach-Zehnder interferometer circuits 30 that form a lattice-type filter 24 is provided with the temperature control means 8. In addition, a variable coupler 33 is provided for each connection portion between the Mach-Zehnder interferometer circuits 30 adjacent to each other.

The arrayed waveguide diffraction grating 25 has at least one (more than one herein) optical input waveguide 12, a first slab waveguide 13 connected to the output side of the optical input waveguide 12, an arrayed waveguide 14 connected to the output side of the first slab waveguide 13, a second slab waveguide 15 connected to the output side of the arrayed waveguide 14, and a plurality of optical output waveguides 16 connected to the output side of the second slab waveguide 15.

The arrayed waveguide 14 is composed of a plurality of juxtaposed channel waveguides 14a whose lengths are different by predetermined amounts (ΔL). It should be noted that, generally, the number of the channel waveguides 14a provided to form the arrayed waveguide 14 is a large number, for example 100, but in FIG. 1-21, the numbers of the channel waveguides 14a, the optical output waveguides 16, and the optical input waveguides 12 are reduced for simplicity of the drawing.

Each one of the connecting fibers 32 is connected to a corresponding one of the optical output waveguides 16 of the arrayed waveguide diffraction grating 25 at one end, and to a corresponding one of the optical input waveguide 29 of the lattice-type filter 24 at the other end, via optical fiber arrays 31a and 31b.

As described above, the configurations as illustrated in FIGS. 1–18, 1-19, and FIG. 1-20 have been proposed as optical circuit configurations in an optical circuit device that can efficiently utilize thermooptic effects; however, the configuration as illustrated in FIG. 1-18, proposed by Inoue et al., is insufficient in terms of reducing power consumption.

Meanwhile, the configuration proposed by Sugita et al., as illustrated in FIG. 1-19, can reduce power consumption sufficiently; however, because the silicon substrate 7 is removed by isotropic etching, the portion from which the silicon substrate 7 has been removed results in a semicircular shape.

For this reason, with the configuration of FIG. 1-19, even if the width of the contact area between the optical waveguide layer 3 and the silicon substrate 7 is narrowed, the width thereunder remains to be wider and the thermal conductivity becomes high. Therefore, in order to obtain a greater power consumption-reducing effect, it is necessary to narrow the width of the contact area between the optical waveguide layer 3 and the silicon substrate 7 to a great extent.

Moreover, in the configuration of FIG. 1-19, the side etch amount is difficult to control with isotropic etching; specifically, it is difficult to control the width of the portion of the silicon substrate 7 that is left unetched (Si-Base), that is, the width of the silicon substrate 7 (7a) that is left under the lower side of the core 1 under the portion on which the temperature control means 8 is formed, which has been a problem in the manufacture. Furthermore, in the configuration of FIG. 1-19, even when the silicon substrate 7 and the optical waveguide layer 3 are completely separated, the portions from which the silicon substrate 7 has been removed have uneven shapes, leading to a problem in reliability.

On the other hand, in the configuration proposed by Sugita et al, as illustrated in FIG. 1-20, the recessed portions 4 have a rectangular cross-sectional shape; therefore, the silicon substrate 7 (7a) that has been left under the lower side of the core 1 under the portion on which the temperature control means 8 is formed results in a substantially rectangular cross-sectional shape having substantially an equal width to the width of the contact area between the silicon substrate 7a and the optical waveguide layer 3. Consequently, it has good thermal insulation properties, and moreover, it is easy to obtain reproducibility in the shape.

Nevertheless, Sugita et al. do not disclose the details of the method of forming the recessed portions 4 and the crystal planes of the configuration illustrated in FIG. 1-20 in the previously-noted reference. The present inventors have conceived that it is necessary to propose a configuration by which the cross-sectional configuration as illustrated in FIG. 1-20 can be formed accurately and with good reproducibility.

FIG. 1-1 illustrates the configuration of a primary portion of a preferred embodiment 1-1 of an optical circuit according to the present invention. FIG. 1-1-A is a schematic view illustrating the planar configuration of the optical circuit of the present embodiment, and FIG. 1-1-B is a schematic view illustrating a cross section taken along line A—A of FIG. 1-1-A.

As illustrated in these figures, the optical circuit of the preferred embodiment 1-1 has a silicon substrate 7, an optical waveguide layer 3 having a core 1 and a cladding 2 formed on the silicon substrate 7, and a temperature control means 8 that is formed on the optical waveguide layer 3 and is for controlling the temperature of a portion of the core 1 locally. The temperature control means 8 is composed of a thin film heater 9, and a power supply line, which is not shown in the figure, and a power supply means (not shown) for supplying electric power to the thin film heater 9 through the power supply line are connected to the thin film heater 9.

The optical waveguide layer 3 on both sides sandwiching the portion on which the temperature control means 8 is formed is removed from the regions spaced apart from the core 1 along the longitudinal direction of the core 1, from the surface of the optical waveguide layer 3 to the surface of the silicon substrate 7, to form optical waveguide layer-removed portions 5. In addition, recessed portions 4 having a rectangular cross-sectional shape are provided in the surface portion of the silicon substrate 7 including the entire region facing the underneath of the optical waveguide layer-removed portions 5.

A characteristic feature of the present embodiment is that: a surface of the silicon substrate 7 is formed of a silicon (100) crystal plane; a side face of the recessed portion 4 that is formed along the longitudinal direction of the core 1 is formed of a silicon (100) crystal plane substantially perpendicular to the surface of the silicon substrate 7; and a bottom face of the recessed portion 4 is formed of a silicon (100) crystal plane substantially parallel to the surface of the silicon substrate 7.

In the present embodiment, the width of the optical waveguide layer 3a that is under the thin film heater 9 is 50 μm, and the width of the silicon substrate 7a that is under the optical waveguide layer 3a is 10 μm. In FIG. 1-1-B, the dimension of the core 1 is exaggerated.

Hereinafter, a method of manufacturing an optical circuit of the present embodiment is discussed. First, as shown in FIG. 1-2-A, a single crystal silicon substrate 7 is prepared having a (100) crystal plane as its surface, and as shown in FIG. 1-2-B, an undercladding layer 2a is formed on this silicon substrate 7 using a frame hydrolysis deposition method (FHD method).

Next, as shown in FIG. 1-2-C, a core layer 11 is formed on the undercladding layer 2a. $GeO_2$ is added to the core layer 11 so that the refractive index of the core layer 11 is 0.8% higher than that of the undercladding layer 2a. Next, as shown in FIG. 1-2-D, cores 1 are patterned by photolithography and dry etching so that a portion of the optical waveguide (core 1) on which the thin film heater 9 is formed is aligned with a (100) plane perpendicular to the surface of the silicon substrate 7. Thereafter, as shown in FIG. 1-2-E, an overcladding layer 2b is formed using a FHD method to bury the core 1, thus forming an optical waveguide layer 3.

Next, as shown in FIG. 1-2-F, Ni thin film heaters 9 having a length of 5 mm, a width of 30 μm, and a film thickness of 0.5 μm are formed on the optical waveguide layer 3 along the cores 1, using a sputtering method and a liftoff method. In this case, a Ti film having a film thickness of 0.1 μm is formed under the Ni film to improve the adhesiveness between the Ni film and the optical waveguide layer 3. Next, power supply lines (not shown) formed of three layers of Ti/Ni/Au are formed in a similar manner.

Next, as shown in FIG. 1-2-G, the optical waveguide layer 3 on both sides of the thin film heaters 9 is removed by photolithography and dry etching in rectangular shapes parallel to the thin film heaters 9, to form portions from which the optical waveguide layer 3 is removed (optical waveguide layer-removed portions 5).

Next, as shown in FIG. 1-2-H, the surface side of the silicon substrate 7 is etched by anisotropic etching using an aqueous solution of potassium hydroxide, to form recessed portions 4 having a rectangular cross-sectional shape in the surface portion of the silicon substrate 7 including the entire regions facing the underneath of the optical waveguide layer-removed portions 5. The recessed portions 4 are formed so that its width orthogonal to the longitudinal direction of the temperature control means 8 is wider than the optical waveguide layer-removed portion 5. Accordingly, by forming the recessed portion 4, part of the bottom surface of the optical waveguide layer 3 is exposed.

When the surface of the silicon substrate 7 is a silicon (100) crystal plane and anisotropic wet etching is adopted as described above, the etching of the silicon substrate 7 from the surface toward the bottom and the etching of the silicon substrate 7 under the optical waveguide layer 3 in the direction orthogonal to the longitudinal direction of the temperature control means 8, starting from the region of the silicon substrate 7 facing the optical waveguide layer-removed portion 5, proceed at the same rate.

Thus, the etching of the silicon substrate 7 starting from the surface of the silicon substrate 7 facing the optical waveguide layer-removed portion 5 as a starting point proceeds both sideward and downward at the same rate while maintaining the side wall shape perpendicular to the surface of the silicon substrate 7 and the bottom surface shape parallel to the surface of the silicon substrate 7.

Accordingly, by measuring the etching depth (the depth of the recessed portion 4 formed) from the surface of the silicon substrate 7, the etching length in the direction orthogonal to the longitudinal direction of the temperature control means 8 can be grasped at the same time. Thus, it is possible to adjust the width of the silicon substrate 7 (7a) under the optical waveguide layer 3 on which the temperature control means 8 is formed (the width orthogonal to the longitudinal direction of the temperature control means 8) appropriately.

The optical circuit of the present embodiment is configured as described above. With the optical circuit of the present embodiment, the electric power required for changing the optical path length of propagating light having a wavelength of 1.55 μm by half the wavelength proved to be 100 mW through a measurement.

On the other hand, an optical circuit that has the same optical waveguide configuration and temperature control means 8 as those of the present embodiment but has no optical waveguide layer-removed portion 5 or recessed portion 4 in the silicon substrate 7 was subjected to an electric power measurement in the same manner for comparison; it was proved that an electric power of 700 mW was required.

As discussed above, it was confirmed that the optical circuit of the present embodiment can exhibit the thermooptic effect of the core 1 efficiently at low power consumption.

Additionally, with 20 optical circuits of the present embodiment manufactured by the foregoing manufacture method, the above-noted power consumption values thereof were almost uniform, 100±2 mW; thus, it was confirmed that the optical circuits can be manufactured stably at good yields.

Next, a preferred embodiment 1-2 of the optical circuit according to the present invention is described. An optical circuit of the preferred embodiment 1-2 is configured in a similar manner to the optical circuit of the preferred embodiment 1-1, as shown in FIG. 1-3. In the description of the optical circuit of the preferred embodiment 1-2, same components as those of the preferred embodiment 1-1 are designated by same reference numerals, and repetitive descriptions are omitted or simplified.

A characteristic feature of the preferred embodiment 1-2 that differs from the foregoing preferred embodiment 1-1 is that the silicon crystal plane that forms the surface of the silicon substrate 7 and the recessed portion 4 are made as follows. Specifically, as shown in FIG. 1-3, in the optical circuit of the preferred embodiment 1-2, a surface of the silicon substrate 7 is formed of a silicon (111) crystal plane; a side face of the recessed portion 4 formed along the longitudinal direction of the core 1 is formed of a silicon (110) crystal plane substantially perpendicular to the surface of the silicon substrate 7; and a bottom face of the recessed portion 4 is formed of a silicon (111) crystal plane substantially parallel to the surface of the silicon substrate 7.

Hereinbelow, a method of manufacturing the optical circuit of the preferred embodiment 1-2 is described. First, as shown in FIG. 1-4-A, a single crystal silicon substrate 7 is prepared having a (1111) crystal plane as its surface, and as shown in FIGS. 1-4-B and 1-4-C, an undercladding layer 2a and a core layer 11 are successively formed on the silicon substrate 7 in a similar manner to the preferred embodiment 1-1.

Next, as shown in FIG. 1-4-D, cores 1 are patterned by photolithography and dry etching so that the portion of the core 1 on which the thin film heater 9 is formed is aligned with a (110) plane perpendicular to the surface of the silicon substrate 7. Thereafter, as shown in FIG. 1-4-E, the overcladding layer 2b is formed using a FHD method to bury the cores 1, thus forming an optical waveguide layer 3.

Next, as shown in FIGS. 1-4-F and FIG. 1-4-G, the formation of thin film heaters 9 and the removal of the optical waveguide layer 3 from both sides of the thin film heaters 9 are performed in a similar manner to the preferred embodiment 1-1.

Next, as shown in FIG. 1-4-H, the silicon substrate 7 that is under the optical waveguide layer-removed portions 5 is removed by anisotropic dry etching to form recessed portions 4. It should be noted that this etching of the silicon substrate 7 is carried out so that only the region of the silicon substrate 7 facing the optical waveguide layer-removed portion 5 is removed substantially perpendicularly to the surface of the silicon substrate 7.

Next, as shown in FIG. 1-4-I, the surface side of the silicon substrate 7 is etched toward the lower sides of the optical waveguide layer 3a having the cores 1 by anisotropic etching using an aqueous solution of potassium hydroxide so that the recessed portions 4 extend to the lower sides of the optical waveguide layer 3.

As described above, the side faces of the recessed portion 4 that are formed along the longitudinal direction of the core 1 are formed of a silicon (110) crystal plane; the bottom face of the recessed portion 4 is formed of a silicon (111) crystal plane substantially parallel to the surface of the silicon substrate 7; and anisotropic dry etching and anisotropic wet etching of the silicon substrate 7 are employed as the formation method of the recessed portion 4. Consequently, the following advantageous effects are attained.

Specifically, the etching rate for the (110) crystal plane of the silicon substrate 7 by an alkaline solution is from several ten times to several hundred times that of the etching rate for the (111) crystal plane. For this reason, if the silicon substrate-removed portion having nearly the same planar shape as that of the optical waveguide layer-removed portion 5 is formed by anisotropic dry etching as shown in FIG. 1-4-H and thereafter anisotropic wet etching by an alkaline solution is carried out as shown in FIG. 1-4-I, the etching of the recessed portion 4 in the bottom surface direction and the etching thereof in the side face directions can be controlled easily, and thus, desired recessed portions 4 can be formed.

The optical circuit of the preferred embodiment 1-2 is configured as described above, and it can exhibit similar advantageous effects to those of the optical circuit of the foregoing preferred embodiment 1-1.

Next, a preferred embodiment 1-1 of an optical circuit device according to the present invention is described. In the description of the optical circuit device of the preferred embodiment 1-1, same components as those of the preferred embodiment 1-1 are designated by same reference numerals, and repetitive descriptions are omitted or simplified.

The optical circuit device of the preferred embodiment 1-1 has a Mach-Zehnder interferometer circuit 30 having a planer configuration illustrated in FIG. 1-5-A, in which a temperature control means 8 is formed for both of connecting cores 22 for connecting coupler-forming cores 21 with each other. Also, the optical circuit device of the preferred embodiment 1-1 has a cross-sectional configuration illustrated in FIG. 1-5-B. FIG. 1-5-B is a cross-sectional view taken along line A—A of FIG. 1-5-A.

As shown in FIG. 1-5-B, the optical circuit device of the present embodiment is formed applying the configuration of the optical circuit of the foregoing preferred embodiment 1-1. Specifically, a temperature control means 8 is formed along a portion of the core 1, an optical waveguide layer-removed portions 5 is formed on either side of the temperature control means 8, and further, a recessed portion 4 having a rectangular cross-sectional shape is provided in the surface portion of the silicon substrate 7 including the entire region facing the bottom part of the optical waveguide layer-removed portion 5. The configuration of the recessed portions 4 also adopts the configuration of the optical circuit of the foregoing preferred embodiment 1-1.

In the optical circuit device of the preferred embodiment 1-1, a phase shifter is formed by forming the temperature control means 8 for the connecting cores 22. In addition, a variable optical attenuation-controlling unit (not shown) is connected to the temperature control means 8; the variable optical attenuation-controlling unit controls the temperature of the temperature control means 8 to cause a temperature difference between the connecting cores 22a and 22b and to thereby cause a refractive index difference due to the thermooptic effect, whereby the interference state of propagating light is changed between the cores 1a and 1b to vary the intensity of at least one predetermined wavelength light. Thus, the optical circuit device of the preferred embodiment 1-1 is configured to be an optical variable attenuator.

It should be noted that in the Mach-Zehnder interferometer circuit 30 that forms the optical circuit device of the preferred embodiment 1-1, the length difference ΔL of the connecting cores 22 in the cores 1 (1a and 1b) is designed to be zero so that, when electric power is not supplied to the temperature control means 8, the attenuation of light that is input from an incident side 17 of the core 1 (1a) and is output from the emitting side 20 of the core 1 (1b) results in almost zero excluding the waveguide loss and the connection loss with an optical fiber.

The optical circuit device of the preferred embodiment 1-1 is configured as described above. TE polarized light and TM polarized light having a wavelength of 1.55 μm were input to the optical circuit device of the present embodiment, and the attenuation of the light and the difference due to the polarized wave of the optical attenuation were measured.

Specifically, the above-noted polarized light was input from the incident side 17 of the core 1 (1a) and was output from the emitting side 20 of the core 1 (1b), and the input power input into the temperature control means 8, the attenuation of the above-noted polarized light, and the difference in optical attenuation due to polarized wave were measured, as shown in FIG. 1-6-A. A characteristic curve a represents the optical attenuation of TE polarized light, a characteristic curve b represents the optical attenuation of TM polarized light, and a characteristic curve c represents the difference in optical attenuation due to polarized wave.

For comparison, a similar measurement was carried out for an optical circuit device that has a similar optical waveguide configuration to that of the optical circuit device of the preferred embodiment 1-1 and the temperature control means 8 but does not have optical waveguide layer-removed portions 5 or recessed portions 4 in the silicon substrate 7. The results are represented by characteristic curves a to c in FIG. 1-6-B, as in FIG. 1-6-A.

As will be clearly seen from these characteristic curves, the variable optical attenuator of the comparative example requires about 600 mW to obtain an optical attenuation of 10 dB, and the difference in optical attenuation due to polarized wave occurring at that time is as large as about 2.5 dB. By contrast, the optical circuit device of the preferred embodiment 1-1 makes it possible to obtain an optical attenuation of 10 dB only with an electric power of 75 mW. Moreover, the difference in optical attenuation due to polarized wave is remarkably suppressed to 0.2 dB.

As discussed above, the optical circuit device of the preferred embodiment 1-1 makes it possible to exhibit the thermooptic effect of the core 1 efficiently at low power consumption and to obtain a desired optical attenuation efficiently. Moreover, the optical circuit device of the present embodiment can reduce the optical attenuation difference due to polarized wave to a very small amount.

Additionally, with 20 optical circuit devices of the preferred embodiment 1-1 manufactured by the above-described manufacture method, the power consumption at a 10 dB optical attenuation was almost uniform, 75±1 mW, and the polarization dependence was also almost uniform, 0.2±0.03 dB; thus, it was confirmed that the optical circuits can be manufactured stably at good yields. That is, the present embodiment makes it possible to attain a variable optical attenuator that achieves low power consumption and low polarization dependence and is manufacturable stably.

Next, a preferred embodiment 1-2 of the optical circuit device according to the present invention is described. The optical circuit device of the preferred embodiment 1-2 is configured almost in a similar manner to the foregoing optical circuit device of the preferred embodiment 1-1. In the description of the optical circuit device of the preferred embodiment 1-2, same components as those of the preferred embodiment 1-1 are designated by same reference numerals, and repetitive descriptions are omitted or simplified.

The optical circuit device of the preferred embodiment 1-2 has a similar optical waveguide configuration and temperature control means 8 to those of the preferred embodiment 1-1 shown in FIG. 1-5-A, and its cross-sectional configuration is also similar to the configuration shown in FIG. 1-5-B.

A characteristic feature of the optical circuit device of the preferred embodiment 1-2 that differs from the optical circuit device of the foregoing preferred embodiment 1-1 is that an optical switch control section (not shown) is provided that controls the temperature of the temperature control means 8 so as to cause a temperature difference between the connecting cores 22a and 22b and thereby to cause a refractive index difference due to the thermooptic effect, whereby the interference state of propagating light is changed between the cores 1a and 1b to vary at least one output section of predetermined wavelength light. Thus, having this optical switch control section, the optical circuit device of the preferred embodiment 1-2 functions as an optical switch.

The optical circuit device of the preferred embodiment 1-2 is configured as described above. An optical switch of an optical circuit device of a comparative example was formed, which has a similar optical waveguide configuration and temperature control means 8 to those of the optical circuit device of the preferred embodiment 1-2 but does not have the optical waveguide layer-removed portions 5 or the recessed portions 4 in the silicon substrate 7. A comparison in switching power was made between the optical switch of the comparative example and the optical circuit device of the preferred embodiment 1-2.

As a result, the optical circuit device of the comparative example showed a switching power of about 750 mW; by contrast, the optical circuit device of the preferred embodiment 1-2 showed a switching power of about 100 mW. Thus, remarkable reduction in switching power was achieved.

Next, a preferred embodiment 1-3 of the optical circuit device according to the present invention is described. The optical circuit device of the preferred embodiment 1-3 is configured almost in a similar manner to the foregoing optical circuit device of the preferred embodiment 1-1. In the description of the optical circuit device of the preferred embodiment 1-3, same components as those of the preferred embodiment 1-1 are designated by same reference numerals, and repetitive descriptions are omitted or simplified.

The optical circuit device of the preferred embodiment 1-3 has, as shown in FIG. 1-7, a Mach-Zehnder interferometer circuit 30, and the connecting cores 22 are formed to have different lengths from each other. In the Mach-Zehnder interferometer circuit 30, the product $n_c \Delta L$ of length difference $\Delta L$ between the two connecting cores 22 by the effective refractive index $n_c$ of the connecting cores 22 is determined to have an optical multiplexing/demultiplexing function at about 0.8 nm intervals in the 1550 nm wavelength band.

That is, $\Delta L$ is determined to be 1035.5 µm so that it results in an integral multiple of the wavelength $\lambda 1$ of the light that is input from the incident side 17 of the core 1 (1a) and output from the emitting side 20 of the core 1 (1b) and half an integer multiple of the wavelength $\lambda 2$ of the light that is input from the incident side 17 of the core 1 (1a) and output from the emitting side 19 of the core 1 (1a).

In addition, the preferred embodiment 1-3 is provided with a variable wavelength control section (not shown) that controls the temperature of the temperature control means 8 so as to cause a temperature difference between the connecting cores 22a and 22b and thereby to cause a refractive index difference due to the thermooptic effect, whereby the interference state of propagating light is changed between the cores 1a and 1b to vary at least one wavelength of a multiplexed wave and a demultiplexed wave. Thus, the optical circuit device of the preferred embodiment 1-3 is configured to be a variable wavelength multiplexer/demultiplexer.

It should be noted that, with the Mach-Zehnder interferometer circuit 30 that forms the optical circuit device of the preferred embodiment 1-3, the coupling efficiency of the light that is input from the incident side 17 of the core 1 (1a) and output from the emitting side 20 of the core 1 (1b) has a periodic dependence on wavelength when no electric power is supplied to the temperature control means 8, as seen in FIG. 1-8.

In view of that, changes in supplied electric power (input power) to the temperature control means 8 and in wavelengths $\lambda 1$ and $\lambda 2$ were measured with the optical circuit device of the preferred embodiment 1-3, where the center wavelength of the peak appearing at a wavelength of about 1550 nm, which is convex upward, is defined as $\lambda 1$ and the center wavelength of the peak appearing at a wavelength of about 1549.2 nm, which convex downward, is defined as $\lambda 2$.

For comparison, a similar measurement was carried out with an optical circuit device that has a similar optical waveguide configuration and temperature control means 8 to those of the optical circuit device of the preferred embodiment 1-3 but does not have the optical waveguide layer-removed portions 5 or the recessed portions 4 in the silicon substrate 7.

FIG. 1-9 shows the measurement result of changes in input power to the temperature control means 8 and wavelengths $\lambda 1$ and $\lambda 2$ for the optical circuit device of the preferred embodiment 1-3 and the optical circuit device of the comparative example. A characteristic curve a represents the measurement result of wavelength $\lambda 1$ with the optical circuit device of the preferred embodiment 1-3, and a characteristic curve b represents the measurement result of wavelength $\lambda 2$. Likewise, a characteristic curve c represents the measurement result of wavelength $\lambda 1$ with the optical circuit device of the comparative example, and a characteristic curve d represents the measurement result of wavelength $\lambda 2$.

As will be clear from the comparison between the characteristic curve a and the characteristic curve c, and between the characteristic curve b and the characteristic curve d, the electric power required for shifting the wavelength $\lambda 1$ and the wavelength 12 for one cycle period (about 1.6 mm) was about 1400 mW with the comparative example, but was about 200 mW with the optical circuit device of the preferred embodiment 1-3, and it was confirmed that a considerable reduction is possible.

It should be noted that the above description about the optical circuit device of the preferred embodiment 1-3 was given for an example in which the wavelength multiplexer/demultiplexer was applied for a wavelength demultiplexer, but the optical circuit device of the preferred embodiment 1-3 can be applied for a wavelength multiplexer by appropriately setting the relationship between the waveguide that receives light and the waveguide that outputs light (for example, by inputting lights having wavelengths of λ1 and λ2 from the emitting ends 19 and 20 of the cores 1 (1a and 1b)).

Next, a preferred embodiment 1-4 of an optical circuit device according to the present invention is described. The optical circuit device of the preferred embodiment 1-4 has a similar optical waveguide configuration and temperature control means 8 to those of the optical circuit device shown in FIG. 1-21, and the cross-sectional configuration of the formation region of the temperature control means 8 is configured as shown in FIG. 1-1-A.

The optical circuit device of the preferred embodiment 1-4 is a variable optical dispersion compensator that is provided with a variable dispersion control section (not shown) that controls the temperature of the temperature control means 8 so as to change the refractive index of a portion of the core that has the temperature control means 8, and thereby to control the phase condition of propagating light, whereby a dispersion amount of at least one predetermined wavelength light is varied to reduce the wavelength dispersion of a device to be connected.

The optical circuit device of the preferred embodiment 1-4 was compared with an optical circuit device of the comparative example that has an optical waveguide configuration shown in FIG. 1-21 and temperature control means 8 but does not have the optical waveguide layer-removed portions 5 or the recessed portions 4 in the silicon substrate 7. The dispersion compensating performance was improved as follows.

Specifically, in order to compensate the dispersion value in a 640 km dispersion-shifted optical fiber for 16 wavelength, the comparative example required an electric power of about 20 W, whereas the optical circuit device of the preferred embodiment 1-4 required about 5 W, which was a remarkable reduction in power consumption. Thus, the optical circuit device of the preferred embodiment 1-4 can compensate dispersion values in dispersion-shifted optical fibers efficiently at low power consumption.

FIG. 1-10 illustrates a partially-omitted plane configuration of a preferred embodiment 1-5 of the optical circuit device according to the present invention. The optical circuit device of the preferred embodiment 1-5 has a waveguide configuration of an arrayed waveguide diffraction grating 25 and temperature control means 8, and the cross-sectional configuration of the formation region of the temperature control means 8 is a configuration as shown in FIG. 1-1-A. In FIG. 1-10, the configurations of the optical waveguide layer-removed portion 5 and the recessed portion 4 are omitted.

In the optical waveguide configuration of the arrayed waveguide diffraction grating 25 shown in FIG. 1-10, an optical input waveguide 12, a first slab waveguide 13, and the end portion of an arrayed waveguide 14 near the first slab waveguide 13 side together make up a first coupler-forming core 21 (21a) that forms a first optical splitter/coupler.

Likewise, the end portion of the arrayed waveguide 14 near the second slab waveguide 15 side, the second slab waveguide 15, and the optical output waveguide 16 together make up a second coupler-forming core 21 (21b) that forms a second optical splitter/coupler. The arrayed waveguide 14 between the second coupler-forming core 21b and the first coupler-forming core 21a makes up a connecting core 22.

Each of the channel waveguides 14a that form the arrayed waveguide 14 is provided with a temperature control means 8. In addition, a variable wavelength control section (not shown) is provided for varying at least one of the wavelengths of a multiplexed wave and a demultiplexed wave by controlling the temperature of the temperature control means 8, and thus, the optical circuit device of the preferred embodiment 1-5 is configured to be a variable wavelength multiplexer/demultiplexer.

As is well known, the center wavelength λc of the arrayed waveguide diffraction grating formed of a quartz-based glass film on the silicon substrate has a temperature dependence of about 0.011 nm/° C. Therefore, by variably controlling the temperature of the channel waveguide 14a with the temperature control means 8, it can function as a variable wavelength multiplexer/demultiplexer.

In the optical circuit device of the preferred embodiment 1-5, the path length differences between the channel waveguides 14a or the like are determined appropriately so that the frequency spacing is 25 GHz and the center wavelength results in 1545.322 nm when no electricity is supplied.

The input power to the temperature control means 8 and the output spectrum were measured using variable wavelength light of TE polarized light and TM polarized light with the optical circuit device of the preferred embodiment 1-5. The results shown in FIG. 1-11-A were obtained. A similar measurement was carried out with an optical circuit device of the comparative example that has the optical waveguide configuration and temperature control means 8 as shown in FIG. 1-10 but does not have the optical waveguide layer-removed portions 5 or the recessed portions 4 in the silicon substrate 7, and the results as shown in FIG. 1-11-B were obtained.

In these figure, characteristic curves a1, b1, c1, and d1 represent output spectra of TE polarized light, and characteristic curve a2, b2, c2, and d2 represent output spectra of TM polarized light.

In FIG. 1-11-A, the characteristic curves a1 and a2 represent characteristics when the input power to the temperature control means 8 is 0; the characteristic curves b1 and b2 represent characteristics when the input power to the temperature control means 8 is 100 mW; the characteristic curves c1 and c2 represent characteristics when the input power to the temperature control means 8 is 200 mW; and the characteristic curves d1 and d2 represent characteristics when the input power to the temperature control means 8 is 300 mW, respectively.

Similarly, in FIG. 1-11-B, the characteristic curves a1 and a2 represent characteristics when the input power to the temperature control means 8 is 0; the characteristic curves b1 and b2 represent characteristics when the input power to the temperature control means 8 is 1000 mW; the characteristic curves c1 and c2 represent characteristics when the input power to the temperature control means 8 is 2000 mW; and the characteristic curves d1 and d2 represent characteristics when the input power to the temperature control means 8 is 3000 mW, respectively.

As seen in FIG. 1-11-B, the optical circuit device of the comparative example required 2000 mW to obtain a variable wavelength range of 2 channels, that is, about 0.4 nm, and the center wavelength difference due to polarized wave was as large as 0.1 nm. By contrast, as seen in FIG. 1-11-A, the optical circuit device of the preferred embodiment 1-5 attained a variable wavelength range of about 0.4 nm with an electric power of as little as 300 mW, and moreover, the center wavelength difference due to polarized wave was 0.02 nm, achieving a remarkable reduction.

Additionally, 20 optical circuits of the present embodiment were manufactured by the foregoing manufacture method; their power consumptions were 300±3 mW and their polarization dependences were 0.02±0.01 nm for varying the wavelength by 0.4 nm, which were remarkable reductions, and the yield was also good.

Thus, the optical circuit device of the preferred embodiment 1-5 achieved a variable wavelength optical multiplexer/demultiplexer that has low power consumption, low polarization dependence, and a good manufacture yield rate. Therefore, by utilizing the optical circuit device of the preferred embodiment 1-5, various optical circuit devices with a variety of functions, such as variable wavelength light sources and variable wavelength optical add/drop filters, can be manufactured with low power consumption and low polarization dependence stably.

Next, a preferred embodiment 1-6 of an optical circuit device according to the present invention is described. The optical circuit device of the preferred embodiment 1-6 has a similar optical waveguide configuration and temperature control means 8 to the optical circuit device of the preferred embodiment 1-5. A characteristic feature of the preferred embodiment 1-6 that differs from the preferred embodiment 1-5 is that an optical variable attenuation control section (not shown) for varying the intensity of at least one predetermined wavelength light by controlling the temperature of the temperature control means 8 is provided to construct a variable optical attenuator.

In the optical circuit device of the preferred embodiment 1-6, the circuit of the arrayed waveguide diffraction grating 25 is designed to have a channel gap of 25 GHz, and light is output from only one optical output waveguide 16. By changing the temperature of a channel waveguide 14a with a temperature control means 8, the transmitting wavelength spectrum is shifted, and by changing the transmittance of a designed center wavelength, the intensity of a predetermined wavelength light is made variable.

Characteristic curves a and b in FIG. 1-12 represent the relationship between input power to temperature control means 8 and optical attenuation of predetermined wavelength light with the preferred embodiment 1-6. Characteristic curves c and d in FIG. 1-12 represent the relationship between input power to temperature control means 8 and optical attenuation of predetermined wavelength light with an optical circuit device of the comparative example that has a similar optical waveguide configuration and temperature control means 8 to those of the optical circuit device of the preferred embodiment 1-6 but does not have the optical waveguide layer-removed portions 5 or the recessed portions 4 in the silicon substrate 7.

In FIG. 1-12, the characteristic curves a and c represent optical attenuation of TM polarized light whereas the characteristic curves b and d represent optical attenuation of TE polarized light.

As will be clearly seen from the characteristic curves a to d in FIG. 1-12, the optical circuit device of the comparative example requires an input power to the temperature control means 8 of about 700 mW to obtain an optical attenuation of 10 dB, and the optical attenuation difference due to polarized wave at that time is about 2 dB, which is very large. By contrast, the optical circuit device of the preferred embodiment 1-6 requires an input power to the temperature control means 8 of only about 180 mW to obtain an optical attenuation of 10 dB, and the optical attenuation difference due to polarized wave at that time is about 0.5 dB, which is small.

That is, the optical circuit device of the preferred embodiment 1-6 realized a variable optical attenuator that achieves low power consumption and low polarization dependence using the waveguide configuration of the arrayed waveguide diffraction grating 25.

Next, a preferred embodiment 1-7 of an optical circuit device according to the present invention is described. The optical circuit device of the preferred embodiment 1-7 has a similar optical waveguide configuration and temperature control means 8 to the optical circuit device of the preferred embodiment 1-5.

In the preferred embodiment 1-7, the circuit of the arrayed waveguide diffraction grating 25 is designed to have a channel gap of 25 GHz, and it is formed as an optical switch that outputs light from either one of two optical output waveguides 16 by switching. The temperature control means 8 is provided with an optical switch control section (not shown) for varying the output of at least one predetermined wavelength light by controlling the temperature of the temperature control means.

The preferred embodiment 1-7 is configured as described above. Switching power was measured with the optical circuit device of the preferred embodiment 1-7 and with an optical circuit device of the comparative example that has a similar optical waveguide configuration and temperature control means 8 to those of the optical circuit device of the preferred embodiment 1-7 but does not have the optical waveguide layer-removed portions 5 or the recessed portions 4 in the silicon substrate 7.

The results were that the switching power of the optical circuit device of the comparative example was about 1000 mW, whereas the switching power of the optical circuit device of the preferred embodiment 1-7 was about 150 mW. A considerable reduction in switching power was achieved.

FIG. 1-13 shows a plan view illustrating a primary portion of a preferred embodiment 1-8 of the optical circuit device according to the present invention. The optical circuit device of the preferred embodiment 1-8 has an optical circuit chip 41 having a waveguide configuration shown in FIG. 1-13 and a dispersion compensating optical fiber 40.

The optical circuit chip 41 is such that a waveguide-forming region having the optical waveguide configuration that is described below is formed on a silicon substrate 7. The optical waveguide configuration has at least one (one herein) optical input waveguide 12, a first slab waveguide 13 connected to the output side of the optical input waveguide 12, an arrayed waveguide 14 connected to the output side of the first slab waveguide 13, a second slab waveguide 15 connected to the output side of the arrayed waveguide 14, and at least one (one herein) optical output waveguide 16 connected to the output side of the second slab waveguide 15.

The arrayed waveguide 14 is composed of a plurality of juxtaposed channel waveguides 14a whose lengths are different by predetermined amounts (ΔL). It should be noted that, generally, the number of the channel waveguides 14a provided to form the arrayed waveguide 14 is a large number, for example 100, but in FIG. 1-13, the numbers of the channel waveguides 14a is reduced for simplicity of the drawing.

Each of the channel waveguides 14a has a temperature control means 8 form thereon, and the temperature control means 8 is configured to be a phase distribution-imparting section for imparting a predetermined phase distribution to the arrayed waveguide 14. The temperature control means 8 is formed of thin film heaters 9 (9a and 9b).

In addition, a variable dispersion control section (not shown) for varying the dispersion amount of at least one predetermined wavelength light by controlling the temperature of the temperature control means 8 is provided so that the optical circuit device of the preferred embodiment 1-8 is configured to be a variable optical dispersion compensator for reducing the wavelength dispersion of a device to be connected.

The predetermined phase distribution has an even function-like profile that shows line symmetry with respect to the midpoint (M−1)/2 of channel waveguide number k, where the number of the channel waveguides 14a in the arrayed waveguide 14 is M (M is a positive integer) and the ordinal number of a channel waveguide 14a that is assigned according to the alignment order of the channel waveguides 14a is k (k=0 to M−1).

This even function-like profile shows, for example, a quadratic distribution as shown in FIG. 1-15, and it may be a phase distribution P ok) represented by the following Equation 1 that contains a coefficient A. It should be noted that the phase distribution equation is not particularly limited but may be determined as appropriate, as long as it is the foregoing even function profile.

[Equation 1]

$$P(k) = A \frac{1}{\left(\frac{M-1}{2}\right)^2}\left(k - \frac{M-1}{2}\right)^2 \quad (1)$$

FIG. 1-14 schematically shows an enlarged view of the formation portion of a heater 9b that forms the temperature control means 8, and a current passage means 45 and an electrode 44 for passing current are connected to the heater 9b. Although FIG. 1-14 illustrates the heater 9b, the heater 9a is also formed in a predetermined region in the formation region of the arrayed waveguide 14 in a similar manner to the heater 9b, and an electrode for passing current and a current passage means are also connected to the heater 9a.

In the preferred embodiment 1-8, by adjusting the refractive index of each of the channel waveguide 14a by means of heating with the heaters 9 (9a and 9b), a predetermined phase distribution is controlled to have substantially an even function-like profile as described above.

The predetermined phase distribution is configured to be variable, and by varying the amount of current passed through the heaters 9 (9a and 9b) with the current passage means, the heating amount of a channel waveguide 14a with the heaters 9 (9a and 9b) is made variable, whereby the adjustment amount of the refractive index of a corresponding channel waveguide 14a is varied.

It should be noted that although the formational configuration of the heaters 9 (9a and 9b) is not particularly limited, the heater 9 (9a) and the heater 9 (9b) are spaced apart from each other in the present embodiment, as shown in FIG. 1-1. The heater 9 (9a) and the current passage means that feeds current to the heater 9 (9a) function as a phase shifter for compensating a positive dispersion, whereas the heater 9 (8b) and the current passage means that feeds current to the heater 9 (9b) function as a phase shifter for compensating a negative dispersion.

The optical circuit device of the preferred embodiment 1-8 is configured as described above. The optical circuit device of the preferred embodiment 1-8 required an input power to temperature control means 8 of about 8 W to obtain a wavelength dispersion compensation amount of ±100 ps/nm. A similar study was conduced with an optical circuit device of the comparative example that has a similar optical waveguide configuration and temperature control means 8 to those of the optical circuit device of the preferred embodiment 1-8 but does not have the optical waveguide layer-removed portions 5 or the recessed portions 4 in the silicon substrate 7, and the necessary input power to the temperature control means 8 was about 20W.

Thus, the optical circuit device of the preferred embodiment 1-8 achieved a necessary wavelength dispersion compensation amount with low power consumption.

It should be noted that the present invention is not limited to the above-described preferred embodiments, but various embodiments are possible. For example, the configurations of the optical waveguides (cores) that construct the optical circuits and the optical circuit devices are not particularly limited but may be determined as appropriate.

Moreover, the optical circuit devices of the above-described preferred embodiments are formed using the configuration of the optical circuit of the foregoing preferred embodiment 1-1, but the optical circuit devices may be formed using the configuration of the optical circuit of the foregoing preferred embodiment 1-2. In this case as well, similar advantageous effects attained by the optical circuit devices of the foregoing preferred embodiments can be achieved.

In accordance with an optical circuit of the present invention, an optical waveguide layer having a core is formed on a substrate; the optical waveguide layer is removed from both sides sandwiching a formation portion of a temperature control means for variably controlling the temperature of a portion of the core locally; recessed portions having a rectangular cross-sectional shape are provided in the surface portion of the silicon substrate including the entire region of the removed portion; and crystal planes are determined for the surface of the silicon substrate, the side faces and the bottom face of the recessed portions. Therefore, an optical circuit is realized that can exhibit thermooptic effects efficiently with low power consumption, is easy to manufacture, and has high reliability.

By employing the above-described configuration, the optical circuit of the present invention can release thermal stress effectively, thus reducing the polarization dependence of the optical propagation characteristic due to birefringence.

An optical circuit of the present invention employs a configuration in which all of a surface of the silicon substrate, a side face of the recessed portion formed along the core longitudinal direction, and a bottom face of the recessed portion are formed of a silicon (100) crystal plane. By adopting anisotropic wet etching of the silicon substrate, both the etching starting from the surface of the silicon substrate downward and the side etching starting from the optical waveguide-removed portion toward the direction of the optical waveguide layer on which the temperature control means is formed are the etching of a (100) crystal plane of the silicon substrate, and both proceed at the same rate.

Therefore, the etching of the silicon substrate starting from the surface of the silicon substrate facing the optical waveguide layer-removed portion as a starting point proceeds both sideward and downward at the same rate while maintaining the side wall shape perpendicular to the surface of the silicon substrate and the bottom surface shape parallel to the surface of the silicon substrate.

Accordingly, by measuring the etching depth (the depth of the recessed portion formed) from the surface of the silicon substrate, the etching length in the direction orthogonal to the longitudinal direction of the temperature control means can be grasped at the same time. Thus, it is possible to appropriately adjust the width of the silicon substrate under the optical waveguide layer on which the temperature control means is formed (the width orthogonal to the longitudinal direction of the temperature control means), and it is possible to form optical circuits that exhibit the advantageous effects as described above with a good yield.

An optical circuit of the present invention employs a configuration in which a surface of the silicon substrate and a bottom face of the recessed portion are formed of a silicon (111) crystal plane, and a side face of the recessed portion formed along the longitudinal direction of the core is formed of a silicon (110) crystal plane. With this configuration, since the etching rate for the (110) crystal plane of the silicon substrate by an alkaline solution is from several ten times to several hundred times that of the etching rate for the (111) crystal plane, a suitable recessed portion can be formed by combining the two kinds of etching.

Specifically, for example, if the silicon substrate-removed portion having nearly the same planar shape as that of the optical waveguide layer-removed portion is formed by anisotropic dry etching and thereafter anisotropic wet etching by an alkaline solution is carried out, the etching of the recessed portion in the bottom surface direction and the etching in the side face directions can be controlled easily. Thus, desired recessed portions can be formed, and optical circuits that exhibit the advantageous effects as described above can be formed with a good yield.

In addition, an optical circuit of the present invention employs a configuration in which the recessed portion in the silicon substrate is formed by anisotropic etching of silicon using an alkaline solution. With this configuration, the recessed portion can be formed with good reproducibility due to crystal plane dependency of etching rate for the silicon substrate.

Moreover, an optical circuit of the present invention employs a configuration in which the recessed portion is formed by anisotropic dry etching and anisotropic etching of silicon using an alkaline solution that is performed subsequent to the anisotropic dry etching. Thereby, the etching in the direction vertical to the surface of the silicon substrate and that horizontal thereto can be carried out substantially independently of each other, and the recessed portion in the silicon substrate can be formed by etching with good reproducibility.

Furthermore, an optical circuit of the present invention employs a configuration in which the temperature control means is a thin film heater. This makes it possible to form the temperature control means easily and to achieve an optical circuit that exhibits the advantageous effects as described above easily.

In addition, an optical circuit of the present invention employs a configuration in which the optical waveguide layer is formed of quartz-based glass. With this configuration, the optical waveguide layer can be formed easily, and the thermooptic effect can be effectively exhibited utilizing temperature dependence of the refractive index of the quartz-based glass.

Furthermore, according to an optical circuit device of the present invention, at least two optical splitter/couplers for performing at least one of splitting and coupling of light are connected by connecting cores, at least one of the connecting cores is provided with a temperature control means, and the configuration in the vicinity of the temperature control means is a configuration of the above-described optical circuit of the present invention. Thereby, the thermooptic effect can be efficiently exhibited, and optical circuit devices can be manufactured with a good yield.

Moreover, an optical circuit device of the present invention employs a configuration having a Mach-Zehnder interferometer circuit. With this configuration, the phase section of the Mach-Zehnder interferometer circuit serves as a connecting core; therefore, the temperature of the connecting core can be controlled with a temperature control means formed for this connecting core, and various optical circuit devices having a variety of functions, such as a variable optical attenuator and an optical switch, can be formed with a good yield.

Furthermore, an optical circuit device of the present invention employs a configuration having at least one optical input waveguide, a first slab waveguide, an arrayed waveguide, a second slab waveguide, and an optical output waveguide, and in which the arrayed waveguide forms a connecting core. With this configuration, the arrayed waveguide, serving as a phase section, is provided with a temperature control means to control the temperature of the arrayed waveguide, and various optical circuit devices having a variety of functions, such as a variable optical attenuator and an optical switch, can be formed with a good yield.

In addition, an optical circuit device of the present invention employs a configuration in which the optical circuit device is configured to be a variable optical attenuator, an optical switch, a variable wavelength multiplexer/demultiplexer, or a variable optical dispersion compensator. With this configuration, their functions can be efficiently exhibited even when the input power to the temperature control means is small, and optical circuit devices can be realized with a good yield.

Moreover, according to a method for manufacturing an optical circuit of the present invention, the method for forming a recessed portion in the surface side of the silicon substrate may be anisotropic etching of silicon using an alkaline solution, or may be anisotropic dry etching of silicon and anisotropic etching of silicon using an alkaline solution that is performed subsequent to the anisotropic dry etching. Thereby, optical circuits can be manufactured easily with a good yield.

Furthermore, a method for manufacturing an optical circuit of the present invention may employ a configuration in which the alkaline solution is an aqueous solution of potassium hydroxide. With this configuration, recessed portions can be formed in the silicon substrate with even better reproducibility using an aqueous solution of potassium hydroxide, which is readily available, and therefore, optical circuits can be manufactured reliably and with a good yield.

Next, for a better understanding of the optical circuit device and the method for controlling the optical circuit device of the present invention that eliminates polarization dependence of optical attenuations, analysis of relevant conventional technologies is given below.

Another example of optical circuit device is an optical circuit device having a Mach-Zehnder interferometer circuit 30, shown in FIG. 2-13-A. In the optical circuit device shown in FIG. 2-13-A, the optical waveguide circuit of a core 1 has an optical splitter 21a for splitting light, an optical coupler 21b for coupling light, and a first connecting optical waveguide 1 (1e) and a second connecting optical waveguide 1 (1f) for connecting the optical splitter 21a and the optical coupler 21b with each other.

In the Mach-Zehnder interferometer circuit 30, which is an optical waveguide circuit, the optical splitter 21a or the optical coupler 21b are formed so that two juxtaposed cores 1 (1a and 1b, or 1c and 1d) are brought adjacent to each other, and the first connecting optical waveguide 1 (1e) and the second connecting optical waveguide 1 (1f) are formed by two juxtaposed cores 1 (1a and 1b) that are spaced apart from each other. In the Mach-Zehnder interferometer circuit 30 the optical splitter 21a and the optical coupler 21b are 2×2 directional optical couplers.

Also in the optical circuit device shown in FIG. 2-13-A, at least one (two herein) of the first and second connecting optical waveguides 1 (1e and 1f) of the Mach-Zehnder interferometer circuit 30 has first and second phase adjustment means 8a and 8b for adjusting the phase of propagating light propagating in the first and second connecting optical waveguides 1 (1e and 1f), respectively. The phase adjustment means Ba and Bb are formed of, for example, thin film heaters 9a and 9b. Reference numeral 44 denotes power supply lines (electrode) to the thin film heaters 9a and 9b.

First and second phase shifters are constructed by first and second connecting optical waveguides 1 (1s and 1t) that correspond to the parts in which the first and second phase adjustment means 8a and 8b are formed (hereafter referred to as "phase section-connected optical waveguides"), and the first and second phase adjustment means 8a and 8b.

When the thin film heaters 9a and 9b, which serve as the phase adjustment means 8a and 8b, variably controls the temperature of the phase section-connected optical waveguides 1 (1s and 1t) locally, the refractive index of the phase section-connected optical waveguide 1 (1s or 1t) that has been subjected to the variable control changes, and the effective refractive index of the core changes in the portion that has been subjected to the change. This utilizes a thermooptic effect, which is the phenomenon that the refractive index of quartz-based glass or the like changes according to temperature, and due to this effect, a change occurs in the phase of the light that propagates in the core in which the refractive index has changed. As a result of this, in the propagating light propagating in the phase section-connected optical waveguides 1 (1s and 1t), phase differences occur between the first phase section-connected optical waveguide 1s and the second phase section-connected optical waveguide 1t; more specifically, a phase difference in TE polarized light between the first phase section-connected optical waveguide 1s and the second connecting optical waveguide 1t, and a phase difference in TM polarized light between the first phase section-connected optical waveguide 1s and the second phase section-connected optical waveguide 1t.

That is, due to the thermooptic effect caused by the heat generation of the thin film heaters 9a and 9b, which are the phase adjustment means 8a and 8b, the effective optical waveguide length of the heated phase section-connected optical waveguide 1 (1s or 1t) changes, and the light propagating in the core whose effective optical waveguide length has changed changes its phase; this makes it possible to change the light transmittance of the Mach-Zehnder interferometer circuit 30. Thus, the optical circuit device shown in FIG. 2-13-A becomes an optical waveguide-type interferometer in which the light transmittance and the optical splitting ratio are variable, and it becomes possible to obtain the functions of variable optical attenuator and optical switch.

FIG. 2-13-B illustrates a cross-sectional configuration of a conventional optical circuit device having a Mach-Zehnder interferometer circuit 30 and first and second phase adjustment means 8a and 8b, which is a cross-sectional view taken along line A—A of FIG. 2-13-A. As shown in FIG. 2-13-B, an optical waveguide layer 3 comprising a core 1 (phase section-connected optical waveguides 1 (1s and 1t) herein) composed of quartz-based glass and a cladding 2 is formed on a silicon substrate 7. The first and second phase adjustment means 8a and 8b are formed on the surface of the cladding 2 above the phase section-connected optical waveguides 1 (1s and 1t).

In the foregoing configuration, when an electric current is passed through the first and second thin film heaters 9a and 9b of the first and second phase adjustment means 8a and 8b to heat the first and second phase section-connected optical waveguides 1 (1s and 1t) by the first and second thin film heaters 9a and 9b of the first and second phase adjustment means 8a and 8b via the cladding 2, the effective refractive index of the first and second phase section-connected optical waveguides 1 (1s and 1t) increases due to the thermooptic effect. Then, the effective optical path lengths of the first and second phase section-connected optical waveguides 1 (1s and 1t) change, and the phase of the propagating light, that is, the phases in TE polarized light and TM polarized light change.

The above-described phase shifter utilizing the thermooptic effect, however, has the following problem. The problem is that anisotropic internal stress that newly occurs in the optical waveguide layer 3 due to the heat increases the birefringence of the phase section-connected optical waveguide in the phase shifter, leading to an increase in the polarization dependence of propagation characteristics (optical attenuation) of the light propagating in the phase section-connected optical waveguide, that is, an increase in polarization dependent loss (PDL).

The just-described problem is further discussed in details with reference to the drawings. FIG. 2-14-A is a schematic view illustrating the phase of the TE polarized light and that of the TM polarized light that have propagated the first phase section-connected optical waveguide 1 (1s) and the second connecting optical waveguide 1 (1t) with no current being passed through the first and second thin film heaters 9a and 9b in a Mach-Zehnder interferometer-type variable optical attenuator, which is a conventional optical circuit device having a Mach-Zehnder interferometer circuit 30 using the phase shifter as shown in FIG. 2-13-A.

Characteristic curve a in FIG. 2-14-A represents a phase $\phi_{TE1}$, of the TE polarized light that has propagated through the first phase section-connected optical waveguide 1 (1s) and a phase $\phi_{TE2}$, of the TE polarized light that has propagated through the second phase section-connected optical waveguide 1 (1t). Likewise, characteristic curve b represents phases $\phi_{TM1}$ and $\phi_{TM2}$ of the TM polarized lights that have propagated through the first phase section-connected optical waveguide 1 (1s) and the second phase section-connected optical waveguide 1 (1t), respectively.

Generally, in an embedded type optical waveguide in which a core is buried in a cladding, birefringence exists due to anisotropic stress caused by the thermal expansion coefficient difference between a silicon substrate 7 and an optical waveguide layer 3 or the like. For this reason, as will be understood from the characteristic curves a and b in FIG. 2-14-A, the phases $\phi_{TE1}$ and $\phi_{TE2}$ of the TE polarized lights that have propagated through the first phase section-connected optical waveguide 1 (1s) and the second phase section-connected optical waveguide 1 (1t), and the phase $\phi_{TM1}$ and $\phi_{TM2}$ of the TM polarized lights that have propagated through the first phase section-connected optical waveguide 1 (1s) and the second phase section-connected optical waveguide 1 (1t), are different from each other.

Nevertheless, the birefringences that exist in the first phase section-connected optical waveguide 1 (1s) and the second phase section-connected optical waveguide 1 (1t) are equal, and therefore, the phase $\phi_{TE1}$ of the TE polarized light that has propagated through the first phase section-connected optical waveguide 1 (1s) and the phase $\phi_{TE2}$ of the TE polarized light that has propagated through the second phase section-connected optical waveguide 1 (1t) are equal, as will be understood from the characteristic curve a of FIG. 2-14-A. Likewise, the phases $\phi_{TM1}$ and $\phi_{TM2}$ of the TM polarized lights that have propagated through the first phase section-connected optical waveguide 1 (1s) and the second phase section-connected optical waveguide 1 (1t) are also equal, as will be understood from the characteristic curve b.

Accordingly, both the phase difference $\Delta\phi_{TE}$ (the difference between the phases $\phi_{TE1}$ and $\phi_{TE2}$) of the TE polarized lights and the phase difference $\Delta\phi_{TM}$ (the difference between the phases $\phi_{TM1}$ and $\phi_{TM2}$) of the TM polarized lights results in zero between the first phase section-connected optical waveguide 1 (1s) and the second phase section-connected optical waveguide 1 (1t) (which means that no phase difference arises), and no optical attenuation arises. Therefore, there exists no polarization dependence of optical attenuations arising from the respective phase differences (polarization dependent loss).

In order to generate optical attenuation and makes the device function as an optical attenuator, it is necessary to cause a temperature difference between the first phase section-connected optical waveguide 1 (1s) and the second phase section-connected optical waveguide 1 (1t) so as to generate phase differences between the first phase section-connected optical waveguide 1 (1s) and the second phase section-connected optical waveguide 1 (1t) (a phase difference of the TE polarized lights and a phase difference of the TM polarized lights).

In view of this, the following discusses a case in which phase differences are generated between the first phase section-connected optical waveguide 1 (1s) and the second phase section-connected optical waveguide 1 (1t) by heating only the first phase section-connected optical waveguide 1 (1s) with the first thin film heater 9a.

FIG. 2-14-B is an explanatory view illustrating the phases of TE polarized light and TM polarized light when only the first phase section-connected optical waveguide 1 (1s) is heated with the first thin film heater 9a Because the second phase section-connected optical waveguide 1 (1t) is not heated, the characteristic curves a and b in FIG. 2-12-B that represent the phases q and q of the second phase section-connected optical waveguide 1 (1t) are the same as the respective characteristic curves a and b shown in FIG. 2-14-A.

When heating is carried out with the first thin film heater 9a in the phase shifter having a conventional configuration as shown in FIG. 2-13, the stress of the waveguide layer in a direction vertical to the substrate due to thermal expansion is sufficiently released, but the stress of the waveguide layer in a direction horizontal to the substrate due to thermal expansion is not released sufficiently. Therefore, anisotropic internal stress occurs newly, and this anisotropic stress further increases birefringence.

Consequently, as shown in FIG. 2-14-B, the phase $\phi_{TE1}$ of the TE polarized light in the heated first phase section-connected optical waveguide 1 (1s) changes from the position of the characteristic curve a to that of the characteristic curve c. Likewise, the phase $\phi_{TM1}$ of the TM polarized light in the first phase section-connected optical waveguide 1 (1s) changes from the position of the characteristic curve b to that of the characteristic curve d.

Then, the difference $\Delta\phi_{TE1-TM1}$ between the phase $\phi_{TE1}$ of the TE polarized light and the phase $\phi_{TM1}$ of the TM polarized light in the heated first phase section-connected optical waveguide 1 (1s) (the difference between $\phi_{TE1}$ and $\phi_{TM1}$, in this case, the difference between the characteristic curves d and c; hereinafter referred to as a "polarization difference") becomes larger than the polarization difference $\Delta\phi_{TE2-TM2}$ between the phase $\phi_{TE2}$ of the TE polarized light and the phase $\phi_{TM2}$ of the TM polarized light in the non-heated second phase section-connected optical waveguide 1 (1t) (in this case the difference between the characteristic curves b and a).

Accordingly, the phase difference $\Delta\phi_{TE}$ between the phases $\phi_{TE1}$ and $\phi_{TE2}$ of the TE polarized lights that have propagated through the first phase section-connected optical waveguide 1 (1s) and the second phase section-connected optical waveguide 1 (1t) (the difference between $\phi_{TE1}$ and $\phi_{TE2}$, that is, the difference between the characteristic curves c and a in FIG. 2-14-B), and the phase difference $\Delta\phi_{TM}$ between the phases $\phi_{TM1}$ and $\phi_{TM2}$ of the TM polarized lights that have propagated through the first phase section-connected optical waveguide 1 (1s) and the second phase section-connected optical waveguide 1 (1t) (the difference between $\phi_{TM1}$ and $\phi_{TM2}$ that is, the difference between the characteristic curves d and b in FIG. 2-14-B), are different from each other. Optical attenuations arise due to the occurrence of the phase differences, but because of these unequal phase differences, the optical attenuations of the TE polarized light and the TM polarized light vary from each other. Accordingly, polarization dependence of the optical attenuations determined by the above-noted unequal phase differences (polarization dependent loss) arises.

FIG. 2-15-A is an explanatory view for illustrating a variable thermooptic attenuator as an optical circuit device. FIG. 2-15-B is a cross-sectional view illustrating the cross-sectional configuration taken along line A—A of FIG. 2-15-A. In the description of this proposed example, same components as those of conventional examples are designated by same reference numerals, and repetitive descriptions are omitted or simplified.

The optical circuit device of this proposed example has an optical waveguide circuit and first and second phase adjustment means 8a and 8b shown in FIG. 2-13-A, and a cross-sectional configuration as shown in FIG. 2-15-B. In the cross-sectional configuration shown in FIG. 2-15-B, the optical waveguide layer 3 is removed from both sides of the phase adjustment means 8a and 8b along the regions of the phase adjustment means, forming optical waveguide layer-removed portions 5. Because these optical waveguide layer-removed portions 5 serve as stress-releasing grooves, the stressing in the horizontal direction to the substrate is released, and the anisotropy of the stresses in the perpendicular and horizontal directions to the substrate is eliminated; thus, reduction in the above-described birefringence is attained.

It should be noted that the optical waveguide layer-removed portions 5 are formed so as to be spaced apart from the first and second phase section-connected optical waveguides 1 (1s and 1t), and as shown in FIG. 2-15-B, the widths of the optical waveguide layer 3a and the optical waveguide layer 3b on which the first and second phase section-connected optical waveguides 1 (1s and 1t) are formed are formed to be the same.

FIG. 2-16-A is a schematic view illustrating the phases of TE polarized light and TM polarized light that have propagated through the first phase section-connected optical waveguide 1 (1s) and the second phase section-connected optical waveguide 1 (1t) under the condition in which an electric current is passed through neither the first thin film heater 9a, which is the first phase adjustment means 8a, nor the second thin film heater 9b, which is the second phase adjustment means 8b.

The anisotropic stress in the optical waveguide layer (i.e., the optical waveguide) is released and the birefringence is reduced. Therefore, as will be understood from FIG. 2-16-A, because the polarization difference $\Delta\phi_{TE1-TM1}$ between the phases of the TE polarized light and the TM polarized light that have propagated through the first phase section-connected optical waveguide (the difference between the characteristic curves b and a in FIG. 2-16-A) and the polarization difference $\Delta\phi_{TE2-TM2}$ between the phases of the TE polarized light and the TM polarized light that have propagated through the second phase section-connected optical waveguide (the difference between the characteristic curves b and a in FIG. 2-16-A) become smaller than the polarization differences $\Delta\phi_{TE1-TM1}$ and $\Delta\phi_{TE2-TM2}$ (the differences between characteristic curves b and a in FIG. 2-14-A) between the phases of the TE polarized wave and the TM polarized wave that have propagated through the first phase section-connected optical waveguide 1 (1s) and the second phase section-connected optical waveguide 1 (1t) in the conventional optical circuit device shown in FIG. 2-13.

It should be noted that although the birefringences existing in the first phase section-connected optical waveguide and the second phase section-connected optical waveguide are reduced, they are equal to each other. Therefore, as will be understood from the characteristic curves a and b in FIG. 2-16-A, the polarization difference $\Delta\phi_{TE1-TM1}$ of the phases $\phi_{TE1}$ and $\phi_{TM1}$ of the TE polarized light and TM polarized light that have propagated through the first phase section-connected optical waveguide is equal to the polarization difference $\Delta\phi_{TE2-TM2}$ between the phases Ad and W of the TE polarized light and TM polarized light that have propagated through the second phase section-connected optical waveguide.

FIG. 2-16-A is a schematic view illustrating the phases of TE polarized light and TM polarized light that have propagated through the first phase section-connected optical waveguide and the second phase section-connected optical waveguide under the condition in which a current is passed through the first thin film heater, which is the first phase adjustment means, but no current is passed through the second thin film heater, which is the second phase adjustment means.

The anisotropic stress due to the thermal expansion caused when a current is passed through the first thin film heater, which is the first phase adjustment means, to heat the first phase section-connected optical waveguide is also reduced. Therefore, as shown in FIG. 2-16-B, the phase $\phi_{TE1}$ of the TE polarized light in the heated first phase section-connected optical waveguide changes from the position of the characteristic curve a to that of the characteristic curve c. In addition, the phase $\phi_{TM1}$ of the TM polarized light in the first phase section-connected optical waveguide changes from the position of the characteristic curve b to that of the characteristic curve d.

As will be understood from FIG. 2-16-B, the polarization difference $\Delta\phi_{TE1-TM1}$ (the difference between the characteristic curves d and c in FIG. 2-16-B) between the phases of the TE polarized light and the TM polarized light that have propagated through the first phase section-connected optical waveguide, which is caused by heating, becomes smaller than the polarization difference $\Delta\phi_{TE1-TM1}$ (the difference between the characteristic curves d and c in FIG. 2-14-B) between the phases of the TE polarized light and the TM polarized light that have propagated through the first phase section-connected optical waveguide in the optical circuit device shown in FIG. 2-13, which is a conventional variable optical attenuator.

Accordingly, the difference between the phase difference $\Delta\phi_{TE}$ (the difference between the characteristic curves c and a in FIG. 2-16-B) of the TE polarized light and the phase difference $\Delta\phi_{TM}$ (the difference between the characteristic curves d and b in FIG. 2-16-B) of the TM polarized light between the first and second phase section-connected optical waveguides becomes smaller than the difference between the phase difference $\Delta\phi_{TE}$ (the difference between the characteristic curves c and a in FIG. 2-14-B) of the TE polarized light and the phase difference $\Delta\phi_{TM}$ (the difference between the characteristic curves d and b in FIG. 2-14B) of the TM polarized light between the first and second phase section-connected optical waveguides in the optical circuit device shown in FIG. 2-13, which is a conventional variable optical attenuator.

In the variable thermooptic attenuator shown in FIG. 2-15, which is the optical circuit device of the proposed example aiming at reduction in birefringence, the phase difference $\Delta\phi_{TE}$ (the difference between the characteristic curves c and a in FIG. 2-16-B) of the TE polarized lights between the first and second phase section-connected optical waveguides and the phase difference $\Delta\phi_{TM}$ (the difference between the characteristic curves d and b in FIG. 2-16-B) of the TM polarized light between the first and second phase section-connected optical waveguides result in close values with the propagating light that propagates through the first and second phase section-connected optical waveguides 1 (1s and 1t). Therefore, the polarization dependence of the optical attenuation determined by the phase differences between the TE polarized light and the TM polarized light (polarization dependent loss) is also reduced.

As described above, although the configuration shown in FIG. 2-15 has been proposed as a variable thermooptic attenuator as an optical circuit device to reduce the polarization dependence of the above-described light propagation characteristic (optical attenuation) (reduction in polarization dependent loss, i.e., lowering of PDL), this configuration is insufficient in terms of reduction in polarization dependence.

Specifically, as shown in FIG. 2-15-B, in the configuration shown in FIG. 2-15, the optical waveguide layer-removed portions 5 are formed so that the widths of the optical waveguide layers 3a and 3b on which the first and second phase section-connected optical waveguides 1 (1s and 1t) exist are made equal, and reduction in birefringence is attempted.

Because the widths of the optical waveguide layers 3a and 3b determine the resulting birefringence, and therefore, in order to make the birefringence completely zero, the widths of the optical waveguide layers 3a and 3b need to be controlled with an extremely high precision.

However, it is necessary to form such optical waveguide-removed portions such that the optical waveguide layer 3 generally having a thickness of about 50 $\mu$m or more can be removed completely and with high precision, and therefore, in reality the groove widths and groove shapes vary because of variations in manufacture processes. As a result, the widths of the optical waveguide layers 3 (3a and 3b) vary, leading to variations in birefringence, and it has been difficult to eliminate the birefringence completely. Moreover, although birefringences of the optical waveguide layers 3a and 3b in which the first and second phase section-connected optical waveguides 1s and 1t exist are the same and low birefringences, it is difficult to obtain low birefringences stably due to the above-noted variations, and as a consequence, it is difficult to obtain reduction in polarization dependence of optical attenuations stably.

An optical circuit device of the preferred embodiment 2-1 has a Mach-Zehnder interferometer circuit 30 having a planer waveguide configuration, which is an optical waveguide circuit shown in FIG. 2-1-A, and the Mach-Zehnder interferometer circuit 30 comprises an optical splitter 21a, an optical coupler 21b, and a first connecting optical waveguide 1 (1e) and a second connecting optical waveguide 1 (1f) for connecting the optical splitter 21a and the optical coupler 21b together. First and second phase adjustment means 8a and 8b are respectively formed on portions of the first connecting optical waveguide 1 (1e) and the second connecting optical waveguide 1 (1f), that is, on a first phase section-connected optical waveguide 1 (1s) and a second phase section-connected optical waveguide 1 (1t), so that the first phase section-connected optical waveguide 1 (1s) and the first phase adjustment means 8a together form a first phase shifter whereas the second phase section-connected optical waveguide 1 (1t) and the second phase adjustment means 8b together form a second phase shifter.

In addition, the optical circuit device of the preferred embodiment 2-1 has a cross-sectional configuration shown in FIG. 2-1-B. FIG. 2-1-B is a cross-sectional view taken along line A—A in FIG. 2-1-A. As shown in FIG. 2-1-B, in the optical circuit device of the preferred embodiment 2-1, the first phase adjustment means 8a is formed along the first phase section-connected optical waveguide 1 (1s), and optical waveguide-removed portions 5 are formed on both sides of the first phase adjustment means 8a so as to serve as stress-releasing grooves, thus reducing anisotropic stress in the first phase section-connected optical waveguide 1 (1s).

By the above-described formation, birefringence B, of the first phase section-connected optical waveguide 1 (1s) and birefringence $B_2$ of the second phase section-connected optical waveguide 1 (1t) are made different from each other. In other words, the rate of change of birefringence d $B_1/d\phi$ of the first phase adjustment means 8a with respect to the phase adjustment amount and the rate of change of birefringence $dB_2/d\phi$ of the second phase adjustment means 8b with respect to the phase adjustment amount are different from each other.

In the optical circuit device of the preferred embodiment 2-1, the first and second phase adjustment means 8a and 8b are connected to an optical variable attenuation control section (not shown) for varying the intensity of at least one predetermined wavelength light by controlling the phases in the first and second phase adjustment means 8a and 8b, so that the optical circuit device of the preferred embodiment 2-1 is configured to be a variable optical attenuator.

The preferred embodiment 2-1 is configured as described above. In determining the configuration of the preferred embodiment 2-1, the present inventors conducted a study on reduction in polarization dependent loss in the conventional Mach-Zehnder interferometer-type variable optical attenuator, which is an optical circuit device, having a Mach-Zehnder interferometer circuit 30 using a phase shifter having a conventional configuration shown in FIG. 2-13. The present inventors also conducted a study on reduction in polarization dependent loss in the Mach-Zehnder interferometer-type variable optical attenuator of the proposed example shown in FIG. 2-15, which is a Mach-Zehnder interferometer circuit 30.

First, a study was conducted concerning reduction in polarization dependent loss in a Mach-Zehnder interferometer-type variable optical attenuator having a Mach-Zehnder interferometer circuit 30 using a phase shifter having the conventional configuration shown in FIG. 2-13.

Specifically, the inventors assumed that, if electric power is supplied not only to the first thin film heater 9a, which is the first phase adjustment means 8a, but also to the second thin film heater 9b, which is the second phase adjustment means 8b, to heat the second phase section-connected optical waveguide 1 (1t) with the second thin film heater 9b so that the same amount of polarization difference $\Delta\phi_{TE2-TM2}$ of the phases as the polarization difference $\Delta\phi_{TE1-TM1}$ (the difference between the characteristic curves d and c in FIG. 2-14-B) between the phases of the TE polarized light and TM polarized light generated in the first phase section-connected optical waveguide 1 (1s) can be generated also in the second phase section-connected optical waveguide 1 (1t), it would be possible to equalize the phase difference $\Delta\phi_{TE}$ in TE polarized light between the phase of the first phase section-connected optical waveguide 1 (1s) and the phase of the second phase section-connected optical waveguide 1 (1t) with the phase difference $\Delta\phi_{TM}$ in TM polarized light between the phase of the first phase section-connected optical waveguide (1 (1s) and the phase of the second phase section-connected optical waveguide 1 (1t).

However, in the conventional Mach-Zehnder interferometer-type variable optical attenuator using the phase shifters as shown in FIG. 2-13-A, the first phase shifter and the second phase shifter have the same configuration. Therefore, if electric power is supplied to the first and second thin film heaters 9a and 9b so that the polarization difference $\Delta\phi_{TE1-TM1}$ between the phases of the TE polarized light and TM polarized light generated in the first phase section-connected optical waveguide 1 (1s) and the polarization difference $\Delta\phi_{TE2-TM2}$ between the phases of the TE polarized light and TM polarized light generated in the second phase section-connected optical waveguide 1 (1t) can be equalized as described above, the phases $\phi_{TE1}$ and $\phi_{TE2}$ of the TE polarized light and the phases $\phi_{TM1}$ and $\phi_{TM2}$ of the TE polarized light that have propagated through the first and second phase section-connected optical waveguides 1 (1s and 1t) are also equalized, as shown in FIG. 2-14-C. Consequently, both the phase differences $\Delta\phi_{TE}$ and $\Delta_{TM}$ of the respective polarized lights between the first and second phase section-connected optical waveguides become zero, and no optical attenuation is obtained. Thus, the device does not serve the function of Mach-Zehnder interferometer-type variable optical attenuator.

Next, a study was conducted concerning reduction in polarization dependent loss in a Mach-Zehnder interferometer-type variable optical attenuator the Mach-Zehnder interferometer circuit 30 of the proposed example shown in FIG. 2-15.

Specifically, the inventors assumed that, if electric power is supplied not only to the first thin film beater 9a, which is the first phase adjustment means 8a, but also to the second thin film heater 9b, which is the second phase adjustment means 8b, to heat the second phase section-connected optical waveguide 1 (1t) with the second thin film heater 9b so that the same amount of polarization difference $\Delta\phi_{TE2-TM2}$ of the phases as the polarization difference $\Delta\phi_{TE1-TM1}$ (the difference between the characteristic curves d and c in FIG. 2-16-B) between the phases of the TE polarized light and TM polarized light generated in the first phase section-connected optical waveguide 1 (1s) can be generated also in the second phase section-connected optical waveguide 1 (1t), it would be possible to equalize the phase difference $\Delta\phi_{TE}$ in TE polarized light between the phase of the first phase section-connected optical waveguide 1 (1s) and the phase of the second phase section-connected optical waveguide 1 (1t) with the phase difference $\Delta\phi_{TM}$ in TM polarized light between the phase of the first phase section-connected optical waveguide 1 (1s) and the phase of the second phase section-connected optical waveguide 1 (1t).

However, in the Mach-Zehnder interferometer-type variable optical attenuator of the proposed example as shown in FIG. 2-15-A, the first phase shifter and the second phase shifter have the same configuration. Therefore, if electric power is supplied to the first and second thin film heaters 9a and 9b so that the polarization difference $\Delta\phi_{TE1-TM1}$ between the phases of the TE polarized light and TM polarized light generated in the first phase section-connected optical waveguide 1 (1s) and the polarization difference $\Delta\phi_{TE2-TM2}$ between the phases of the TE polarized light and TM polarized light generated in the second phase section-connected optical waveguide 1 (1t) can be equalized as described above, the phases $\phi_{TE1}$ and $\phi_{TE2}$ of the TE polarized light and the phases $\phi_{TM1}$ and $\phi_{TM2}$ of the TM polarized light that have propagated through the first and second phase section-connected optical waveguides 1 (1s and 1t) are also equalized, as shown in FIG. 2-16-C. Consequently, both the phase differences $\Delta\phi_{TE}$ and $\Delta\phi_{TM}$ of the respective polarized lights between the first and second phase section-connected optical waveguides become zero, and no optical attenuation is obtained. Thus, the device does not serve the function of Mach-Zehnder interferometer-type variable optical attenuator.

From the results of the foregoing studies, the present inventors have found the following. In order for the device to function as an optical attenuator and to eliminate polarization dependence of optical attenuations, phase $\phi1$ of the first phase section-connected optical waveguide and phase $\phi2$ of the second phase section-connected optical waveguide should be made different from each other when phase adjustment is performed with the first and second phase adjustment means 8a and 8b so that the polarization differences in the TE polarized light and TM polarized light between the respective phases of the propagating lights that have propagated through the first and second phase section-connected optical waveguides are equalized ($\phi_{TE-TM}=\phi_{TE1-TM1}=\phi_{TE2-TM2}$), or that the phase differences in TE polarized light and TM polarized light between the respective phases of the propagating lights that have propagated through the first and second phase section-connected optical waveguides are equalized ($\phi_{TE}=\Delta\phi_{TM}=\Delta\phi_{TE1-TE2}=\Delta_{TM1-TM2}$), or that the birefringences of the first and second phase section-connected optical waveguides are equalized ($B_1=B_2$).

To achieve the above, it is possible that the rate of change $d\phi_{TE1-TM1}/d\phi$ of the polarization difference $\phi_{TE1-TM1}$ of phases in the first phase adjustment means with respect to a phase adjustment amount by the first phase adjustment means and the rate of change $d\phi_{TE2-TM2}/d\phi$ of the polarization difference $\phi_{TE1-TM1}$ of phases in the second phase adjustment means with respect to a phase adjustment amount by the second phase adjustment means should be made different from each other.

The rate of change of the polarization difference in phases of the phase adjustment means is determined by the rate of change of birefringence of a phase section-connected optical waveguide in the phase adjustment means-formation portion. Therefore, in order to make the rate of change of the polarization difference in a phase of the first phase adjustment means different from the rate of change of the polarization difference in a phase of the second phase adjustment means, the rate of change $dB_1/d\phi$ of birefringence $B_1$ of the first phase section-connected optical waveguide in the first phase adjustment means-formation portion is formed with respect to the phase adjustment amount produced by the first phase adjustment means and the rate of change $dB_2/d\phi$ of birefringence $B_2$ of the second phase section-connected optical waveguide 1 (1t) in the second phase adjustment means-formation portion is formed with respect to the phase adjustment amount produced by the second phase adjustment means should be made different from each other.

In addition, to vary the rates of change of birefringences between the first and second phase adjustment means-formation portions, anisotropic stress, which is the cause of birefringence, in the respective optical waveguide layers in the first and second phase adjustment means-formation layers should be made different from each other. In other words, birefringences of the respective optical waveguide layers in the first and second phase adjustment means-formation portions (that is, the first and second phase section-connected optical waveguides) should be made different from each other.

According to the result of the foregoing studies, the present inventors have found the following. In order to achieve the characteristics as described above, the configuration as follows should be employed; for example, the optical waveguide layer is removed from regions that are on both sides sandwiching at least one of the first and second phase adjustment means-formation portions and spaced apart from the phase section-connected optical waveguide along the longitudinal direction of the phase section-connected optical waveguide, from the optical waveguide layer surface to the substrate surface, so as to form stress-releasing grooves; and the width of the first optical waveguide layer and the width of the second optical waveguide layer are made different from each other including the first and second phase section-connected optical waveguides that are juxtaposed with the stress-releasing grooves. Accordingly, the present inventors propose an optical circuit device of a preferred embodiment 2-1 that has the above-described configuration.

Specifically, the present inventors employed the following configuration: first, optical waveguide-removed portions 5 were formed on both sides of a portion where the first phase adjustment means 8a is formed to configure stress-releasing grooves, to reduce anisotropic stress in the first phase section-connected optical waveguide 1 (1s), and no optical waveguide-removed portion were formed on both sides of a portion where the second phase adjustment means 8b was formed, so as not to reduce anisotropic stress in the second phase section-connected optical waveguide 1 (1t).

In the following, it is discussed that the above-described configuration can eliminate polarization dependence of optical attenuations.

First, the phases of propagating lights propagating-in the first and second connecting optical waveguides under the condition in which electric power is not supplied to the first and second thin film heaters are shown in FIG. 2-3-A. In FIG. 2-3-A, characteristic curves a, and $b_1$ represent the phases of the TE polarized light and TM polarized light of the propagating light propagating in the first connecting optical waveguide, respectively, whereas characteristic curves $a_2$ and $b_2$ represent the phases of the TE polarized light and TM polarized light of the propagating light propagating in the second connecting optical waveguide, respectively.

Since the anisotropic stress in the second connecting optical waveguide is not reduced while the anisotropic stress in the first connecting optical waveguide is reduced, the polarization difference $\phi_{TE1-TM1}$ (the difference between the characteristic curves $b_1$ and $a_1$) of the phases of the propagating light propagating in the first connecting optical waveguide is smaller than the polarization difference $\phi_{TE2-TM2}$ (the difference between the characteristic curves $b_2$ and $a_2$) of the phases of the propagating light propagating through the second connecting optical waveguide, as will be understood from FIG. 2-3-A.

Next, as electric power is supplied to the first thin film heater, the phase of the propagating light propagating in the first connecting optical waveguide increases, and at the same time, the polarization difference $\phi_{TE1-TM1}$ of the phase gradually increases. At a certain point of amount of supplied power, the polarization difference $\phi_{TE1-TM1}$ of the phase of the propagating light propagating in the first connecting optical waveguide becomes equal to the polarization difference $\phi_{TE2-TM2}$ of the phase of the propagating light propagating in the second connecting optical waveguide.

FIG. 2-3-B is a schematic view illustrating the states of the phases when electric power is supplied to the first thin film heater so that the polarization differences between the phases of the propagating light propagating in the first and second connecting optical waveguides are equalized. In FIG. 2-3-B, characteristic curves $a_1$' and $b_1$' represent the phases of TE polarized light and TM polarized light of the propagating light propagating in the first connecting optical waveguide when electric power is supplied to the first thin film heater so that polarization differences between the phases of the propagating light propagating in the first and second connecting optical waveguides are equalized. It should be noted that the characteristic curves $a_2$ and $b_2$ represent the phases of the TE polarized light TM polarized light in the propagating light propagating in the second connecting optical waveguide, and they are in the same positions as the characteristic curves $a_2$ and $b_2$ in FIG. 2-3-A.

FIG. 2-3-B illustrates a state in which the polarization differences $\phi_{TE1-TM1}$ (the difference between the characteristic curve $b_1$' and $a_1$') and $\phi_{TE2-TM2}$ (the difference between the characteristic curve $b_2$ and $a_2$) of the phases of the propagating lights propagating in the first and second connecting optical waveguides are equalized when electric power is supplied to the first thin film heater so that the polarization differences of the phases of the propagating light propagating in the first and second connecting optical waveguides are equalized. It should be noted that the respective phase differences $\Delta\phi_{TE}=\Delta\phi_{TE1-TE2}$ and $\Delta\phi_{TM}=\Delta\phi_{TM1-TM2}$ in the TE polarized light and TM polarized light are equal.

Because the optical attenuation according to the above phase differences can be obtained and the respective phase differences in the propagating lights propagating in the first and second connecting optical waveguides are the same, it is possible to eliminate the polarization dependence of optical attenuations.

Therefore, as in the preferred embodiment 2-1, desired optical attenuations can be obtained and the polarization dependence of optical attenuations can be eliminated by forming the device so that the birefringence $B_1$ of the first phase section-connected optical waveguide 1 (1s) and the birefringence $B_2$ of the second phase section-connected optical waveguide 1 (1t) are different from each other, in other words, that the rate of change $dB_1/d\phi$ of birefringence with respect to the phase adjustment amount of the first phase adjustment means 8a and the rate of change d $B_2/d\phi$ of birefringence with respect to the phase adjustment amount of the second phase adjustment means 8b are different from each other.

As the power supplied to the first thin film heater is increased further, the phase of the propagating light propagating in the first connecting optical waveguide increases, and at the same time, the polarization difference $\phi_{TE1-TM1}$ of the phase also increases gradually. At this time, electric power supply to the second thin film heater is stated Since birefringence of the second connecting optical waveguide is not reduced, as the second connecting optical waveguide is heated as electric power is supplied to the second thin film heater, the birefringence of the second connecting optical waveguide increases, and the polarization difference of the phase also increases. Therefore, when a slight phase variation amount is produced for the phase of the propagating light propagating in the second connecting optical waveguide, it is possible to produce a polarization difference $\phi_{TE2-TM2}$ of the phase of the propagating light propagating in the second connecting optical waveguide that is equal to a polarization difference $\phi_{TE1-TM1}$ of the phase increased in the propagating light propagating in the first connecting optical waveguide.

FIG. 2-3-C is a schematic view illustrating the phases when electric power is supplied to both the first and second thin film heaters so that the polarization differences $\phi_{TE1-TM1}$ and $\phi_{TE2-TM2}$ of the phases that have increased in the propagating light propagating in the first and second connecting optical waveguides. Characteristic curves $a_1$" and $b_1$" represent the phases of the TE polarized light and TM polarized light in the propagating light propagating in the first connecting optical waveguide. Characteristic curve $a_2$" and $b_2$" represent the phases of the TE polarized light and TM polarized light in the propagating light propagating in the second connecting optical waveguide.

As will be understood from FIG. 2-3-C, the phase difference $\Delta\phi_{TE1-TE2}$ (the difference between the characteristic curves $a_1$" and $a_2$") in TE polarized light between the first and second connecting optical waveguides and the phase difference $\Delta\phi_{TM1-TM2}$ (the difference between the characteristic curves $b_1$" and $b_2$") in TM polarized light between the first and second connecting optical waveguides are equal. By increasing the phase differences $\Delta\phi_{TE1-TE2}$ and equalizing the phase differences as described above, it is possible to increase an optical attenuation under the state where the polarization dependence of optical attenuations is completely eliminated.

As described above, the optical circuit device of the preferred embodiment 2-1 can realize a Mach-Zehnder interferometer-type variable optical attenuator that completely eliminates the polarization dependence of optical attenuations.

The preferred embodiment 2-1 is configured as described above. In order to determine the configuration of the optical circuit device of the present invention, the present inventors further conducted a study on formulation concerning the elimination of polarization dependence of insertion loss in a Mach-Zehnder interferometer-type variable optical attenuator of the preferred embodiment 2-1 as shown in FIG. 2-1.

With the Mach-Zehnder interferometer-type variable optical attenuator shown in FIG. 2-1, which is an optical circuit device, in the case where the signal light is input from an incident end 17 of a first optical waveguide 1 (1a) and the signal light is emitted from respective emission ends 19 and 20 of third and fourth optical waveguides 1 (1c and 1d), an insertion loss D of the signal light is expressed by the following Equation (1), if the loss with the optical waveguide is ignored.

$$D = -10 \log\left(\frac{P_2}{P_1+P_2}\right) = -10 \log(\eta) \tag{1}$$

In the above Equation, $P_1$ is an optical power emitted from the emission end 19 of the third optical waveguide 1 (1c), and $P_2$ is a optical power emitted from the emission end 20 of the fourth optical waveguide 1 (1d). It should be noted that $P_1+P_2$ is equal to the optical power that is input from the incident end 17 of the first optical waveguide 1 (1a). Here, assuming the following;

$$\eta = \frac{P_2}{P_1+P_2}$$

the above equation yields Equation (2).

$$D = -10 \log(\eta) \tag{2}$$

Here, $\eta$ is a coupling efficiency of the Mach-Zehnder interferometer-type variable optical attenuator.

The coupling efficiency indicates what proportion of the optical power that is input from the incident end 17 of the one optical waveguide (the first optical waveguide 1 (1a) in this case) is emitted from the emission end 20 of the other optical waveguide (the fourth optical waveguide 1 (1d) in this case). Generally, when the optical splitter and the optical coupler are considered as the same (both are a 2×2 directional optical coupler in this case) in a Mach-Zehnder interferometer-type variable optical attenuator as the preferred embodiment 2-1, the coupling efficiency $\eta$ is expressed by the following Equation (3).

$$\eta = 4\kappa(1-\kappa)\cos^2\left(\frac{\Delta\Phi}{2}\right) \tag{3}$$

Here, $\kappa$ is the coupling efficiency of the 2×2 directional optical coupler, and $\Delta\phi$ is the phase difference between the first and second connecting optical waveguides.

The phase difference $\Delta\phi$ between the first and second connecting optical waveguides is expressed by the following Equation (4).

$$\Delta\Phi = \frac{2\pi}{\lambda}(n_{\mathit{eff}1}L_1 - n_{\mathit{eff}2}L_2) \tag{4}$$

Here, $n_{\mathit{eff}1}$ and $n_{\mathit{eff}2}$ are equivalent refractive indices of the first and second connecting optical waveguides, respectively, and $L_1$ and $L_2$ are lengths of first and second phase section-connected optical waveguides 1 (1s and 1t) corresponding to the portions in which the first and second phase adjustment means are formed.

Assuming that $L_1=L_2=L$, Equation (4) yields the following Equation (5).

$$\Delta\Phi = \frac{2\pi}{\lambda}(n_{\mathit{eff}1} - n_{\mathit{eff}2})L \tag{5}$$

As will be understood from Equation (5), phase difference $\Delta\phi$ is determined by equivalent refractive index difference $(n_{\mathit{eff}1}-n_{\mathit{eff}2})$. Therefore, imparting an equal phase difference to each of the polarized lights can be achieved by imparting an equal equivalent refractive index difference to each of the polarized lights.

Thus, when electric powers $W_1$ and $W_2$ are supplied to the first and second thin film heaters, which are the first and second phase adjustment means, and respective temperature increases $\Delta T_1$ and $\Delta T_2$ are imparted to the first and second phase section-connected optical waveguides, equivalent refractive indices $n_{\mathit{eff}1TE}$, $n_{\mathit{eff}1TM}$, $n_{\mathit{eff}2TE}$, and $n_{\mathit{eff}2TM}$ corresponding to respective polarized lights are respectively expressed by the following Equations (6) to (9).

$$n_{\mathit{eff}1TE}=n_{\mathit{eff}TE0}+\alpha_{1TE}\Delta T_1=n_{\mathit{eff}1TE0}+\gamma_{1TE}W_1 \tag{6}$$

$$n_{\mathit{eff}1TM}=n_{\mathit{eff}1TM0}=\alpha_{1TM}\Delta T_1=n_{\mathit{eff}1TM0}+\gamma_{1TM}W_1 \tag{7}$$

$$n_{2TE}=n_{\mathit{eff}2TE0}+\alpha_{2TE}\Delta T_2=n_{\mathit{eff}2TE0}+\gamma_{2TE}W_2 \tag{8}$$

$$n_{2TM}=n_{\mathit{eff}2TM0}+\alpha_{2TM}\Delta T_2=n_{\mathit{eff}2TM0}+\gamma_{2TM}W_2 \tag{9}$$

Here, $\alpha_{1TE}$, $\alpha_{1TM}$, $\alpha_{2TE}$, and $\alpha_{2TM}$ are respectively temperature coefficients of the equivalent refractive indices of TE polarized light and TM polarized light in the first and second phase section-connected optical waveguides of the first and second phase adjustment means-formation portions, $\gamma_{1TE}$, $\gamma_{1TM}$, $\gamma_{2TE}$, and $\gamma_{2TM}$ are respectively rates of change of equivalent refractive indices of TE polarized light and TM polarized light in the first and second phase section-connected optical waveguides of the first and second phase adjustment means-formation portions with respect to amounts of supplied power, and $n_{\mathit{eff}1TE0}$, $n_{\mathit{eff}1TM0}$, $n_{\mathit{eff}2TE0}$, and $n_{\mathit{eff}2TM0}$ are equivalent refractive indices TE polarized light and TM polarized light in the first and second phase section-connected optical waveguides in the state where no electric power is supplied.

Here, from Equations (6) through (9), assuming that an equivalent refractive index difference $(n_{\mathit{eff}1}-n_{\mathit{eff}2})$ between the first and second phase section-connected optical waveguides to which a predetermined phase difference for obtaining a desired optical attenuation is imparted is $\Delta n$, and equivalent refractive index differences between the first and second phase section-connected optical waveguides under the condition in which no electric power is supplied are $\Delta n_{0TE}=n_{\mathit{eff}1TE0}-n_{\mathit{eff}2TE0}$ and $\Delta n_{0TM}=n_{\mathit{eff}1TM0}-n_{\mathit{eff}2TM0}$, the equivalent refractive index difference $\Delta n$ in which equivalent refractive index differences $\Delta n_{TE}$ and $\Delta n_{TM}$ are equal in TE polarized light and TM polarized light are expressed by the following Equations (10) and (11).

$$\Delta n = \Delta n_{TE} = n_{\mathit{eff}1TE}-n_{\mathit{eff}2TE} = \alpha_{1TE}\Delta T_1 - \alpha_{2TE}\Delta T_2 + \Delta n_{0TE} = \gamma_{1TE}W_1 - \gamma_{2TE}W_2 + \Delta n_{0TE} \tag{10}$$

$$\Delta n = \Delta n_{TM} = n_{\mathit{eff}1TM}-n_{\mathit{eff}2TM} = \alpha_{1TM}\Delta T_1 - \alpha_{2TM}\Delta T_2 + \Delta n_{0TE} = \gamma_{1TM}W_1 - \gamma_{2TM}W_2 + \Delta n_{0TM} \tag{10}$$

From Equation (10), the following Equation (12) is obtained.

$$\Delta T_2 = \frac{\alpha_{1TE}\Delta T_1 - \Delta n + \Delta n_{0TE}}{\alpha_{2TE}} \quad (12)$$

By substituting Equation (12) into Equation (11) to obtain $\Delta T_1$, the following Equation (13) is obtained.

$$\Delta T_1 = \frac{(\alpha_{2TM} - \alpha_{2TE})\Delta n - \alpha_{2TM}\Delta n_{0TE} + \alpha_{2TE}\Delta n_{0TM}}{(\alpha_{1TE}\alpha_{2TM} - \alpha_{1TM}\alpha_{2TE})} \quad (13)$$

Further, from Equations (1) through (4), $\Delta n$ is expressed by the following Equation (14).

$$\Delta n = n_{\text{eff1}} - n_{\text{eff2}} = \frac{\lambda}{\pi L}\cos^{-1}\sqrt{\frac{10^{-\frac{D}{10}}}{4\kappa(1-\kappa)}} \quad (14)$$

By substituting the above Equation (14) into Equation (12) and Equation (13) to obtain $\Delta T_1$ and $\Delta T_2$, the following Equations (15) and (16) are obtained.

$$\Delta T_2 = \frac{1}{\alpha_{2TE}}\left(\alpha_{1TE}\Delta T_1 + \Delta n_{0TE} - \frac{\lambda}{\pi L}\cos^{-1}\sqrt{\frac{10^{-\frac{D}{10}}}{4\kappa(1-\kappa)}}\right) \quad (15)$$

$$\Delta T_1 = \frac{(\alpha_{2TM} - \alpha_{2TE})\left(\frac{\lambda}{\pi L}\cos^{-1}\sqrt{\frac{10^{-\frac{D}{10}}}{4\kappa(1-\kappa)}}\right) - \alpha_{2TM}\Delta n_{0TE} + \alpha_{2TE}\Delta n_{0TM}}{(\alpha_{1TE}\alpha_{2TM} - \alpha_{1TM}\alpha_{2TE})} \quad (16)$$

From the above Equations (15) and (16), temperature increase amounts $\Delta T_1$ and $\Delta T_2$ necessary for obtaining a desired insertion loss D can be obtained uniquely by pre-determining a desired insertion loss D and temperature coefficients $\alpha_{1TE}$, $\alpha_{1TM}$, $\alpha_{2TE}$, and $\alpha_{2TM}$ of equivalent refractive indices of respective polarized lights in the first and second phase section-connected optical waveguides in the first and second phase adjustment means-formation portions.

In other words, a desired insertion loss D free from polarization dependence can be obtained by imparting temperature coefficients $\alpha_{1TE}$, $\alpha_{1TM}$, $\alpha_{2TE}$, and $\alpha_{2TM}$ of equivalent refractive indices of respective polarized lights in the first and second phase section-connected optical waveguides and predetermining necessary temperature increase amounts $\Delta T_1$ and $\Delta T_2$.

Likewise, amounts of supplied power to the first and second thin film heaters (electric power that is applied to the first and second thin film heaters) $W_1$ and $W_2$ are expressed by the following Equations (17) and (18).

$$W_2 = \frac{1}{\gamma_{2TE}}\left(\gamma_{1TE}W_1 + \Delta n_{0TE} - \frac{\lambda}{\pi L}\cos^{-1}\sqrt{\frac{10^{-\frac{D}{10}}}{4\kappa(1-\kappa)}}\right) \quad (17)$$

$$W_1 = \frac{(\lambda_{2TM} - \gamma_{2TE})\left(\frac{\lambda}{\pi L}\cos^{-1}\sqrt{\frac{10^{-\frac{D}{10}}}{4\kappa(1-\kappa)}}\right) - \gamma_{2TM}\Delta n_{0TE} + \gamma_{2TE}\Delta n_{0TM}}{(\gamma_{1TE}\lambda_{2TM} - \gamma_{1TM}\gamma_{2TE})} \quad (18)$$

As understood from the Equations (17) and (18), amounts of supplied power $W_1$ and $W_2$ necessary for obtaining a desired insertion loss D can be uniquely determined by predetermining equivalent refractive index differences $\Delta n_{OTE}$ and $\Delta n_{OTM}$ in respective polarized lights between the first and second phase section-connected optical waveguides in the first and second phase adjustment means-formation portions under the condition in which no power is supplied, rates of changes $\gamma_{1TE}$, $\gamma_{1TM}$, $\gamma_{2TE}$, and $\gamma_{2TM}$ of equivalent refractive indices of the first and second phase section-connected optical waveguides in the first and second phase adjustment means-formation portions with respect to the amounts of supplied power to the first and second thin film heaters, which are first and second phase adjustment means, and a desired insertion loss D.

It should be noted that equivalent refractive index differences $\Delta n_{OTE}$ and $\Delta n_{OTM}$ of respective polarized lights between the first and second phase section-connected optical waveguides in the first and second phase adjustment means-formation portions under the condition in which no power is supplied can be derived from the measurement result of coupling efficiency under the condition in which no power is supplied, using Equation (14).

In other words, a desired insertion loss D free from polarization dependence can be obtained by imparting equivalent refractive index differences $\Delta n_{OTE}$ and $\Delta n_{OTM}$ in respective polarized lights between the first and second phase section-connected optical waveguides in the first and second phase adjustment means-formation portions under the condition in which no power is supplied, and rate of changes $\gamma_{1TE}$, $\gamma_{1TM}$, $\gamma_{2TE}$, and $\gamma_{2TM}$ of equivalent refractive indices of the first and second phase section-connected optical waveguides in the first and second phase adjustment means-formation portions with respect to amounts of supplied power to the first and second thin film heaters, which are the first and second phase adjustment means, and pre-determining necessary amounts of supplied power $W_1$ and $W_2$.

As a result of the study on formulation concerning elimination of the polarization dependence of insertion loss, by supplying electric power that satisfy Equations (15) and (16), or Equations (17) and (18), to the first and second phase adjustment means, it is possible to impart equal equivalent refractive index differences $\Delta n = \Delta n_{TE} = \Delta n_{TM}$ to the TE polarized light and the TM polarized light, that is as understood from Equation (4), it is possible to impart equal phase differences to the TE polarized light and the TM polarized light. Therefore, equal insertion losses D free from polarization dependence can be obtained for the TE polarized light and TM polarized light.

Accordingly, the Mach-Zehnder interferometer-type variable optical attenuator of the preferred embodiment 2-1 can realize an optical circuit device as a Mach-Zehnder interferometer-type variable optical attenuator free from the polarization dependence of insertion loss.

Next, a method of manufacturing a Mach-Zehnder interferometer-type variable optical attenuator that is the optical circuit device of the preferred embodiment 2-1 is described below. FIG. 2-2 is an explanatory view illustrating a method of manufacturing an optical circuit device as an Mach-Zehnder interferometer-type variable optical attenuator of the preferred embodiment 2-1. FIG. 2-2 shows a cross-sectional view taken along line A—A in FIG. 2-1-A.

First, a lower cladding layer 2 (2a) having a film thickness of 40 $\mu$m and a core layer 1 having a film thickness of 6 $\mu$m, composed of quartz-based glass, were deposited on a silicon substrate 7 shown in FIG. 2-2-A using a frame hydrolysis deposition method (FHD method). At this time, $GeO_2$ was added to the core layer 1 so that the refractive index of the core layer 1 resulted in 0.8% higher than that of the lower cladding layer 2 (2a).

Next, as shown in FIG. 2-2-B, an optical waveguide circuit having a width of 6.5 $\mu$m of the core 1 was patterned using photolithography and dry etching. The optical waveguide circuit 30 of the core 1 was, as shown in FIG. 2-1-A, formed to have an optical splitter 21a and an optical coupler 21b, as well as first and second connecting optical waveguides 1 (1e and 1f), which have equal lengths to each other, for connecting the optical splitter 21a and the optical coupler 21b, and the first and second connecting optical waveguides 1 (1e and 1f) have straight-lined portions having a length of 5 mm along the longitudinal direction, which are phase section-connected optical waveguides 1 (1s and 1t).

In addition, the first and second phase section-connected optical waveguides 1 (1s and 1t), which are the straight-lined portions of the first and second connecting optical waveguides 1 (1e and 1f), are juxtaposed at a gap of 250 $\mu$m. Further, the coupling efficiency η of the optical splitter 21a and the optical coupler 21b is determined to be 50% for a light beam having a wavelength of 1.55 $\mu$m. FIG. 2-2 shows cross sections taken along line A—A in FIG. 2-1-A, so the core 1 shown therein is the cross sections of the first and second phase section-connected optical waveguides 1 (1s and 1t).

Next, as shown in FIG. 2-2-C, an upper cladding layer 2 (2b) having a film thickness of 20 $\mu$m was formed using a FHD method to bury the optical waveguide circuit of the core 1 in the cladding layer 2, and an optical waveguide layer 3 was formed.

Next, as shown in FIGS. 2-2-D and 2-1-A, using a sputtering method and a lift-off method, Ni thin film heaters 9a and 9b were provided on the respective upper surface areas of the optical waveguide layer 3 that correspond to the first and second phase section-connected optical waveguides 1 (1s and 1t). The first and second thin film heaters 9a and 9b are formed to have a length of 5 mm, a width of 10 m and a film thickness of 0.5 $\mu$m, forming first and second phase adjustment means 8a and 8b. Additionally, a Ti film having a film thickness of 0.1 $\mu$m was formed under the Ni film to improve the adhesion between the Ni film and the surface of the optical waveguide layer 3. FIG. 2-2-D shows a cross-sectional view taken along line A—A in FIG. 2-1-A.

First and second phase shifters are composed of the first and second phase adjustment means 8a and 8b and the first and second phase section-connected optical waveguides 1 (1s and 1t) in the portions where the first and second phase adjustment means 8a and Bb are formed.

Next, a power supply line (not shown) formed of three layers of Ti/Ni/Au was formed in a similar method to the manufacture method of the first and second thin film heaters 9a and 9b.

Next, as shown in FIGS. 2-2-E, 2-1-A, and 2-1-B, the optical waveguide layer 3 on both sides sandwiching a portion in which the first thin film heater 9a, which is the first phase adjustment means 8a of the first phase shifter, is formed is removed by dry etching from regions spaced apart parallel to the first phase section-connected optical waveguide 1 (1s) along the longitudinal direction of the first phase section-connected optical waveguide, from the surface of the optical waveguide layer to the substrate surface, forming optical waveguide layer-removed portions 5 configured to be stress-releasing grooves. The dimensions of the optical waveguide layer-removed portions 5 were 5 mm long and 50 $\mu$m wide. The width of the optical waveguide layer 3 (3a) including the first phase section-connected optical waveguide was formed to be 45 $\mu$m. Additionally, the width of the optical waveguide layer 3 (3b) including the second phase section-connected optical waveguide was formed to be 1 mm.

The Mach-Zehnder interferometer-type variable optical attenuator as the optical circuit device of the preferred embodiment 2-1 is manufactured as described above. Next, with the Mach-Zehnder interferometer-type variable optical attenuator of the preferred embodiment 2-1 thus manufactured, a method for obtaining a desired predetermined optical attenuation free from polarization dependence of optical attenuations is described.

First, in the state in which no power is supplied to the first and second phase shifters, propagating light having a wavelength of 1.55 $\mu$m of TE polarized light and TM polarized light was input from the incident end 17 of the first optical waveguide 1 (1a), as shown in FIG. 2-1-A, and insertion losses D of both TE polarized light and TM polarized light of the propagating light that was emitted from the emission end 20 of the fourth optical waveguide 1 (1d) were measured independently from each other. As a result, insertion losses of the TE polarized light and the TM polarized light were 0.98 dB and 0.95 dB, respectively, including the connection losses with optical fibers.

Next, power was supplied to the first and second phase adjustment means 8a and 8b of the first and second phase shifters independently from each other, and respective insertion losses of the TE polarized light and the TM polarized light were measured to obtain the relationship between amounts of supplied power and insertion losses. In addition, the differences in insertion loss due to respective polarized lights (PDL) were also obtained. The results are shown in FIG. 2-4. FIG. 2-4-A illustrates the relationship between the amount of supplied power and insertion loss as well as the difference in insertion loss due to respective polarized lights (PDL) with the amount of supplied power in the first phase shifter. Likewise, FIG. 2-4-B illustrates the relationship between the amount of supplied power and insertion loss as well as the difference in insertion loss (PDL) due to respective polarized lights with the amount of supplied power in the second phase shifter.

In FIGS. 2-4-A and 2-4-B, the characteristic curve a represents insertion loss of TE polarized light with respect to the amount of supplied power; the characteristic curve b represents insertion loss of TM polarized light with respect to the amount of supplied power; and the characteristic curve c represents the difference in insertion losses between TE polarized light and TM polarized light with respect to the amount of supplied power (PDL).

As will be understood from FIGS. 2-4-A and 2-4-B, the differences in the insertion losses (PDL) of the TE polarized light and TM polarized light for the same the amount of supplied power greatly differ between the case where power is supplied to the first phase adjustment means and the case where power is supplied to the second phase adjustment means. This is due to the fact that the optical waveguide layer on both sides sandwiching a portion in which the first thin film heater, which is the first phase adjustment means of the first phase shifter, is formed is removed from the regions spaced apart parallel to the first phase section-connected optical waveguide along the longitudinal direction of the first phase section-connected optical waveguide, forming optical waveguide layer-removed portions.

As will be understood from FIGS. 2-4-A, when the insertion loss is at about 11 dB, that is, when the optical attenuation (increase of the insertion loss from the initial state) is at about 10 dB, PDL is about 1 dB, which is large, even in the case where power is supplied only to the first phase adjustment means of the first phase shifter in which the optical waveguide layer-removed portion is formed. This means that PDL is not reduced enough to use the device as a first phase shifter alone even when the optical waveguide layer-removed portion 5 is formed.

Next, the relationship of rates of change of equivalent refractive induces of the first and second phase section-connected optical waveguides in the first and second phase shifter portions with the amounts of supplied power is obtained from the measurement result of insertion losses of TE polarized light and TM polarized light shown in FIGS. 2-4-A and 2-4-B.

As will be understood from Equation (14), in the case where power is supplied to either one of the first and second phase shifters, the rate of change of the equivalent refractive index in the phase section-connected optical waveguide of the phase shifter to which power is supplied is equal to the rate of change of the equivalent refractive index difference $\Delta n$ in the first and second phase section-connected optical waveguides of the first and second phase shifters.

In view of that, by obtaining measurement results of insertion loss (the values in the characteristic curves a and b in FIGS. 2-4-A and 2-4-B) when electric power is supplied to one of the first and second phase adjustment means of the first and second phase shifters independently, and equivalent refractive indices $\Delta n$ at amounts of supplied power from Equation (14), the relationship of equivalent refractive index difference $\Delta n$ with the amount of supplied power concerning TE polarized light and TM polarized light was obtained. The results are shown in FIGS. 2-5-A and FIG. 2-5-B. It should be noted that measurement values adopted for coupling efficiency K of the optical splitter and the optical coupler, which are 2×2 directional optical couplers, were the values measured for the optical splitter alone and those for the optical coupler alone, both of which are 2×2 directional optical couplers fabricated on the same substrate.

FIG. 2-5-A represents equivalent refractive index difference $\Delta n$ concerning TE polarized light and TM polarized light versus the amount of supplied power when power is independently supplied to the first phase adjustment means of the first phase shifter. Likewise, FIG. 2-5-B represents equivalent refractive index difference $\Delta n$ concerning TE polarized light and TM polarized light versus the amount of supplied power when power is independently supplied to the second phase adjustment means of the second phase shifter.

In FIGS. 2-5-A and 2-5-B, the characteristic curve a represents equivalent refractive index difference $\Delta n$ of TE polarized light, and the characteristic curve b represents equivalent refractive index difference $\Delta n$ of TM polarized light. From FIGS. 2-5-A and 2-5-B, rates of change $\gamma_{1TE}$, $\gamma_{1TM}$, $\gamma_{2TE}$, and $\gamma_{2TM}$ of equivalent refractive index differences $\Delta n$ of the TE polarized light and TM polarized light in the first and second phase section-connected optical waveguides of the first and second phase shifters were obtained with respect to the amount of supplied power; the results are shown in Table 1.

TABLE 1

| $\gamma_{1TE}$ | $\gamma_{1TM}$ | $\gamma_{2TE}$ | $\gamma_{2TM}$ |
| --- | --- | --- | --- |
| $7.777 \times 10^{-7}$ | $8.227 \times 10^{-7}$ | $3.281 \times 10^{-7}$ | $3.615 \times 10^{-7}$ |

Based on the above-described measurement results, the amounts of supplied power to the first and second phase adjustment means that yield predetermined equal optical attenuations of TE polarized light and TM polarized light were obtained from Equations (17) and (18) within the range of optical attenuations from 0 to 20 dB (the amount obtained by subtracting an initial insertion loss from an insertion loss, that is, an increase in insertion loss); the results are shown in FIG. 2-6. In FIG. 2-6, the characteristic curve a represents the relationship between predetermined optical attenuations and amounts of supplied power in the first phase shifter, and characteristic curve b represents the relationship between optical attenuations and amounts of supplied power in the second phase shifter.

In order to confirm the results obtained from Equations (17) and (18) as described above (FIG. 2-6), power was supplied to the first and second phase adjustment means so that predetermined optical attenuations of 5, 10, 15, and 20 dB were obtained, and actually-measured optical attenuations and PDL with respect to the predetermined optical attenuations were obtained. The results are shown in Table 2.

TABLE 2

| Pre-determined optical attenuation (dB) | Supplied power to first phase shifter (mW) | Supplied power to second phase shifter (mW) | Optical attenuation of TE polarized light (dB) | Optical attenuation of TM polarized light (dB) | PDL (dB) |
| --- | --- | --- | --- | --- | --- |
| 5.0 | 150.4 | 201.5 | 5.00 | 5.02 | −0.02 |
| 10.0 | 231.5 | 310.9 | 9.93 | 10.03 | −0.10 |
| 15.0 | 273.6 | 367.8 | 14.97 | 15.05 | −0.08 |
| 20.0 | 296.8 | 399 | 19.95 | 20.07 | −0.12 |

FIG. 2-7 illustrates the results of Table 2 in a graph format. In FIG. 2-7, the characteristic curve a represents the relationship between predetermined optical attenuation of TE polarized light and actually measured attenuation of measured light; the characteristic curve b represents the relationship between predetermined optical attenuation of TM polarized light and actually measured attenuation of measured light; and the characteristic curve c represents the relationship between predetermined optical attenuation and PDL.

As will be understood from Table 2 and FIG. 2-7, even when a large optical attenuation of 20 dB is imparted, PDL is suppressed to be very small, −0.12 dB. From the foregoing results, it will be appreciated that according to the configurations of the present invention, it is possible to substantially eliminate polarization dependence of optical attenuations in the Mach-Zehnder interferometer-type variable optical attenuator, which is the optical circuit device of the preferred embodiment 2-1 and to achieve desired optical attenuations without degrading optical characteristics of propagating light.

Next, a preferred embodiment 2-2 according to the present invention is described. The preferred embodiment 2-2 is illustrated in FIGS. 2-8-A and 2-8-B. FIG. 2-8-B is a cross-sectional view taken along line A—A of the Mach-Zehnder interferometer-type variable optical attenuator, which is an optical circuit device, of FIG. 2-8-A.

The configuration of the preferred embodiment 2-2 is generally similar to the configuration of the preferred embodiment 2-1, and a difference in the configuration of the preferred embodiment 2-2 from the configuration of the preferred embodiment 2-1 is that optical waveguide-removed portions 5 are also formed on both sides of the second phase adjustment means 8b along the second phase section-connected optical waveguide 1 (1t) to form stress-releasing grooves, and the width of the optical waveguide layer 3 (3a) including the first phase section-connected optical waveguide 1 (1s) and the width of the optical waveguide layer 3 (3b) including the second phase section-connected optical waveguide 1 (1t) are made different. Width $L_1$ of the optical waveguide layer 3 (3a) is 30 μm, and width $L_2$ of the optical waveguide layer 3 (3b) is 100 μm. The rest of the configuration is similar to the preferred embodiment 2-1, and the manufacture method is also similar to the preferred embodiment 2-1.

In the preferred embodiment 2-2, optical attenuations of TE polarized light and TM polarized light were measured using a power supply method and a measurement method similar to those of the preferred embodiment 2-1. Power was supplied to the first phase shifter and the second phase shifter so that predetermined optical attenuations of 5, 10, 15, and 20 dB were obtained, and actually-measured optical attenuations and PDL were obtained with respect to the predetermined optical attenuations. The results are shown in Table 3.

TABLE 3

| Pre-determined optical attenuation (dB) | Supplied power to first phase shifter (mW) | Supplied power to second phase shifter (mW) | Optical attenuation of TE polarized light (dB) | Optical attenuation of TM polarized light (dB) | PDL (dB) |
|---|---|---|---|---|---|
| 5.0 | 42.3 | 12.7 | 4.95 | 5.02 | −0.07 |
| 10.0 | 70.6 | 35.0 | 10.03 | 10.00 | 0.03 |
| 15.0 | 85.3 | 46.6 | 15.01 | 15.05 | −0.04 |
| 20.0 | 93.3 | 52.9 | 19.95 | 20.07 | −0.12 |

As will be understood from Table 3, even when a large optical attenuation of 20 dB is imparted, PDL is suppressed to be very small, −0.12 dB in the preferred embodiment 2-2 as well. Moreover, in the preferred embodiment 2-2, the amount of supplied power is also considerably reduced because optical waveguide-removed portions 5 are formed on both sides of each of the first and second phase shifters and the width of the optical waveguide layer 3 (3b) including the second phase section-connected optical waveguide is considerably reduced in comparison with the corresponding width in the preferred embodiment 2-1.

Next, a preferred embodiment 2-3 according to the present invention is described. The preferred embodiment 2-3 is illustrated in FIGS. 2-9-A and 2-9-B. FIG. 2-9-B is a cross-sectional view taken along line A—A of the Mach-Zehnder interferometer-type variable optical attenuator, which is an optical circuit device, of FIG. 2-9-A.

The configuration of the preferred embodiment 2-3 is generally similar to the configuration of the preferred embodiment 2-1, and a difference in the configuration of the preferred embodiment 2-3 from the configuration of the preferred embodiment 2-1 is that the optical waveguide layer 3 on both sides sandwiching a portion where the first thin film heater 9a, which is the first phase adjustment means 8a, of the first phase shifter is formed is removed from regions spaced apart parallel to the first phase section-connected optical waveguide along the longitudinal direction of the first phase section-connected optical waveguide, from the surface of the optical waveguide layer to the surface of the substrate surface, to form an optical waveguide layer-removed portion 5, and in addition, a recessed portion 4 having a rectangular cross-sectional shape is provided in the surface portion of the silicon substrate including the entire region facing the bottom part of the optical weveguide layer-removed portion 5.

Moreover, the optical splitter 21a and the optical coupler 21b, which are 2×2 directional optical couplers, are configured to be an optical splitter 21a and an optical coupler 21b of 2×2 multi-mode interferometer (MS) waveguide configuration having a splitting ratio of 1 to 1. The 2×2 MMI of the optical splitter 21a and the optical coupler 21b have such advantages over 2×2 directional optical couplers that the wavelength dependence of the splitting ratio is smaller.

A method of manufacturing according to the preferred embodiment 2-3 is described below. FIGS. 2-10-A to 2-10-F illustrate manufacturing steps according to the preferred embodiment 2-3. The manufacturing steps from FIG. 2-10-A through FIG. 2-10-E are similar to the manufacturing steps from FIG. 2-2-A through FIG. 2-2-E of the preferred embodiment 2-1, so the description of the manufacturing steps from FIG. 2-10-A through FIG. 2-10-E is omitted and FIG. 2-10-F will be explained, which illustrates a characteristic manufacturing step of the preferred embodiment 2-3 in which recessed portions 4 having a rectangular cross-sectional shape are formed in the surface portion of the silicon substrate.

After optical waveguide layer-removed portions 5 were removed in FIG. 2-10-E, in FIG. 2-10-F, a chip in which a Mach-Zehnder interferometer-type variable optical attenuator, being an optical circuit device, was formed was soaked into a KOH aqueous solution, and the silicon substrate was etched utilizing anisotropic etching of silicon substrate with KOH to form recessed portions 4 having a rectangular cross-sectional shape and dimensions of 10 μm deep, 5 mm long, and 70 μm wide, which is 20 μm wider than the width 50 μm of the bottom part of the optical waveguide layer-removed portion 5.

With a Mach-Zehnder interferometer-type variable optical attenuator thus manufactured, optical attenuations of TE polarized light and TM polarized light were measured using a power supply method and a measurement method similar to those of the preferred embodiment 2-1. Power is supplied to the first phase shifter and the second phase shifter so that predetermined optical attenuations of 5, 10, 15, and 20 dB can be obtained, and actually-measured optical attenuations and PDL were obtained with respect to the predetermined optical attenuations. The results are shown in Table 4.

TABLE 4

| Pre-determined optical attenuation (dB) | Supplied power to first phase shifter (mW) | Supplied power to second phase shifter (mW) | Optical attenuation of TE polarized light (dB) | Optical attenuation of TM polarized light (dB) | PDL (dB) |
|---|---|---|---|---|---|
| 5.0 | 75.20 | 100.75 | 4.99 | 5.02 | −0.03 |
| 10.0 | 115.75 | 155.45 | 9.95 | 10.05 | −0.10 |
| 15.0 | 136.80 | 183.90 | 15.00 | 14.98 | 0.02 |
| 20.0 | 148.40 | 199.50 | 20.04 | 19.88 | 0.16 |

As will be understood from Table 4, even when a large optical attenuation of 20 dB is imparted, PDL is suppressed to be very small, 0.16 dB, and the polarization dependence of optical attenuations is almost eliminated. Additionally, because the recessed portions 4 having a rectangular cross-sectional shape are provided in the surface portion of the silicon substrate including the entire region facing the bottom part of the optical waveguide layer-removed portion 5 in addition to the provision of the optical waveguide layer-removed portions 5, the amount of supplied power in the preferred embodiment 2-2 is reduced to about 70% the amount of supplied power of the preferred embodiment 2-1.

Next, a preferred embodiment 2-4 according to the present invention is described. The preferred embodiment 2-4 is illustrated in FIGS. 2-11-A, 2-11-B, and 2-11-C. FIG. 2-11-B is a cross-sectional view taken along line A—A of the Mach-Zehnder interferometer-type variable optical attenuator, which is an optical circuit device, of FIG. 2-11-A. FIG. 2-11-C is a cross-sectional view taken along line B—B of the Mach-Zehnder interferometer-type variable optical attenuator, which is an optical circuit device, of FIG. 2-11-A.

The configuration of the preferred embodiment 2-4 is generally similar to the configuration of the preferred embodiment 2-2, and a difference in the configuration of the preferred embodiment 2-4 from the configuration of the preferred embodiment 2-2 is that: a first dummy phase adjustment means 8a' having the same configuration the as the first phase adjustment means 8a and serving as a dummy is formed for the second connecting optical waveguide 1 (1f) opposing the same first phase adjustment means 8a as that of the preferred embodiment 2-2; and optical waveguide layer-removed portions 5 having the same configuration as the optical waveguide layer-removed portions 5 that are on both sides of the first phase adjustment means 8a are formed on both sides of the first dummy phase adjustment means 8a'; the second phase adjustment means 8b is spaced apart from the first dummy phase adjustment means 8a' and is connected in series to the optical coupler 21b side; a second dummy phase adjustment means 8b' having the same configuration as the second phase adjustment means 8b and serving as a dummy is formed for the first connecting optical waveguide 1 (1e) opposing the second phase adjustment means 8b; optical waveguide layer-removed portions 5 having the same configuration as the optical waveguide layer-removed portions 5 that are on both sides of the second phase shifter are formed on both sides of the second dummy phase adjustment means 8b'; and the first phase adjustment means 8a is spaced apart from the second dummy phase adjustment means 8b' and is connected in series to the optical splitter 21a side.

Another difference in the configuration of the preferred embodiment 2-4 from the configuration of the preferred embodiment 2-2 is that: the optical splitter 21a and the optical coupler 21b of the preferred embodiment 2-4 are Y-splitters having a splitting ratio of 1 to 1, in place of the 2×2 directional optical couplers of the preferred embodiment 2-2; further, the optical waveguide connected to the incident side of the optical splitter 21a in the preferred embodiment 2-4 is only one incident light waveguide 1 (1a'), compared to the two waveguides, the first optical waveguide 1 (1a) and the second optical waveguide 1 (1b), in the preferred embodiment 2-2; and likewise, the optical waveguide connected to the emitting side of the optical coupler 21b in the preferred embodiment 2-4 is only one emission light waveguide 1 (1c'), compared to the two waveguides, the third optical waveguide 1 (1c) and the fourth optical waveguide 1 (1d), in the preferred embodiment 2-2. The Y-splitter having a splitting ratio of 1 to 1 has such a characteristic that wavelength dependence of the splitting ratio is less than that of 2×2 directional optical coupler.

The configuration of the preferred embodiment 2-4 is as described above, and the width of the optical waveguide layer 3 (3a) including the first phase section-connected optical waveguide 1 (1s) of the first phase shifter is 30 μm, whereas the width of the optical waveguide layer 3 (3b) including the second phase section-connected optical waveguide 1 (1t) of the second phase shifter is 100 μm, as in the preferred embodiment 2-2.

The manufacture method according to the preferred embodiment 2-4 is similar to that in the preferred embodiment 2-2, and therefore the description is omitted herein.

With the Mach-Zehnder interferometer-type variable optical attenuator, which was manufactured in a similar manufacture method to that in the preferred embodiment 2-2, signal light was input from the incident end 17' of the incident light waveguide 1 (1a') in a similar power supply method to that in the preferred embodiment 2-1, and optical attenuations of the TE polarized light and TM polarized light emitted from the emitting end 19' of the emission light waveguide 1 (1c') were measured. Power was supplied to the first phase shifter and the second phase shifter so that predetermined optical attenuations of 5, 10, 15, and 20 dB were obtained, and actually-measured optical attenuations and PDL with respect to the predetermined optical attenuations were obtained. The results are shown in Table 5.

TABLE 5

| Pre-determined optical attenuation (dB) | Supplied power to first phase shifter (mW) | Supplied power to second phase shifter (mW) | Optical attenuation of TE polarized light (dB) | Optical attenuation of TM polarized light (dB) | PDL (dB) |
|---|---|---|---|---|---|
| 5.0 | 35.9 | 20.00 | 5.01 | 4.96 | 0.05 |
| 10.0 | 60.00 | 33.40 | 10.02 | 9.97 | 0.05 |
| 15.0 | 72.50 | 40.30 | 14.98 | 15.06 | −0.08 |
| 20.0 | 79.30 | 44.10 | 19.94 | 20.05 | −0.11 |

As will be understood from Table 5, the performance of elimination of polarization dependence of optical attenuations obtained in the preferred embodiment 2-4 was almost the same degree to that of the preferred embodiment 2-2, and moreover, reduction in the amount of supplied power was also achieved compared with the preferred embodiment 2-2.

In the preferred embodiment 2-4, the first dummy phase adjustment means 8a' and the second dummy phase adjustment means 8b' were arranged at the locations opposing the first phase adjustment means 8a and the second phase adjustment means 8b, respectively, but such an arrangement was described for illustrative purposes only. The positional relationship of the first phase adjustment means 8a and the second dummy phase adjustment means 8b' arranged for the first connecting optical waveguide is not limited, and the second dummy phase adjustment means 8b' may be formed on the optical splitter side relative to the first phase adjustment means 8a, or may be formed to the optical coupler side. Likewise, the positional relationship of the second phase adjustment means 8b and the first dummy phase adjustment means 8a' provided for the second connecting optical waveguide is not limited, and the first dummy phase adjustment means 8a' may be formed on the optical splitter side relative to the second phase adjustment means 8b, or may be formed on the optical coupler side.

Furthermore, the first phase adjustment means 8a need not be arranged at a location opposing the first dummy phase adjustment means 8a' or the second phase adjustment means 8b, and the second phase adjustment means 8b need not be arranged at a location opposing the second dummy phase adjustment means 8b' or the first phase adjustment means 8a.

In the preferred embodiments 2-1 through 2-4, the first phase shifter and the second phase shifter are independently supplied with power by separate power supply sources since the amounts of power to be supplied to the first phase shifter and the second phase shifter are different from each other.

Next, a preferred embodiment 2-5 according to the present invention is described. The preferred embodiment 2-5 shows an embodiment in which a common power supply source supplies power to the first phase shifter and the second phase shifter.

The preferred embodiment 2-5 is illustrated in FIGS. 2-12-A, 2-12-B, and 2-12-C. FIG. 2-12-B is a cross-sectional view taken along line A—A of the Mach-Zehnder interferometer-type variable optical attenuator, which is an optical circuit device, of FIG. 2-12-A. FIG. 2-12-C is a cross-sectional view taken along line B—B of the Mach-Zehnder interferometer-type variable optical attenuator, which is an optical circuit device, of FIG. 2-12-A.

The configuration of the preferred embodiment 2-5 is generally similar to the configuration of the preferred embodiment 2-4, and a difference in the configuration of the preferred embodiment 2-5 from the configuration of the preferred embodiment 2-4 is that: a power supply line (hereafter referred to as an "electrode") 44 connected to both sides of the thin film heaters 9a and 9b, which are the first and second phase adjustment means 8a and 8b, is formed on the optical waveguide layer; the electrode 44 connected to the optical splitter 21a side of the first and second thin film heaters 9a and 9b has a common end portion 44a connected to a single power-supplying source (hereafter referred to as a "power source") 50; and likewise, the electrode 44 connected to the optical coupler 21b side of the first and second thin film heaters 9a and 9b has a common end portion 44b connected to the power source 50. Both end portions 44a and 44b of the electrode 44 are connected to the common power source 50 via a lead 45. Another feature is that a thin film resistor 46 is arranged in a middle portion of the electrode 44 that is on the optical coupler 21b side of the second thin film heater 9b.

First, a study was conducted on the formulation concerning the power supply to the first phase shifter and the second phase shifter using a common power source.

Substituting Equation (14) into Equations (17) and (18) yields the following Equations (19) and (20).

$$W_2 = \frac{1}{\gamma_{2TE}}(\gamma_{1TE}P_1 + \Delta n_{0TE} - \Delta n) \tag{19}$$

$$W_1 = \frac{(\gamma_{2TM} - \gamma_{2TE})\Delta n - \gamma_{2TM}\Delta n_{0TE} + \gamma_{2TE}\Delta n_{0TM}}{(\gamma_{1TE}\gamma_{2TM} - \gamma_{1TM}\gamma_{2TE})} \tag{20}$$

In the case of the configuration of the preferred embodiment 2-5, since the initial phase difference $\Delta_{0TE}$ and $\Delta_{0TM}$ between the first and second phase section-connected optical waveguides 1 (1s and 1t) becomes nearly zero, Equations (19) and (20) can be approximated by the following Equations (21) and (22).

$$W_2 = \frac{1}{\gamma_{2TE}}(\gamma_{1TE}P_1 - \Delta n) \tag{21}$$

$$W_1 = \frac{(\gamma_{2TM} - \gamma_{2TE})\Delta n}{\gamma_{1TE}\gamma_{2TM} - \gamma_{1TM}\gamma_{2TE}} \tag{22}$$

By obtaining ratio $W_2/W_1$ of $W_2$ and $W_1$ from the above Equations (21) and (22), the following Equation (23) is obtained.

$$\frac{W_2}{W_1} = \frac{\gamma_{1TE}}{\gamma_{2TE}} \frac{(\gamma_{1TE}\gamma_{2TM} - \gamma_{1TM}\gamma_{2TE})}{\gamma_{2TE}(\gamma_{2TM} - \gamma_{2TE})} \tag{23}$$

From Equation (23), it is understood that ratio $W_2/W_1$ results in a constant value, and is not dependent on equivalent refractive index difference $\Delta n$, that is, not dependent on the amount of supplied power. Based on the result of the above-described study, the preferred embodiment 2-5 was conceived, in which power supply to the first phase shifter and the second phase shifter by a common power source.

The configuration of the preferred embodiment 2-5 is described in more details referred to FIG. 2-12.

Resistance value $R_2$ of the second thin film heater 9b of the second phase shifter is determined to be less than resistance value $R_1$ of the first thin film heater 9a of the first phase shifter. Specifically, the width of the second thin film heater 9b is formed to be greater (wider) than the width of the first thin film heater 9a.

In addition, a thin film resistor 46 with resistance value r is arranged in a middle portion of the electrode 44 on the optical coupler 21b side of the second thin film heater 9b of the second phase shifter, and at a location sufficiently spaced apart from the end portion of the optical coupler 21b side of the second phase section-connected optical waveguide 1 (1t) in order that temperature variation is not caused in the second phase section-connected optical waveguide 1 (1t). Also, the sum $R_2+r$ of the resistance value $R_2$ of the thin film resistor 46 of the second thin film heater 9b and the resistance value r is determined to be equal to the resistance value $R_1$ of the first thin film heater 9a. The thin film resistor 46 is fabricated in a similar manner to the thin film heaters in the phase shifters.

Electric powers $W_1$ and $W_2$ applied to the first and second thin film heaters 9a and 9b are represented by the following Equations (24) and (25), where the voltage applied to the first thin film heater 9a is $E_1$, the voltage applied to the second thin film heater 9b is $E_2$, and the voltage from the power source 50 is E. Note that I denotes the current passed through the first and second thin film heaters 9a and 9b.

$$W_1 = IE_1 = \frac{E^2}{R_1} \tag{24}$$

$$W_2 = IE_2 = \frac{E^2}{R_1}\left(\frac{R_2}{R_2 + r}\right) = \frac{E^2 R_2}{R_1^2} \tag{25}$$

By obtaining ratio $W_2/W_1$ of $W_2$ and $W_1$ from the above Equations (24) and (25), the following Equation (26) is obtained.

$$\frac{W_2}{W_1} = \frac{R_2}{R_1} \tag{26}$$

Accordingly, it will be understood that $R_2$ can be determined from $R_1$ and $R_2$ that yield the same ratio as a predetermined power ratio, in order to obtain the predetermined electric powers $W_1$ and $W_2$ calculated. Thus, in the preferred embodiment 2-5, the ratio of electric power $W_1$ and $W_2$ is determined to be the following Equation (27), based on Table 5 in the preferred embodiment 2-4.

$$\frac{W_2}{W_1} = 0.566 \tag{27}$$

Consequently, resistance value $R_2$ of the second thin film heater 9b is determined as the following Equation (28).

$$R_2'=0.556 \times R_2 \quad (28)$$

To satisfy the above Equation (28), the width of the second thin film heater 9b was determined to be 17.99 μm, which is 1/0.556 times that of the width of the first thin film heater 9a, which was 10 μm. Likewise, in order that resistance value r of the thin film resistor 46 becomes a resistance value (1−0.556)=0.444 times that of the resistance value $R_1$ of the first thin film heater 9a, the width of the thin film resistor 46 was determined to be the same as the width of the first thin film heater 9a, which was 10 μm, and the length was determined to be 2220 μm, which was 0.444 times that of the length of the first thin film heater 9a, which was 5 mm (5000 μm).

The rest of the configuration and the manufacture method are similar to those in the preferred embodiment 2-4. With a variable optical attenuator thus manufactured, which is an optical circuit device, power was supplied from the common power source 50, and in a similar measurement method to the measurement method in the preferred embodiment 2-4, predetermined optical attenuations and actually-measured optical attenuations were compared in the case where power was supplied to the first thin film heater 9a and the circuit of the second thin film heater 9b including the thin film resistor 46 from a common power source at the same electric power so that predetermined optical attenuations of 5, 10, 15, and 20 dB were obtained. The results are shown in Table 6.

TABLE 6

| Pre-determined optical attenuation (dB) | Supplied power to first thin film heater and second thin film heater circuit including thin film resistor (mW) | Optical attenuation of TE polarized light (dB) | Optical attenuation of TM polarized light (dB) | PDL (dB) |
|---|---|---|---|---|
| 5 | 71.90 | 4.97 | 5.02 | −0.05 |
| 10 | 120.00 | 9.94 | 10.04 | −0.10 |
| 15 | 144.90 | 14.95 | 15.10 | −0.15 |
| 20 | 158.60 | 19.86 | 20.12 | −0.26 |

It should be noted that in the preferred embodiment 2-5, electric power cannot be supplied individually to the first thin film heater and the circuit of the second thin film heater including the thin film resistor; therefore, the value obtained in the preferred embodiment 2-4 is used for the electric power for obtaining a desired optical attenuation. Specifically, the amount of the whole supplied power in the preferred embodiment 2-4 is assumed to be two times the amount of supplied power to the first thin film heater of the preferred embodiment 2-4, the amount of supplied power to the first thin film heater and the second thin film heater circuit including the thin film resistor in the preferred embodiment 2-5 is determined to be equal to the amount of supplied power to the first thin film heater and the second thin film heater in the preferred embodiment 2-4. In the preferred embodiment 2-5, the resistance value of the electrode 44 is ignored because the resistance value of the electrode 44 is sufficiently small compared to the resistance values of the thin film heaters 9a and 9b and the thin film resistor 46.

From the results shown in Table 6, it is understood that the preferred embodiment 2-5 also achieves almost the same degree of effect for eliminating the polarization dependence of optical attenuations as the preferred embodiment 2-4. It should be noted that the embodiment in which power is supplied to the first phase shifter and the second phase shifter by a common power source is not limited to the preferred embodiment 2-5, although the case of the preferred embodiment 2-5 was described; with any one of the preferred embodiment 2-1 through the preferred embodiment 2-3, power supply may be performed to the first phase shifter and the second phase shifter by a common power source in a similar manner to the preferred embodiment 2-5, and similar advantageous effects to those of the preferred embodiment 2-5 can be realized.

Next, a preferred embodiment 2-6 according to the present invention is described. The preferred embodiment 2-6 uses an optical circuit device of the preferred embodiment 2-1 shown in FIG. 2-1, and the amount of supplied power is determined in order that the phase difference between the first phase shifter and the second phase shifter becomes such a phase difference that causes phase inversion for propagating light having a wavelength of 1.55 μm, to construct a 1×2 optical switch.

In the preferred embodiment 2-6, in order for the device to use as an optical switch, TE polarized light and TM polarized light of propagating light having a wavelength of 1.55 μm were input from the incident end 17 of the first optical waveguide 1 (1a), and insertion losses of propagating light emitted from the respective emitting ends 19 and 20 of the third and fourth optical waveguides 1 (1c and 1d) were measured independently for the TE polarized light and TM polarized light.

The above-described measurement was conducted for both the case of no power being supplied and the case of supplying the power that a desired phase difference can be obtained. The measurement results are shown in the following Table 7. It should be noted that extinction ratio in Table 7 means the difference in insertion loss between the case where power is supplied and the case where no power is supplied.

TABLE 7

| | Amount of supplied power | | Characteristics of emission light from first optical waveguide | | | | | Characteristics of emission light from first optical waveguide | | | | |
|---|---|---|---|---|---|---|---|---|---|---|---|---|
| | First thin film heater (mW) | Second thin film heater (mW) | Insertion loss of TE polarized light (dB) | Insertion loss of TM polarized light (dB) | PDL (dB) | Extinction ratio of TE polarized light (dB) | Extinction ratio of TM polarized light (dB) | Insertion loss of TE polarized light (dB) | Insertion loss of TM polarized light (dB) | PDL (dB) | Extinction ratio of TE polarized light (dB) | Extinction ratio of TM polarized light (dB) |
| Without power supplied | 0 | 0 | 31.14 | 31.01 | 0.13 | 30.16 | 30.06 | 0.91 | 0.93 | −0.02 | −34.11 | −34.28 |
| With power supplied | 100.36 | 58.47 | 0.98 | 0.95 | 0.03 | | | 35.02 | 35.21 | −0.19 | | |

As will be understood from Table 7, good PDL values of 0.20 dB or less are obtained regardless of whether power is supplied or not, and also, extinction ratios of 30 dB or greater are obtained, which are practically sufficient for optical switches. As described above, by applying the optical circuit device of the present invention in the preferred embodiment 2-6, it was made possible to realize a Mach-Zehnder interferometer-type optical switch that can be constructed at the same size of a single stage-type Mach-Zehnder interferometer, that can suppress PDL effectively, and that have a high extinction ratio.

The foregoing results prove that by using a configuration of an optical circuit device of the present invention, it is possible to realize an optical circuit device that can suppress the polarization dependence of optical attenuations and substantially eliminate PDL in, for example, a Mach-Zehnder interferometer-type variable optical attenuator or a Mach-Zehnder interferometer-type optical switch, which is an optical circuit device of the present invention. Moreover, it was confirmed that the Mach-Zehnder interferometer-type variable optical attenuator or the Mach-Zehnder interferometer-type optical switch that is an optical circuit device of the present invention has almost the same dimension as conventional single stage-type Mach-Zehnder interferometer-type variable optical attenuators or Mach-Zehnder interferometer-type optical switches, and is capable of suppressing amount of supplied power.

According to the present invention, an optical circuit device has a configuration including: a substrate; and an optical waveguide layer having a core and a cladding formed on the substrate, an optical waveguide circuit of the core having: an optical splitter for splitting light, an optical coupler for coupling light, a first connecting optical waveguide and a second connecting optical waveguide for connecting the optical splitter and the optical coupler, and the first and second connecting optical waveguides respectively having first and second phase adjustment means capable of varying the phases of a propagating light, the optical circuit device being formed such that the rate of change of the polarization difference of phases in the first phase adjustment means and the rate of change of the polarization difference of phases in the second phase adjustment means are different from each other with respect to a phase adjustment amount when the first and second phase adjustment means perform phase adjustment. This makes it possible to substantially eliminate the polarization dependence of optical attenuations in TE polarized light and TM polarized light of propagating light.

Further, according to the present invention, an optical circuit device has a configuration including: a substrate; and an optical waveguide layer having a core and a cladding formed on the substrate, an optical waveguide circuit of the core having: an optical splitter for splitting light, an optical coupler for coupling light, a first connecting optical waveguide and a second connecting optical waveguide for connecting the optical splitter and the optical coupler, and the first and second connecting optical waveguides respectively having first and second phase adjustment means capable of varying the phase of a propagating light, the optical circuit device being formed such that the rate of change of a birefringence of the first connecting optical waveguide and the rate of change of a birefringence of the second connecting optical waveguide are different from each other with respect to a phase adjustment amount when the first and second phase adjustment means perform phase adjustment. This also makes it possible to substantially eliminate the polarization dependence of optical attenuations in TE polarized light and TM polarized light of propagating light.

Furthermore, in an optical circuit device of the present invention, a birefringence of the first connecting optical waveguide and a birefringence of the second connecting optical waveguide may be different from each other; thereby, it is possible to substantially eliminate the polarization dependence of optical attenuations in TE polarized light and TM polarized light of propagating light.

Moreover, in an optical circuit device of the present invention, at least one of first and second birefringence control means may be formed in the vicinity of a portion in which the first or second phase adjustment means is formed, and thereby, a birefringence of the first connecting optical waveguide and a birefringence of the second connecting optical waveguide can be different from each other; thus, it is possible to substantially eliminate the polarization dependence of optical attenuations in TE polarized light and TM polarized light of propagating light.

Further, in an optical circuit device of the present invention, the first and second birefringence control means may be first and second stress-releasing means for releasing stress imparted to the optical waveguide in a formation portion in which the first and second phase adjustment means are formed, and thereby, a birefringence of the first connecting optical waveguide and a birefringence of the second connecting optical waveguide can be different from each other; thus, it is possible to substantially eliminate the polarization dependence of optical attenuations in TE polarized light and TM polarized light of propagating light. It should be noted that the first and second birefringence control means are not limited to the first and second stress-releasing means for releasing stress imparted to the optical waveguide in a formation portion in which the first and second phase adjustment means are formed, but they may be first and second stress-imparting means for further increasing (imparting) the stress imparted to the optical waveguide in a formation portion in which the first and second phase adjustment means are formed.

Still further, in an optical circuit device of the present invention, the first and second stress-releasing means may be formed so that: the optical waveguide layer on both sides sandwiching at least one of portions on which the first and second phase adjustment means are formed is removed from a region spaced apart from the connecting optical waveguide along the longitudinal direction of the connecting optical waveguide, from a surface of the optical waveguide layer to a surface of the substrate, so as to form an optical waveguide layer-removed portion; and the width of a first optical waveguide layer and the width of a second optical waveguide layer are different from each other, the first and second optical wave guide layers including the first and second connecting optical waveguides juxtaposed with the optical waveguide layer-removed portion. Thereby, a birefringence of the first connecting optical waveguide and a birefringence of the second connecting optical waveguide can be made different from each other, and thus, it is possible to substantially eliminate the polarization dependence of optical attenuations in TE polarized light and TM polarized light of propagating light.

Yet further, in an optical circuit device of the present invention, the configuration may be as follows: the optical waveguide layer on both sides sandwiching at least one of portions on which the first and second phase adjustment means are formed is removed from a region spaced apart from the connecting optical waveguide along the longitudinal direction of the connecting optical waveguide, from a surface of the optical waveguide layer reaching a surface of the substrate, so as to form an optical waveguide layer-removed portion; and the width of a first optical waveguide layer and the width of a second optical waveguide layer are different from each other, the first and second optical wave guide layers including the first and second connecting optical waveguides juxtaposed with the optical waveguide layer-removed portion. Thereby, a birefringence of the first connecting optical waveguide and a birefringence of the second connecting optical waveguide can be different from each other, and thus, it is possible to substantially eliminate the polarization dependence of optical attenuations in TE polarized light and TM polarized light of propagating light.

Moreover, in an optical circuit device of the present invention, the first and second stress-releasing means may be formed so that: the optical waveguide layer on both sides sandwiching at least one of portions on which the first and second phase adjustment means are formed is removed from a region spaced apart from the connecting optical waveguide along the longitudinal direction of the connecting optical waveguide, from a surface of the optical waveguide layer to a surface of the substrate, so as to form an optical waveguide layer-removed portion; a substrate-removed portion from which the substrate is removed is provided in a surface portion of the substrate facing the bottom part of the optical waveguide layer-removed portion; and the width of a first optical waveguide layer and the width of a second optical waveguide layer are different from each other, the first and second optical wave guide layers including the first and second connecting optical waveguides juxtaposed with the optical waveguide layer-removed portion. Thereby, a birefringence of the first connecting optical waveguide and a birefringence of the second connecting optical waveguide can be different from each other, and thus, it is possible to substantially eliminate the polarization dependence of optical attenuations in TE polarized light and TM polarized light of propagating light. Furthermore, the amount of supplied power can be reduced.

In addition, in an optical circuit device of the present invention, the substrate-removed portion may be such that a substrate-removed portion being a recessed portion having a rectangular cross-sectional shape is formed in a surface portion of the substrate including an entire region facing a bottom part of the optical waveguide layer-removed portion. Thereby, a birefringence of the first connecting optical waveguide and a birefringence of the second connecting optical waveguide can be different from each other, and thus, it is possible to substantially eliminate the polarization dependence of optical attenuations in TE polarized light and TM polarized light of propagating light. Furthermore, the amount of supplied power can be reduced.

Further, in an optical circuit device of the present invention, the configuration may be as follows: a first dummy phase adjustment means having the same configuration as the first phase adjustment means and serving as a dummy is formed for the second connecting optical waveguide; an optical waveguide layer-removed portion having the same configuration as an optical waveguide layer-removed portion formed by removing a region of the optical waveguide layer spaced apart from the first phase adjustment means along a longitudinal direction of the connecting optical waveguide is formed on both sides of the optical waveguide layer sandwiching a portion where the first dummy phase adjustment means is formed; the second phase adjustment means is connected spaced apart from the first dummy phase adjustment means; a second dummy phase adjustment means having the same configuration as the second phase adjustment means and serving as a dummy is formed for the first connecting optical waveguide; an optical waveguide layer-removed portion having the same configuration as an optical waveguide layer-removed portion formed by removing a region of the optical waveguide layer spaced apart from the second phase adjustment means along a longitudinal direction of the second phase adjustment means is formed on both sides of the optical waveguide layer sandwiching a portion where the second dummy phase adjustment means is formed; and the first phase adjustment means is connected spaced apart from the second dummy phase adjustment means. Thus, it is possible to substantially eliminate the polarization dependence of optical attenuations in TE polarized light and TM polarized light of propagating light, and to reduce the amount of supplied power.

Furthermore, in an optical circuit device of the present invention, the configuration may be as follows: first and second power supply lines for supplying power are connected respectively to the first and second thin film heaters; the first and second power supply lines are connected in parallel to a power supply; and the sum of respective resistance values of the first power supply line and the first thin film heater is equal to the sum of respective resistance values of the second power supply line and the second thin film heater. Thus, it is possible to substantially eliminate the polarization dependence of optical attenuations in TE polarized light and TM polarized light of propagating light.

Still further, in an optical circuit device of the present invention, the configuration may be as follows: first and second power supply lines for supplying power are connected respectively to the first and second thin film heaters; the first and second power supply lines are connected in parallel to a power supply; a resistor is connected to at least one of the first and second power supply lines; and the sum of respective resistance values of the first power supply line, the first thin film heater, and the resistor is equal to the sum of respective resistance values of the second power supply line, the second thin film heater, and the resistor. Thus, it is possible to substantially eliminate the polarization dependence of optical attenuations in TE polarized light and TM polarized light of propagating light.

Further, an optical circuit device of the present invention may employ a configuration including a Mach-Zehnder interferometer circuit; thereby, the phase section of the Mach-Zehnder interferometer circuit serves as first and second connecting optical waveguides, and thus, the phase of propagating light propagating in the first and second connecting optical waveguides can be controlled by means of respective first and second phase adjustment means provided for the first and second connecting optical waveguides. Consequently, it is possible to realize various optical circuit devices that have a variety of functions such as variable optical attenuators or optical switches and can substantially eliminate the polarization dependence of optical attenuations in TE polarized light and TM polarized light of propagating light.

Yet further, according to a method of controlling an optical circuit device of the present invention, the phase adjustment means is adjusted so that a phase difference between the phase of TE polarized light after a propagating light propagating in the first connecting optical waveguide has propagated through the first connecting optical waveguide and the phase of TE polarized light after a propagating light propagating in the second connecting optical waveguide has propagated through the second connecting optical waveguide and a phase difference between the phase of TM polarized light after a propagating light propagating in the first connecting optical waveguide has propagated through the first connecting optical waveguide and the phase of TM polarized light after a propagating light propagating in the second connecting optical waveguide has propagated through the second connecting optical waveguide are equal to each other. Thus, it is possible to substantially eliminate the polarization dependence of optical attenuations in TE polarized light and TM polarized light of propagating light.

What is claimed is:

1. An optical circuit comprising: a silicon substrate; an optical waveguide layer formed on the silicon substrate, the optical waveguide layer having a core and a cladding; and temperature control row formed on the optical waveguide layer, for variably controlling the temperature of a portion of the core locally; wherein the optical waveguide layer on both sides sandwiching a portion on which the temperature control means is formed is removed from a region spaced from the core along a longitudinal direction of the core, from a surface of the optical waveguide layer to a surface of the silicon substrate; a recessed portion having a rectangular cross-sectional shape is provided in a surface portion of the silicon substrate including an entire region facing a bottom part of the optical waveguide layer-removed portion; the surface of the silicon substrate is formed of a silicon (100) crystal plane, a side face of the recessed portion formed along the longitudinal direction of the core is formed of a silicon (100) crystal plane substantially perpendicular to the silicon substrate surface, and a bottom face of the recessed portion is formed of a silicon (100) crystal plane substantially parallel to the silicon substrate surface.

2. The optical circuit according to claim 1, wherein the recessed portion of the silicon substrate is formed by anisotropic etching of silicon using an alkaline solution.

3. The optical circuit according to claim 1, wherein the temperature control means is a thin film heater.

4. The optical circuit according to claim 1, wherein the optical waveguide layer is formed of quartz-based glass.

5. An optical circuit device comprising:
an optical circuit according to claim 1, the core of the optical circuit having a coupler-forming core that forms at least two optical splitter/couplers for performing at least one of splitting and coupling of fight and at least two connecting cores that connect the coupler-forming cores together, and at least one of the connecting cores having a temperature control means.

6. The optical circuit device according to claim 5, wherein the coupler-forming core is formed of two juxtaposed cores being adjacent to each other, and the connecting core has a Mach-Zehnder interferometer circuit formed of two juxtaposed cores that are spaced apart from each other.

7. An optical circuit device comprising at least one optical circuit device according to claim 6, and including a variable optical attenuation control section for varying an intensity of at least one predetermined wavelength light by controlling a temperature of the temperature control means, so that the optical circuit device is configured to be a variable optical attenuator.

8. An optical circuit device comprising at least one optical circuit device according to claim 6, and including an optical switch control section for varying an output section of at least one predetermined wavelength light by controlling a temperature of the temperature control means, so that the optical circuit device is configured to be an optical switch.

9. An optical circuit device comprising at least one optical circuit device according to claim 6, and including a variable wavelength control section for varying a wavelength of at least one of multiplexed wavelength and demultiplexed wavelength by controlling a temperature of the temperature control means, so that the optical circuit device is configured to be a variable wavelength multiplexer/demultiplexer.

10. An optical circuit device comprising at least one optical circuit device according to claim 6, and including a variable dispersion control section for varying a dispersion value of at least one predetermined wavelength light by controlling a temperature of the temperature control means, so that the optical circuit device is configured to be a variable optical dispersion compensator for reducing a wavelength dispersion of a device to be connected.

11. The optical circuit device according to claim 5, further comprising: at least one optical input waveguide; a first slab waveguide connected to an output side of the optical input waveguide; an arrayed waveguide connected the output side of the first slab waveguide and composed of a plurality of juxtaposed channel waveguides having lengths being different from one another by predetermined amounts; a second slab waveguide connected to an output side of the arrayed waveguide; and at least one optical output waveguide connected to the output side of the second slab waveguide, and wherein: the optical input waveguide, the first slab waveguide, and an end portion of the arrayed waveguide near the first slab waveguide side constitute a first coupler-forming core that forms a first optical splitter/coupler; an end portion of the arrayed waveguide near the second slab waveguide side, the second slab waveguide, and the optical output waveguide constitute second coupler-forming core that forms a second optical splitter/coupler; the arrayed waveguide between the second coupler-forming core and the first coupler-forming core consititutes a connecting core.

12. A method for manufacturing an optical circuit according to claim 1, comprising, after forming a portion from which the optical waveguide layer is removed, subjecting the silicon substrate to anisotropic etching of silicon using an alkaline solution to form a recessed portion at a location of the silicon substrate surface corresponding to the portion from which the optical waveguide layer is removed.

13. The method for manufacturing an optical circuit according to claim 12, wherein the alkaline solution is an aqueous solution of potassium hydroxide.

14. An optical circuit comprising: a silicon substrate; an optical waveguide layer formed on the silicon substrate, the optical waveguide layer having a core and a cladding; and temperature control means formed on the optical waveguide layer, for variably controlling the temperature of a portion of the core locally; wherein the optical waveguide layer on both sides sandwiching a portion on which the temperature control means is formed is removed from a region spaced from the core along a longitudinal direction of the core, from a surface of the optical waveguide layer to a surface of the silicon substrate; a recessed portion having a rectangular cross-sectional shape is provided in a surface portion of the silicon substrate including an entire region facing a bottom part of the optical waveguide layer-removed portion; the surface of the silicon substrate is formed of a silicon (111) crystal plane, a side face of the recessed portion formed along the longitudinal direction of the core is formed of a silicon (110) crystal plane substantially perpendicular to the silicon substrate surface, and a bottom face of the recessed portion is formed of a silicon (111) crystal plane substantially parallel to the silicon substrate surface.

15. The optical circuit according to claim 14, wherein the recessed portion of the silicon substrate is formed by anisotropic dry etching of silicon and anisotropic etching of silicon using an alkaline solution that is successively performed after the anisotropic dry etching.

16. A method for manufacturing an optical circuit according to claim 14, comprising, after forming portions from which the optical waveguide layer is removed, subjecting the silicon substrate to anisotropic dry etching of silicon, and thereafter subjecting the silicon substrate to anisotropic etching using an alkaline solution, to form a recessed portion at a location of the silicon substrate surface corresponding to the portions from which the optical waveguide layer is removed.

17. An optical circuit device comprising: a substrate; and an optical waveguide layer having a core and a cladding formed on the substrate, an optical waveguide circuit of the core having: an optical splitter for splitting light, an optical coupler for coupling light, a first connecting optical waveguide and a second connecting optical waveguide for connecting the optical splitter and the optical coupler, and the first and second connecting optical waveguides respectively having first and second phase adjustment means capable of varying the phases of a propagating light, the optical circuit device being formed such that the rate of change of the polarization difference of phases in the first phase adjustment means and the rate of change of the polarization difference of phases in the second phase adjustment means are different from each other with respect to a phase adjustment amount when the first and second phase adjustment means perform phase adjustment.

18. The optical circuit device according to claim 17, wherein a birefringence of the first connecting optical waveguide and a birefringence of the second connecting optical waveguide are different from each other.

19. The optical circuit device according to claim 17, wherein at least one of first and second birefringence control means is formed in the vicinity of a portion in which the first or second phase adjustment mean is formed.

20. The optical circuit device according to claim 19, wherein the first and second birefringence control means are first and second stress-releasing means for releasing stress imparted to the optical waveguide in a formation portion in which the first and second phase adjustment means are formed.

21. The optical circuit device according to claim 20, wherein the first and second stress-releasing means are formed so that: the optical waveguide layer on both sides sandwiching at least one of portions on which the first and second phase adjustment means are formed is removed from a region spaced apart from the connecting optical waveguide along the longitudinal direction of the connecting optical waveguide, from a surface of the optical waveguide layer to a surface of the substrate, so as to form an optical waveguide layer-removed portion; and the width of a first optical waveguide layer and the width of a second optical waveguide layer are different from each other, the first and second optical waveguide layers including the first and second connecting optical waveguides juxtaposed with the optical waveguide layer-removed portion.

22. The optical circuit device according to claim 21, wherein the optical waveguide layer-removed portion is such that the optical waveguide layer is removed from the surface of the optical waveguide layer surface to the surface of the substrate.

23. The optical circuit device according to claim 20, wherein the first and second stress-releasing means are formed so that: the optical waveguide layer on both sides sandwiching at least one of portions on which the first and second phase adjustment means are formed is removed from a region spaced apart from the connecting optical waveguide along the longitudinal direction of the connecting optical waveguide, from a surface of the optical waveguide layer to a surface of the substrate, so as to form an optical waveguide layer-removed portion; a substrate-removed portion from which the substrate is removed is provided in a surface portion of the substrate facing the bottom part of the optical waveguide layer-removed portion; and the width of a first optical waveguide layer and the width of a second optical waveguide layer are different from each other, the first and second optical waveguide layers including the first and second connecting optical waveguides juxtaposed with the optical waveguide layer-removed portion.

24. The optical circuit device according to claim 23, wherein the substrate-removed portion is such that a substrate-removed portion being a recessed portion having a rectangular cross-sectional shape is formed in a surface portion of the substrate including an entire region facing a bottom part of the optical waveguide layer-removed portion.

25. The optical circuit device according to claim 17, wherein a first dummy phase adjustment means having the same configuration as the first phase adjustment means and being placed as a dummy is formed for the second connecting optical waveguide; an optical waveguide layer-removed portion having the same configuration as an optical waveguide layer-removed portion formed by removing a region of the optical waveguide layer spaced apart from the first phase adjustment means along a longitudinal direction of the connecting optical waveguide is formed on both sides of the optical waveguide layer sandwiching a portion where the first dummy phase adjustment means is formed; the second phase adjustment means is connected spaced apart from the first dummy phase adjustment means; a second dummy phase adjustment means having the same configuration as the second phase adjustment means and serving as a dummy is formed for the first connecting optical waveguide; an optical waveguide layer-removed portion having the same configuration as an optical waveguide layer-removed portion formed by removing a region of the optical waveguide layer spaced apart from the second phase adjustment means along a longitudinal direction of the second phase adjustment means is formed on both sides of the optical waveguide layer sandwiching a portion where the second dummy phase adjustment means is formed; and the first phase adjustment means is connected spaced apt from the second dummy phase adjustment means.

26. The optical circuit device according to claim 17, wherein the optical waveguide layer is formed of quartz-based glass.

27. The optical circuit device according to claim 17, wherein the substrate is a silicon substrate.

28. The optical circuit device according to claim 17, wherein the first and second phase adjustment means arc first and second thin film heaters, respectively.

29. The optical circuit device according to claim 17, wherein first and second power supply lines for supplying power are connected respectively to the first and second thin film heaters; the first and second power supply lines are connected in parallel to a power supply; and the sum of respective resistance values of the first power supply line and the first thin film heater is equal to the sum of respective resistance values of the second power supply line and the second thin film heater.

30. The optical circuit device according to claim 29, wherein a resistor is connected to at least one of the first and second power supply lines.

31. The optical circuit device according to claim 17, further comprising an optical variable attenuation control section for varying the intensity of at least one predetermined wavelength light by adjusting phases in the phase adjustment means, so that the optical circuit device is configured to be a variable optical attenuator.

32. The optical circuit device according to claim 17, further comprising an optical switch control section for varying the output of at least one predetermine wavelength light by adjusting phases in the phase adjustment means, so that the optical circuit device is configured to be an optical switch.

33. A method for controlling an optical circuit device according to claim 17, comprising: adjusting the phase adjustment means so that a phase difference between the phase of TE polarized light after a propagating light propagating in the first connecting optical waveguide has propagated through the first connecting optical waveguide and the phase of TE polarized light after a propagating light propagating in the second connecting optical waveguide has propagated through the second connecting optical waveguide and a phase difference between the phase of TM polarized light after the propagating light propagating in the first connecting optical waveguide has propagated through the first connecting optical waveguide and the phase of TM polarized light after the propagating light propagating in the second connecting optical waveguide has propagated through the second connecting optical waveguide, are equal to each other.

34. An optical circuit device comprising: a substrate; and an optical waveguide layer having a core and a cladding formed on the substrate, an optical waveguide circuit of the core having: an optical splitter for splitting light, an optical coupler for coupling light, a first connecting optical waveguide and a second connecting optical waveguide for connecting the optical splitter and the optical coupler, and the first and second connecting optical waveguides respectively having first and second phase adjustment means capable of varying the phase of a propagating light, the optical circuit device being formed such that the rate of change of a birefringence of the first connecting optical waveguide and the rate of change of a birefringence of the second connecting optical waveguide are different from each other with respect to a phase adjustment amount when the first and second phase adjustment means perform phase adjustment.

* * * * *